US011144160B1

(12) United States Patent
Morrison et al.

(10) Patent No.: US 11,144,160 B1
(45) Date of Patent: Oct. 12, 2021

(54) THREE-DIMENSIONAL DATA REDUCTION METHOD AND SYSTEM

(71) Applicant: SigmaSense, LLC., Wilmington, DE (US)

(72) Inventors: Gerald Dale Morrison, Redmond, WA (US); Michael Shawn Gray, Cedar Park, TX (US); Grant Howard McGibney, Calgary (CA)

(73) Assignee: SigmaSense, LLC., Wilmington, DE (US)

( * ) Notice: Subject to any disclaimer, the term of this patent is extended or adjusted under 35 U.S.C. 154(b) by 0 days.

(21) Appl. No.: 16/834,442

(22) Filed: Mar. 30, 2020

(51) Int. Cl.
G06F 3/041 (2006.01)
G06F 3/044 (2006.01)

(52) U.S. Cl.
CPC ...... *G06F 3/041661* (2019.05); *G06F 3/0446* (2019.05)

(58) Field of Classification Search
CPC ...... G06F 3/044; G06F 3/0412; G06F 3/0416; G06F 3/0446; G06F 3/041; G06F 3/04166; G06F 3/0443; G06F 2203/04103
See application file for complete search history.

(56) References Cited

U.S. PATENT DOCUMENTS

| | | | |
|---|---|---|---|
| 6,218,972 B1 | 4/2001 | Groshong | |
| 6,665,013 B1 | 12/2003 | Fossum et al. | |
| 7,528,755 B2 | 5/2009 | Hammerschmidt | |
| 8,031,094 B2 | 10/2011 | Hotelling | |
| 8,089,289 B1 | 1/2012 | Kremin et al. | |
| 8,279,180 B2 | 10/2012 | Hotelling et al. | |
| 8,547,114 B2 | 10/2013 | Kremin | |

(Continued)

FOREIGN PATENT DOCUMENTS

| | | |
|---|---|---|
| CN | 103995626 A | 8/2014 |
| CN | 104182105 A | 12/2014 |
| KR | 1020170073748 A | 6/2017 |

OTHER PUBLICATIONS

Baker; How delta-sigma ADCs work, Part 1; Analog Applications Journal; Oct. 1, 2011; 6 pgs.

(Continued)

*Primary Examiner* — Olga V Merkoulova
(74) *Attorney, Agent, or Firm* — Garlick & Markison

(57) ABSTRACT

A method includes generating, by a processing module interacting with a touch screen, drive sense data. The method further includes generating, by the processing module, capacitance grid data based on the drive sense data. The method further includes determining, by the processing module, a use for the capacitance grid data. The method further includes determining, by the processing module, data requirements for the capacitance grid data based on the use and properties of the capacitance grid. When data reduction is enabled, the method further includes determining, by the processing module, a data reduction scheme based on the data requirements and an output data rate. The method further includes processing, by the processing module, the capacitance grid data in accordance with the data reduction scheme to produce reduced capacitive gird data. The method further includes providing, by the processing module, the reduced capacitive grid data to a datap circuit.

22 Claims, 56 Drawing Sheets
(19 of 56 Drawing Sheet(s) Filed in Color)

(56) References Cited

U.S. PATENT DOCUMENTS

| | | | |
|---|---|---|---|
| 8,587,535 | B2 | 11/2013 | Oda et al. |
| 8,625,726 | B2 | 1/2014 | Kuan |
| 8,743,300 | B2 * | 6/2014 | Chang ............... G02F 1/133514 349/12 |
| 8,874,396 | B1 * | 10/2014 | Olson ................ G06F 3/0446 702/69 |
| 8,982,097 | B1 | 3/2015 | Kuzo et al. |
| 9,201,547 | B2 * | 12/2015 | Elias ................ G06F 3/0418 |
| 9,377,905 | B1 * | 6/2016 | Grivna ............... G06F 3/04166 |
| 2006/0097991 | A1 * | 5/2006 | Hotelling ............. G06F 3/0443 345/173 |
| 2011/0063154 | A1 | 3/2011 | Hotelling et al. |
| 2011/0298745 | A1 * | 12/2011 | Souchkov ............ G06F 3/0446 345/174 |
| 2012/0081301 | A1 | 4/2012 | Lin et al. |
| 2012/0278031 | A1 | 11/2012 | Oda |
| 2013/0278447 | A1 | 10/2013 | Kremin |
| 2014/0028577 | A1 * | 1/2014 | Krah .................. G06F 3/0445 345/173 |
| 2014/0240286 | A1 * | 8/2014 | Chang ................ G06F 3/04164 345/174 |
| 2014/0327644 | A1 | 11/2014 | Mohindra |
| 2015/0091847 | A1 | 4/2015 | Chang |
| 2015/0153878 | A1 | 6/2015 | Kim |
| 2015/0248177 | A1 * | 9/2015 | Maharyta .......... G06F 3/041662 345/174 |
| 2015/0261342 | A1 | 9/2015 | Hsu et al. |
| 2015/0309627 | A1 * | 10/2015 | Xu ..................... G06F 3/04164 345/174 |
| 2015/0317810 | A1 * | 11/2015 | Grunwald ............... G06F 3/015 345/440.1 |
| 2015/0346889 | A1 | 12/2015 | Chen |
| 2016/0188049 | A1 | 6/2016 | Yang et al. |
| 2016/0313843 | A1 * | 10/2016 | Vanga ................... G06F 3/0446 |
| 2016/0349906 | A1 * | 12/2016 | Lee ..................... G06F 3/04182 |
| 2017/0010746 | A1 * | 1/2017 | Hotelling ........... G06F 3/04166 |
| 2017/0061188 | A1 * | 3/2017 | Kremin ............... G06F 3/0418 |
| 2018/0059866 | A1 * | 3/2018 | Drake .................. G06F 3/0447 |
| 2019/0310734 | A1 * | 10/2019 | Hotelling ........... G06F 3/04166 |
| 2020/0089354 | A1 | 3/2020 | Gray |

OTHER PUBLICATIONS

Brian Pisani, "Digital Filter Types in Delta-Sigma ADCs", Application Report SBAA230, May 2017, pp. 1-8, Texas Instruments Incorporated, Dallas, Texas.

International Searching Authority; International Search Report & Written Opinion; International Application No. PCT/US2021/024703; dated Jul. 9, 2021; 8 pgs.

* cited by examiner communication system 10 computing device 14 computing device 18

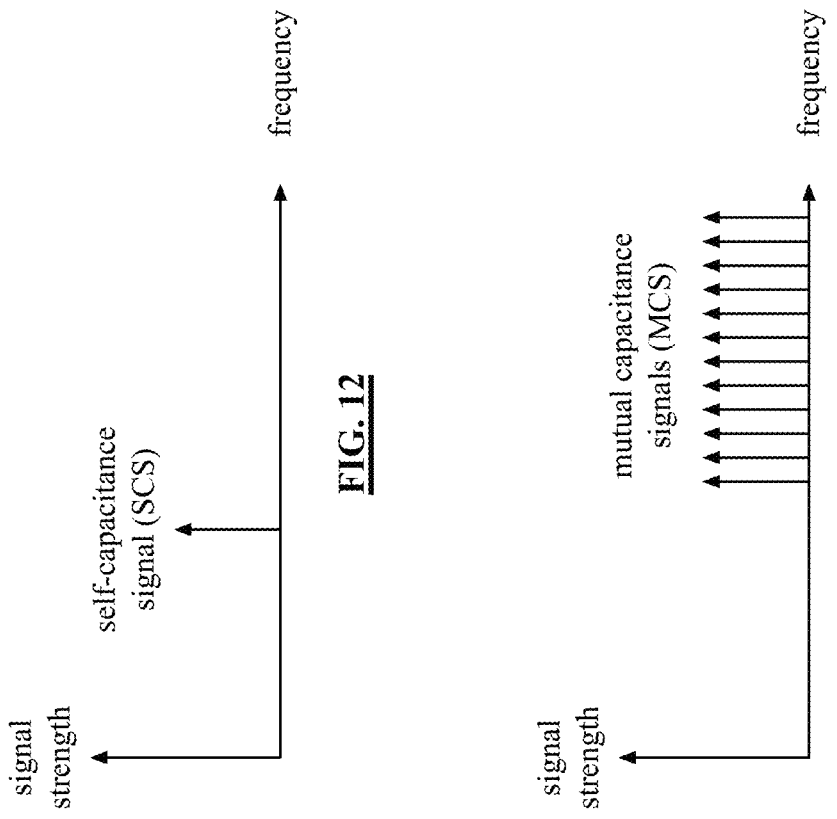
FIG. 12
FIG. 13
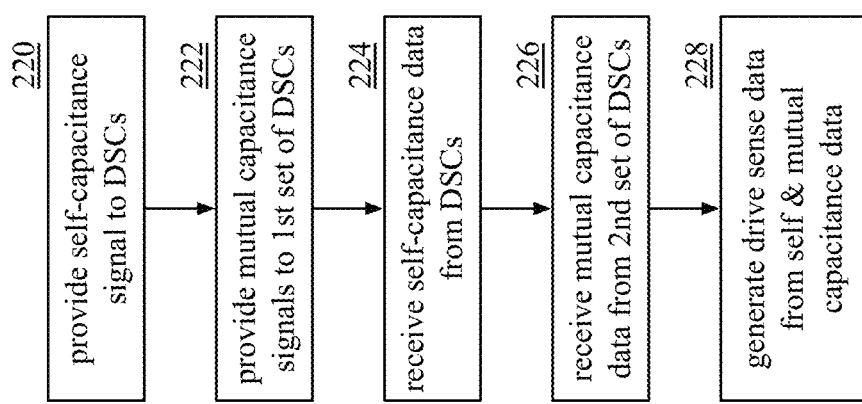
FIG. 11 drive-sense circuit 28 full data in an area heat map of touches anywhere x-y coordinate of a touch in a specific area full data any where on screen

| data resolution (DR) (rows x columns) | bits/sample (bps) | frame rate (FR) | self-capacitance (SC) | mutual capacitance (MC) | data rate |
|---|---|---|---|---|---|
| | | | yes | yes | f{DR, bps, RF, SC, MC} |
| 10 x 25 | 8 | 30/s | no | no | |
| 30 x 50 | 16 | 100/s | | | |
| 45 x 60 | 24 | 200/s | | | |
| 80 x 140 | 32 | 300/s | | | |
| 136 x 243 | 48 | | | | |
| 211 x 376 | 64 | | | | |

FIG. 19
data requirement options

| data resolution (DR) (rows x columns) | bits/sample (bps) | frame rate (FR) | self-capacitance (SC) | mutual capacitance (MC) | data rate |
|---|---|---|---|---|---|
| | | | yes | yes | 481.4 Mbps |
| 10 x 25 | 8 | 30/s | no | no | |
| 30 x 50 | 16 | 100/s | | | |
| 45 x 60 | 24 | 200/s | | | |
| 80 x 140 | 32 | 300/s | | | |
| 136 x 243 | 48 | | | | |
| 211 x 376 | 64 | | | | |

FIG. 19A
data requirement example

| | X0 | X1 | X2 | X3 | X4 | X5 | X6 | X7 | X8 | X9 | X10 | X11 | X12 | X13 | X14 |
|---|---|---|---|---|---|---|---|---|---|---|---|---|---|---|---|
| binary L0 | 0 | 0 | 1 | 1 | 1 | 1 | 1 | 1 | 1 | 1 | 1 | 1 | 1 | 0 | 0 |
| binary L1 | 0 | 0 | 0 | 1 | 1 | 1 | 1 | 1 | 1 | 1 | 1 | 1 | 0 | 0 | 0 |
| binary L2 | 0 | 0 | 0 | 0 | 1 | 1 | 1 | 1 | 1 | 1 | 1 | 0 | 0 | 0 | 0 |
| binary L3 | 0 | 0 | 0 | 0 | 0 | 1 | 1 | 1 | 0 | 1 | 0 | 0 | 0 | 0 | 0 |
| binary L4 | 0 | 0 | 0 | 0 | 0 | 0 | 1 | 1 | 0 | 0 | 0 | 0 | 0 | 0 | 0 |
| binary L5 | 0 | 0 | 0 | 0 | 0 | 0 | 0 | 0 | 0 | 0 | 0 | 0 | 0 | 0 | 0 |
| binary L6 | 0 | 0 | 0 | 0 | 0 | 0 | 0 | 0 | 0 | 0 | 0 | 0 | 0 | 0 | 0 |
| binary L7 | 0 | 0 | 0 | 0 | 0 | 0 | 0 | 0 | 0 | 0 | 0 | 0 | 0 | 0 | 0 |

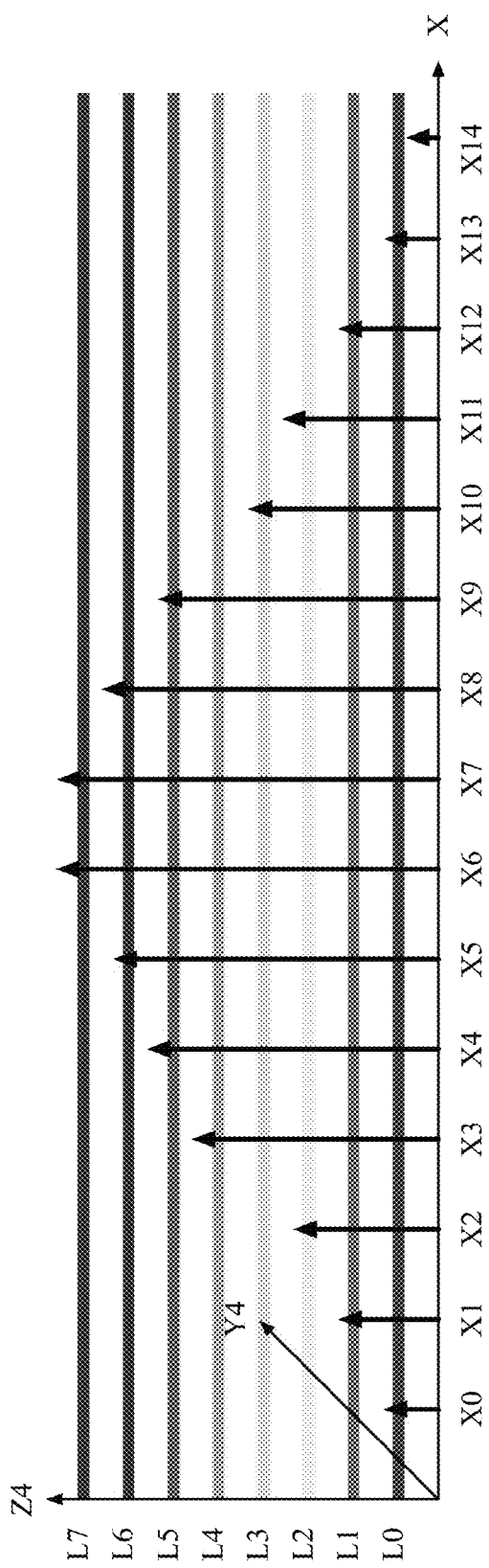

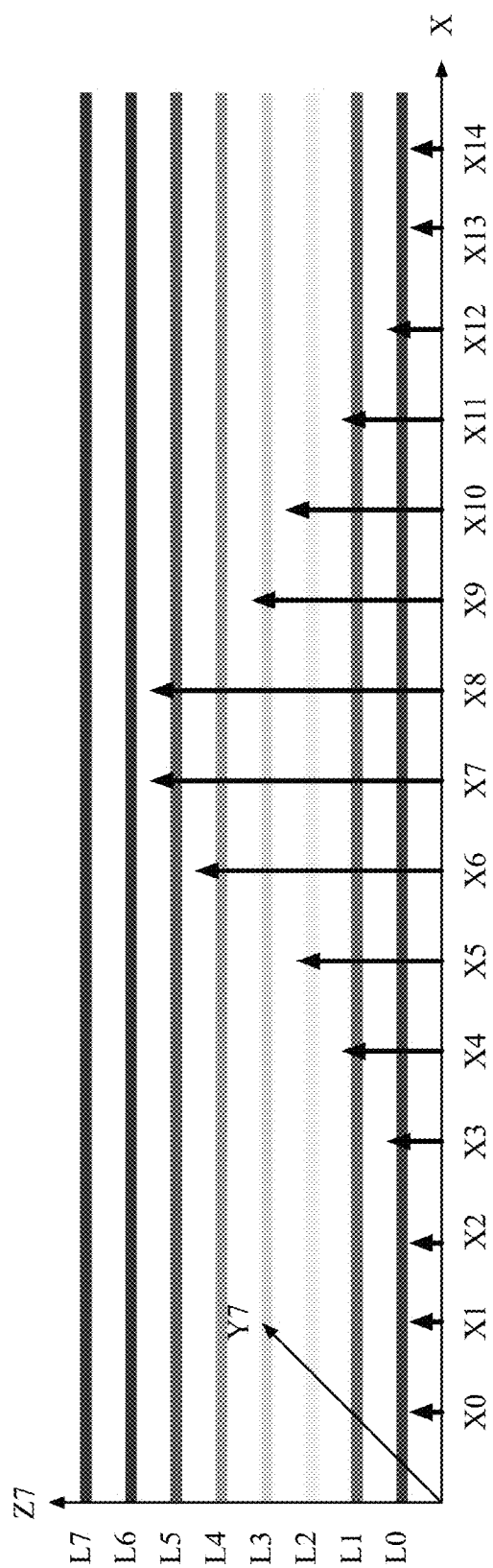

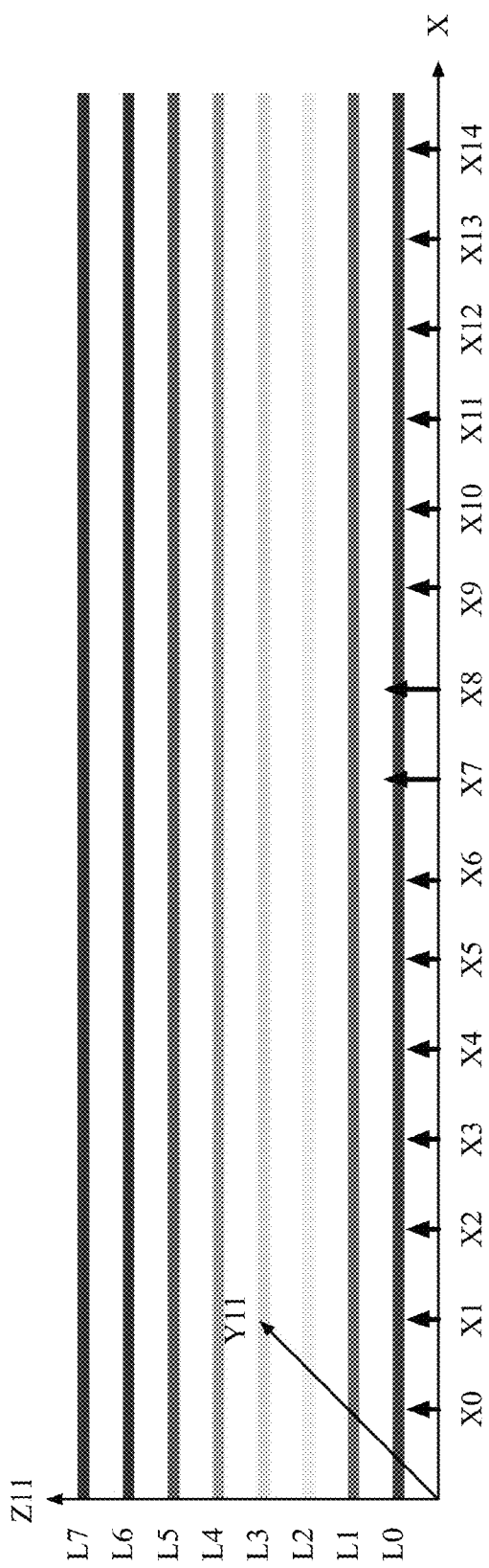

THREE-DIMENSIONAL DATA REDUCTION METHOD AND SYSTEM

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to data communication systems and more particularly to sensed data collection and/or communication.

Description of Related Art

Computers are known to process data, store data, and communicate data with other computers, cell phones, servers, printers, and/or storage services. To make the communication of data more efficient from a data amount standpoint, the data is often compressed. There are a variety of known lossless and lossy data compression techniques. For example, lossless compression reduces bit count by eliminating data redundancies. Lossy compression reduces bit count by removing less important information.

Image data (e.g., pictures), audio data, and video data are often compressed using lossless and/or lossy data compression techniques. The data compression techniques employed for images, audio, and video data are based on human perception of sound and sight. There are certain aspects of images, audio, and video that are minimally perceptible to humans and thus can be compressed using lossy techniques. Similarly, there are certain aspects of images, audio, and video that perceptible to humans and thus can be compressed using lossless techniques.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

FIG. 11 is logic diagram of a further example of a method for touch screen data reduction in accordance with the present invention;

FIG. 12 is a schematic block diagram of an example of a self-capacitance signal in accordance with the present invention;

FIG. 13 is a schematic block diagram of an example of mutual capacitance signals in accordance with the present invention;

FIG. 19 is a schematic block diagram of an example of data requirements in accordance with the present invention;

FIG. 19A is a schematic block diagram of another example of data requirements in accordance with the present invention;

FIG. 45 is a schematic block diagram of an example of x-y4-z4 values for the capacitive grid of FIG. 35 in accordance with the present invention;

FIG. 46 is a diagram of an example of creating binary values for each layer of the data of FIG. 45 in accordance with the present invention;

FIG. 51 is a schematic block diagram of an example of x-y7-z7 values for the capacitive grid of FIG. 35 in accordance with the present invention;

FIG. 52 is a diagram of an example of creating binary values for each layer of the data of FIG. 51 in accordance with the present invention;

FIG. 59 is a schematic block diagram of an example of x-y11-z11 values for the capacitive grid of FIG. 35 in accordance with the present invention;

FIG. 60 is a diagram of an example of creating binary values for each layer of the data of FIG. 59 in accordance with the present invention;

DETAILED DESCRIPTION OF THE INVENTION

Figure 1:
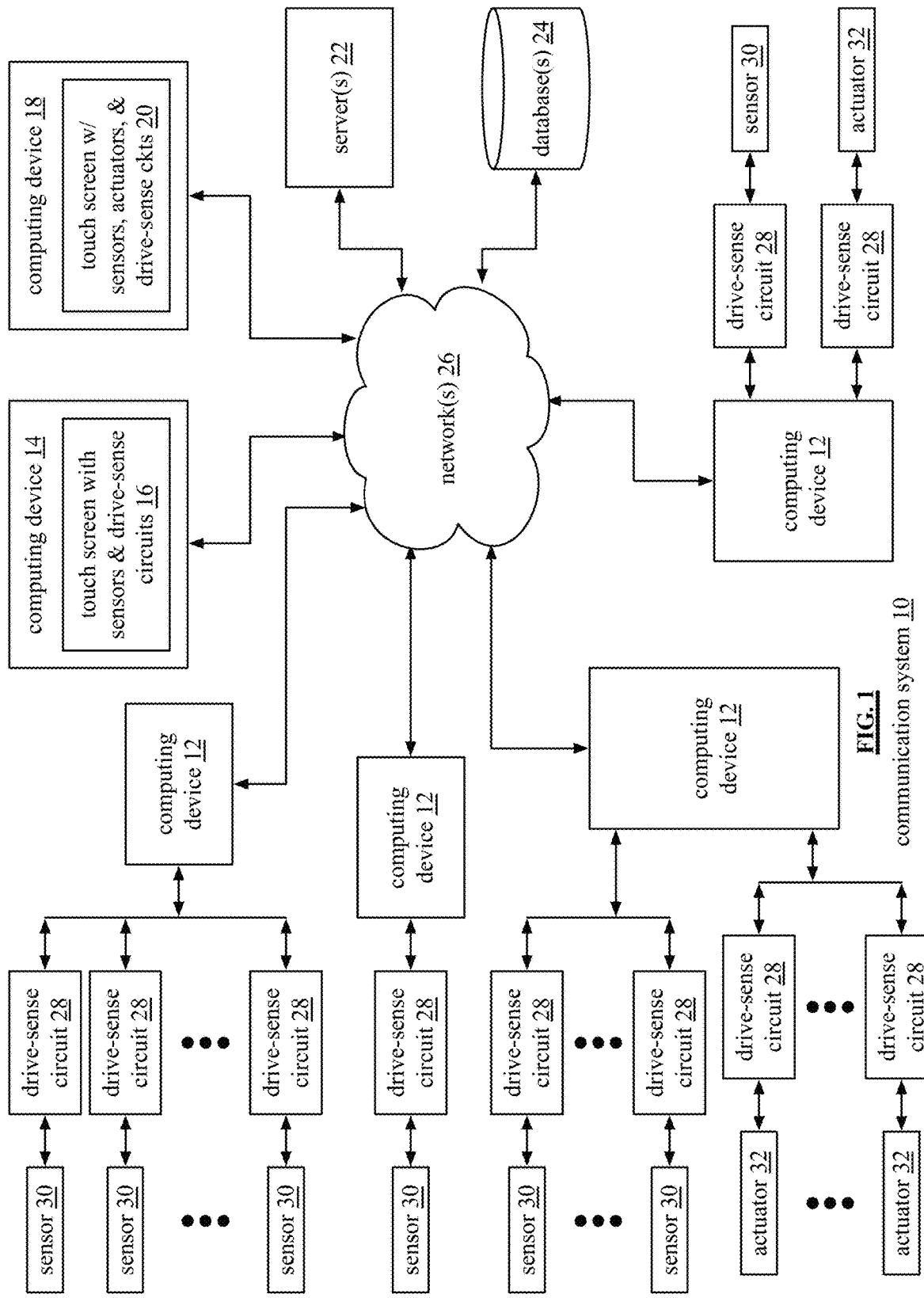
FIG. 1 is a schematic block diagram of an embodiment of a communication system in accordance with the present invention.

FIG. 1 is a schematic block diagram of an embodiment of a communication system 10 that includes a plurality of computing. devices 12-10, one or more servers 22, one or more databases 24, one or more networks 26, a plurality of drive-sense circuits 28, a plurality of sensors 30, and a plurality of actuators 32. Computing devices 14 include a touch screen 16 with sensors and drive-sensor circuits and computing devices 18 include a touch & tactic screen 20 that includes sensors, actuators, and drive-sense circuits.

A sensor 30 functions to convert a physical input into an electrical output and/or an optical output. The physical input of a sensor may be one of a variety of physical input conditions. For example, the physical condition includes one or more of, but is not limited to, acoustic waves (e.g., amplitude, phase, polarization, spectrum, and/or wave velocity); a biological and/or chemical condition (e.g., fluid concentration, level, composition, etc.); an electric condition (e.g., charge, voltage, current, conductivity, permittivity, eclectic field, which includes amplitude, phase, and/or polarization); a magnetic condition (e.g., flux, permeability, magnetic field, which amplitude, phase, and/or polarization); an optical condition (e.g., refractive index, reflectivity, absorption, etc.); a thermal condition (e.g., temperature, flux, specific heat, thermal conductivity, etc.); and a mechanical condition (e.g., position, velocity, acceleration, force, strain, stress, pressure, torque, etc.). For example, piezoelectric sensor converts force or pressure into an eclectic signal. As another example, a microphone converts audible acoustic waves into electrical signals.

There are a variety of types of sensors to sense the various types of physical conditions. Sensor types include, but are not limited to, capacitor sensors, inductive sensors, accelerometers, piezoelectric sensors, light sensors, magnetic field sensors, ultrasonic sensors, temperature sensors, infrared (IR) sensors, touch sensors, proximity sensors, pressure sensors, level sensors, smoke sensors, and gas sensors. In many ways, sensors function as the interface between the physical world and the digital world by converting real world conditions into digital signals that are then processed by computing devices for a vast number of applications including, but not limited to, medical applications, production automation applications, home environment control, public safety, and so on.

The various types of sensors have a variety of sensor characteristics that are factors in providing power to the sensors, receiving signals from the sensors, and/or interpreting the signals from the sensors. The sensor characteristics include resistance, reactance, power requirements, sensitivity, range, stability, repeatability, linearity, error, response time, and/or frequency response. For example, the resistance, reactance, and/or power requirements are factors in determining drive circuit requirements. As another example, sensitivity, stability, and/or linear are factors for interpreting the measure of the physical condition based on the received electrical and/or optical signal (e.g., measure of temperature, pressure, etc.).

An actuator 32 converts an electrical input into a physical output. The physical output of an actuator may be one of a variety of physical output conditions. For example, the physical output condition includes one or more of, but is not limited to, acoustic waves (e.g., amplitude, phase, polarization, spectrum, and/or wave velocity); a magnetic condition (e.g., flux, permeability, magnetic field, which amplitude, phase, and/or polarization); a thermal condition (e.g., temperature, flux, specific heat, thermal conductivity, etc.); and a mechanical condition (e.g., position, velocity, acceleration, force, strain, stress, pressure, torque, etc.). As an example, a piezoelectric actuator converts voltage into force or pressure. As another example, a speaker converts electrical signals into audible acoustic waves.

An actuator 32 may be one of a variety of actuators. For example, an actuator 32 is one of a comb drive, a digital micro-mirror device, an electric motor, an electroactive polymer, a hydraulic cylinder, a piezoelectric actuator, a pneumatic actuator, a screw jack, a servomechanism, a solenoid, a stepper motor, a shape-memory allow, a thermal bimorph, and a hydraulic actuator.

The various types of actuators have a variety of actuators characteristics that are factors in providing power to the actuator and sending signals to the actuators for desired performance. The actuator characteristics include resistance, reactance, power requirements, sensitivity, range, stability, repeatability, linearity, error, response time, and/or frequency response. For example, the resistance, reactance, and power requirements are factors in determining drive circuit requirements. As another example, sensitivity, stability, and/or linear are factors for generating the signaling to send to the actuator to obtain the desired physical output condition.

The computing devices 12, 14, and 18 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. The computing devices 12, 14, and 18 will be discussed in greater detail with reference to one or more of FIGS. 2-4.

A server 22 is a special type of computing device that is optimized for processing large amounts of data requests in parallel. A server 22 includes similar components to that of the computing devices 12, 14, and/or 18 with more robust processing modules, more main memory, and/or more hard drive memory (e.g., solid state, hard drives, etc.). Further, a server 22 is typically accessed remotely; as such it does not generally include user input devices and/or user output devices. In addition, a server may be a standalone separate computing device and/or may be a cloud computing device.

A database 24 is a special type of computing device that is optimized for large scale data storage and retrieval. A database 24 includes similar components to that of the computing devices 12, 14, and/or 18 with more hard drive memory (e.g., solid state, hard drives, etc.) and potentially with more processing modules and/or main memory. Further, a database 24 is typically accessed remotely; as such it does not generally include user input devices and/or user output devices. In addition, a database 24 may be a stand-alone separate computing device and/or may be a cloud computing device.

The network 26 includes one more local area networks (LAN) and/or one or more wide area networks WAN), which may be a public network and/or a private network. A LAN may be a wireless-LAN (e.g., Wi-Fi access point, Bluetooth, ZigBee, etc.) and/or a wired network (e.g., Firewire, Ethernet, etc.). A WAN may be a wired and/or wireless WAN. For example, a LAN may be a personal home or business's wireless network and a WAN is the Internet, cellular telephone infrastructure, and/or satellite communication infrastructure.

In an example of operation, computing device 12-1 communicates with a plurality of drive-sense circuits 28, which, in turn, communicate with a plurality of sensors 30. The sensors 30 and/or the drive-sense circuits 28 are within the computing device 12-1 and/or external to it. For example, the sensors 30 may be external to the computing device 12-1 and the drive-sense circuits are within the computing device 12-1. As another example, both the sensors 30 and the drive-sense circuits 28 are external to the computing device 12-1. When the drive-sense circuits 28 are external to the computing device, they are coupled to the computing device 12-1 via wired and/or wireless communication links.

The computing device 12-1 communicates with the drive-sense circuits 28 to; (a) turn them on, (b) obtain data from the sensors (individually and/or collectively), (c) instruct the drive sense circuit on how to communicate the sensed data to the computing device 12-1, (d) provide signaling attributes (e.g., DC level, AC level, frequency, power level, regulated current signal, regulated voltage signal, regulation of an impedance, frequency patterns for various sensors, different frequencies for different sensing applications, etc.) to use with the sensors, and/or (e) provide other commands and/or instructions.

As a specific example, the sensors 30 are distributed along a pipeline to measure flow rate and/or pressure within a section of the pipeline. The drive-sense circuits 28 have their own power source (e.g., battery, power supply, etc.) and are proximally located to their respective sensors 30. At desired time intervals (milliseconds, seconds, minutes, hours, etc.), the drive-sense circuits 28 provide a regulated source signal or a power signal to the sensors 30. An electrical characteristic of the sensor 30 affects the regulated source signal or power signal, which is reflective of the condition (e.g., the flow rate and/or the pressure) that sensor is sensing.

The drive-sense circuits 28 detect the effects on the regulated source signal or power signals as a result of the electrical characteristics of the sensors. The drive-sense circuits 28 then generate signals representative of change to the regulated source signal or power signal based on the detected effects on the power signals. The changes to the regulated source signals or power signals are representative of the conditions being sensed by the sensors 30.

The drive-sense circuits 28 provide the representative signals of the conditions to the computing device 12-1. A representative signal may be an analog signal or a digital signal. In either case, the computing device 12-1 interprets the representative signals to determine the pressure and/or flow rate at each sensor location along the pipeline. The computing device may then provide this information to the server 22, the database 24, and/or to another computing device for storing and/or further processing.

As another example of operation, computing device 12-2 is coupled to a drive-sense circuit 28, which is, in turn, coupled to a senor 30. The sensor 30 and/or the drive-sense circuit 28 may be internal and/or external to the computing device 12-2. In this example, the sensor 30 is sensing a condition that is particular to the computing device 12-2. For example, the sensor 30 may be a temperature sensor, an ambient light sensor, an ambient noise sensor, etc. As described above, when instructed by the computing device 12-2 (which may be a default setting for continuous sensing or at regular intervals), the drive-sense circuit 28 provides the regulated source signal or power signal to the sensor 30 and detects an effect to the regulated source signal or power signal based on an electrical characteristic of the sensor. The drive-sense circuit generates a representative signal of the affect and sends it to the computing device 12-2.

In another example of operation, computing device 12-3 is coupled to a plurality of drive-sense circuits 28 that are coupled to a plurality of sensors 30 and is coupled to a plurality of drive-sense circuits 28 that are coupled to a plurality of actuators 32. The generally functionality of the drive-sense circuits 28 coupled to the sensors 30 in accordance with the above description.

Since an actuator 32 is essentially an inverse of a sensor in that an actuator converts an electrical signal into a physical condition, while a sensor converts a physical condition into an electrical signal, the drive-sense circuits 28 can be used to power actuators 32. Thus, in this example, the computing device 12-3 provides actuation signals to the drive-sense circuits 28 for the actuators 32. The drive-sense circuits modulate the actuation signals on to power signals or regulated control signals, which are provided to the actuators 32. The actuators 32 are powered from the power signals or regulated control signals and produce the desired physical condition from the modulated actuation signals.

As another example of operation, computing device 12-x is coupled to a drive-sense circuit 28 that is coupled to a sensor 30 and is coupled to a drive-sense circuit 28 that is coupled to an actuator 32. In this example, the sensor 30 and the actuator 32 are for use by the computing device 12-x. For example, the sensor 30 may be a piezoelectric microphone and the actuator 32 may be a piezoelectric speaker.

As yet another example of operation, computing device 12 is coupled to a plurality of drive sense circuits (DSC) 28, which are coupled to a plurality of sensors. In this example, the plurality of sensors form an array to sense an item (person, animal, object, thing, etc.) and produces three-dimensional data. As a specific example, and ultrasound produces three-dimensional data. As another specific example, sonar produces three-dimensional data. As a further specific example, high frequency radar systems provide three-dimensional data.

The three-dimensional data can be utilized in a variety of ways. For example, the three-dimensional data is displayed on a display of the computing device coupled to the drive sense circuits. As another example, the three-dimensional data is sent to another computing device for processing (e.g., display, analysis, filtering, storage, etc.). Depending on the number of sensors, the bit size of each sensor sample, and the rate of sensing, the three-dimensional data can be very large (e.g., 100 Megabits per second (Mbps) or more). With such high data rates, especially when multiple computing devices are generating three-dimensional data, compressing the three-dimensional data is beneficial. The benefits include reduced data rates, expanding analysis of three-dimensional data from one or more sources, reduced memory requirements, and/or reduced processing requirements.

While the benefits are clear, how to compress three-dimensional data involves a series of specific processes to ensure that the three-dimensional data is adequately compressed and yet preserves the desired use, or uses, of the data. For example, one data compression technique may be adequate for a first type of use the three-dimensional data, but inadequate for another type of use of the data. In another example, a multi-step approach to data reduction is needed to preserve the intended use, or uses.

Figure 2:
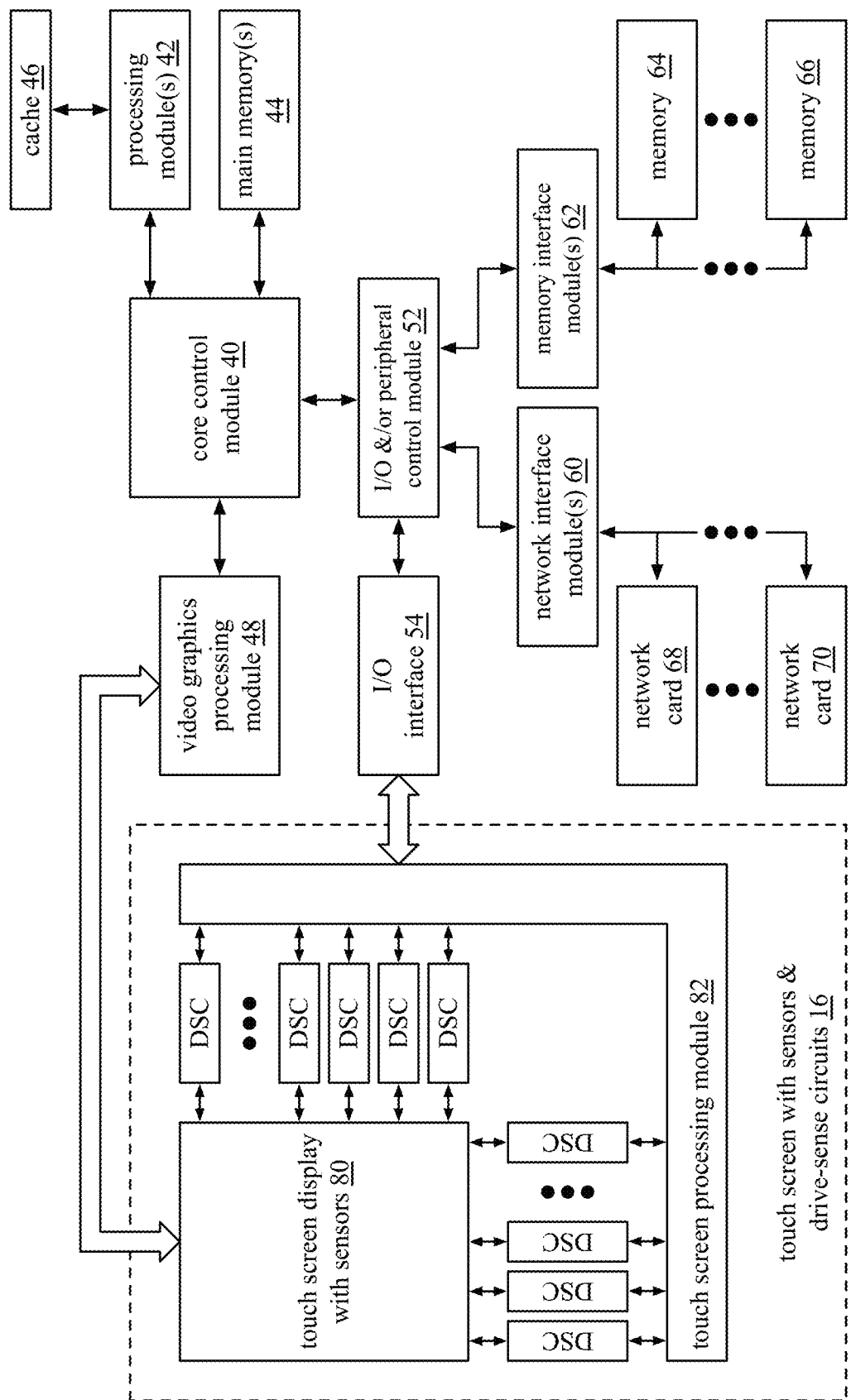
FIG. 2 is a schematic block diagram of an embodiment of a computing device in accordance with the present invention.

FIG. 2 is a schematic block diagram of an embodiment of a computing device 12 (e.g., any one of 12-1 through 12-$x$). The computing device 12 includes a touch screen 16, a core control module 40, one or more processing modules 42, one or more main memories 44, cache memory 46, a video graphics processing module 48, a display 50, an Input-Output (I/O) peripheral control module 52, one or more input interface modules 56, one or more output interface modules 58, one or more network interface modules 60, and one or more memory interface modules 62. A processing module 42 is described in greater detail at the end of the detailed description of the invention section and, in an alternative embodiment, has a direction connection to the main memory 44. In an alternate embodiment, the core control module 40 and the I/O and/or peripheral control module 52 are one module, such as a chipset, a quick path interconnect (QPI), and/or an ultra-path interconnect (UPI).

The touch screen 16 includes a touch screen display 80, a plurality of sensors 30, a plurality of drive-sense circuits (DSC), and a touch screen processing module 82. In general, the sensors (e.g., electrodes, capacitor sensing cells, capacitor sensors, inductive sensor, etc.) detect a proximal touch of the screen. For example, when one or more fingers touches the screen, capacitance of sensors proximal to the touch(es) are affected (e.g., impedance changes). The drive-sense circuits (DSC) coupled to the affected sensors detect the change and provide a representation of the change to the touch screen processing module 82, which may be a separate processing module or integrated into the processing module 42. In an alternate embodiment, the touch screen 16 does not include a display, it just includes touch sensor array.

The touch screen processing module 82 processes the representative signals from the drive-sense circuits (DSC) to determine the location of the touch(es). This information is inputted to the processing module 42 for processing as an input. For example, a touch represents a selection of a button on screen, a scroll function, a zoom in-out function, etc.

Each of the main memories 44 includes one or more Random Access Memory (RAM) integrated circuits, or chips. For example, a main memory 44 includes four DDR4 (4$^{th}$ generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieve from memory 64-66 are the data and/or operational instructions requested by the processing module or will most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memory 64-66 is coupled to the core control module 40 via the I/O and/or peripheral control module 52 and via one or more memory interface modules 62. In an embodiment, the I/O and/or peripheral control module 52 includes one or more Peripheral Component Interface (PCI) buses to which peripheral components connect to the core control module 40. A memory interface module 62 includes a software driver and a hardware connector for coupling a memory device to the I/O and/or peripheral control module 52. For example, a memory interface 62 is in accordance with a Serial Advanced Technology Attachment (SATA) port.

The core control module 40 coordinates data communications between the processing module(s) 42 and the network(s) 26 via the I/O and/or peripheral control module 52, the network interface module(s) 60, and a network card 68 or 70. A network card 68 or 70 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 60 includes a software driver and a hardware connector for coupling the network card to the I/O and/or peripheral control module 52. For example, the network interface module 60 is in accordance with one or more versions of IEEE 802.11, cellular telephone protocols, 10/100/1000 Gigabit LAN protocols, etc.

The core control module 40 coordinates data communications between the processing module(s) 42 and input device(s) 72 via the input interface module(s) 56 and the I/O and/or peripheral control module 52. An input device 72 includes a keypad, a keyboard, control switches, a touchpad, a microphone, a camera, etc. An input interface module 56 includes a software driver and a hardware connector for coupling an input device to the I/O and/or peripheral control module 52. In an embodiment, an input interface module 56 is in accordance with one or more Universal Serial Bus (USB) protocols.

The core control module 40 coordinates data communications between the processing module(s) 42 and output device(s) 74 via the output interface module(s) 58 and the I/O and/or peripheral control module 52. An output device 74 includes a speaker, etc. An output interface module 58 includes a software driver and a hardware connector for coupling an output device to the I/O and/or peripheral control module 52. In an embodiment, an output interface module 56 is in accordance with one or more audio codec protocols.

The processing module 42 communicates directly with a video graphics processing module 48 to display data on the display 50. The display 50 includes an LED (light emitting diode) display, an LCD (liquid crystal display), and/or other type of display technology. The display has a resolution, an aspect ratio, and other features that affect the quality of the display. The video graphics processing module 48 receives data from the processing module 42, processes the data to produce rendered data in accordance with the characteristics of the display, and provides the rendered data to the display 50.

Figure 3:
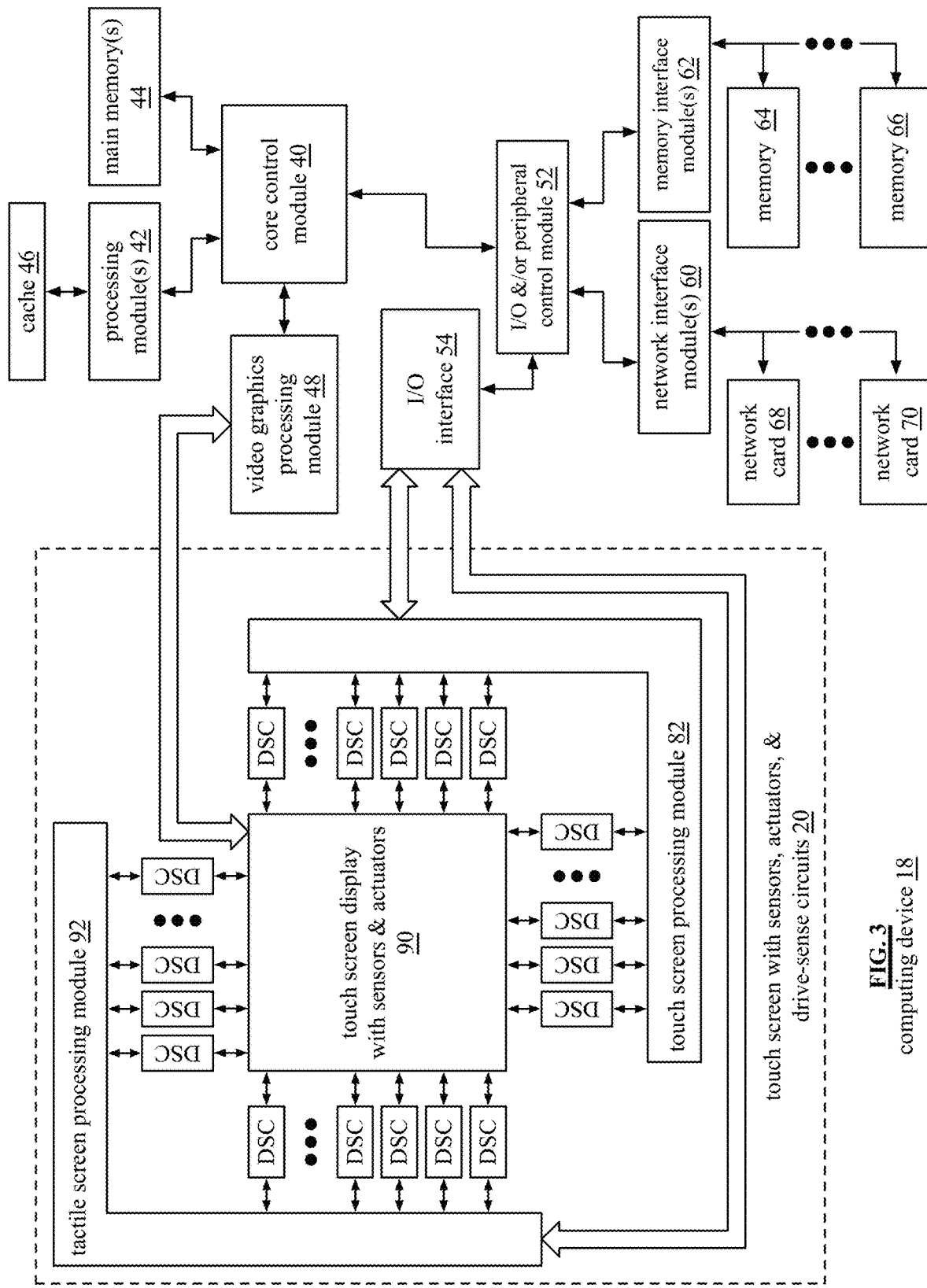
FIG. 3 is a schematic block diagram of another embodiment of a computing device in accordance with the present invention.

FIG. 3 is a schematic block diagram of another embodiment of a computing device 18 that includes a core control module 40, one or more processing modules 42, one or more main memories 44, cache memory 46, a video graphics processing module 48, a touch and tactile screen 20, an Input-Output (I/O) peripheral control module 52, one or more input interface modules 56, one or more output interface modules 58, one or more network interface modules 60, and one or more memory interface modules 62. The touch and tactile screen 20 includes a touch and tactile screen display 90, a plurality of sensors 30, a plurality of actuators 32, a plurality of drive-sense circuits (DSC), a touch screen processing module 82, and a tactile screen processing module 92.

Computing device 18 operates similarly to computing device 14 of FIG. 2 with the addition of a tactile aspect to the screen 20 as an output device. The tactile portion of the screen 20 includes the plurality of actuators (e.g., piezoelectric transducers to create vibrations, solenoids to create movement, etc.) to provide a tactile feel to the screen 20. To do so, the processing module creates tactile data, which is provided to the appropriate drive-sense circuits (DSC) via the tactile screen processing module 92, which may be a stand-alone processing module or integrated into processing module 42. The drive-sense circuits (DSC) convert the tactile data into drive-actuate signals and provide them to the appropriate actuators to create the desired tactile feel on the screen 20.

Figure 4:
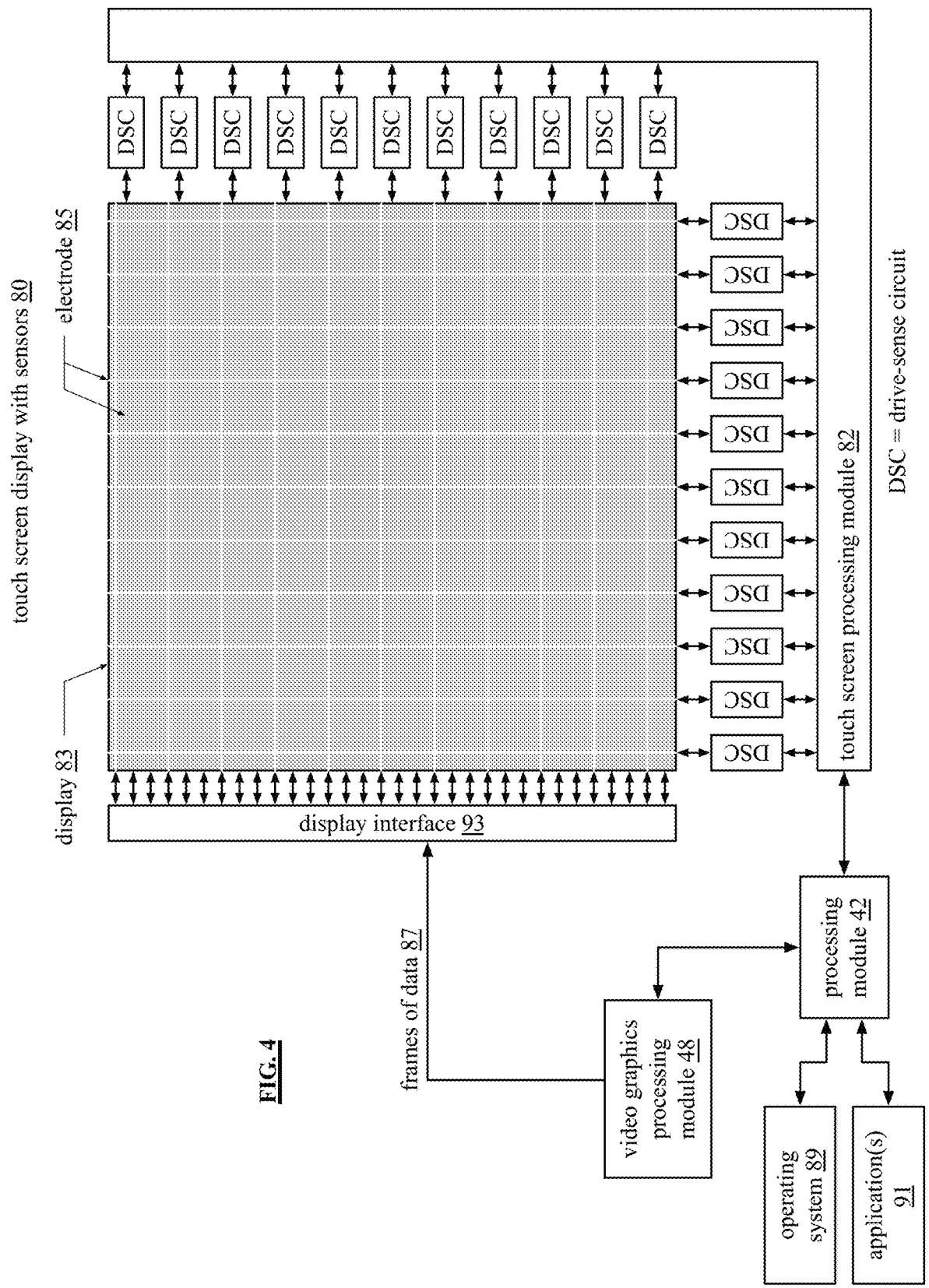
FIG. 4 is a schematic block diagram of an embodiment of a touch screen display in accordance with the present invention.

FIG. 4 is a schematic block diagram of an embodiment of a touch screen display 80 that includes a plurality of drive-sense circuits (DSC), a touch screen processing module 82, a display 83, and a plurality of electrodes 85. The touch screen display 80 is coupled to a processing module 42, a video graphics processing module 48, and a display interface 93, which are components of a computing device (e.g., 14-18), an interactive display, or other device that includes a touch screen display. An interactive display functions to provide users with an interactive experience (e.g., touch the screen to obtain information, be entertained, etc.). For example, a store provides interactive displays for customers to find certain products, to obtain coupons, to enter contests, etc.

There are a variety of other devices that include a touch screen display. For example, a vending machine includes a touch screen display to select and/or pay for an item. As another example of a device having a touch screen display is an Automated Teller Machine (ATM). As yet another example, an automobile includes a touch screen display for entertainment media control, navigation, climate control, etc.

The touch screen display 80 includes a large display 83 that has a resolution equal to or greater than full high-definition (HD), an aspect ratio of a set of aspect ratios, and a screen size equal to or greater than thirty-two inches. The following table lists various combinations of resolution, aspect ratio, and screen size for the display 83, but it's not an exhaustive list.

| Resolution | Width (lines) | Height (lines) | pixel aspect ratio | screen aspect ratio | screen size (inches) |
|---|---|---|---|---|---|
| HD (high definition) | 1280 | 720 | 1:1 | 16:9 | 32, 40, 43, 50, 55, 60, 65, 70, 75, &/or >80 |
| Full HD | 1920 | 1080 | 1:1 | 16:9 | 32, 40, 43, 50, 55, 60, 65, 70, 75, &/or >80 |
| HD | 960 | 720 | 4:3 | 16:9 | 32, 40, 43, 50, 55, 60, 65, 70, 75, &/or >80 |
| HD | 1440 | 1080 | 4:3 | 16:9 | 32, 40, 43, 50, 55, 60, 65, 70, 75, &/or >80 |
| HD | 1280 | 1080 | 3:2 | 16:9 | 32, 40, 43, 50, 55, 60, 65, 70, 75, &/or >80 |

-continued

| Resolution | Width (lines) | Height (lines) | pixel aspect ratio | screen aspect ratio | screen size (inches) |
|---|---|---|---|---|---|
| QHD (quad HD) | 2560 | 1440 | 1:1 | 16:9 | 32, 40, 43, 50, 55, 60, 65, 70, 75, &/or >80 |
| UHD (Ultra HD) or 4K | 3840 | 2160 | 1:1 | 16:9 | 32, 40, 43, 50, 55, 60, 65, 70, 75, &/or >80 |
| 8K | 7680 | 4320 | 1:1 | 16:9 | 32, 40, 43, 50, 55, 60, 65, 70, 75, &/or >80 |
| HD and above | 1280->=7680 | 720->=4320 | 1:1, 2:3, etc. | 2:3 | 50, 55, 60, 65, 70, 75, &/or >80 |

The display 83 is one of a variety of types of displays that is operable to render frames of data into visible images. For example, the display is one or more of: a light emitting diode (LED) display, an electroluminescent display (ELD), a plasma display panel (PDP), a liquid crystal display (LCD), an LCD high performance addressing (HPA) display, an LCD thin film transistor (TFT) display, an organic light emitting diode (OLED) display, a digital light processing (DLP) display, a surface conductive electron emitter (SED) display, a field emission display (FED), a laser TV display, a carbon nanotubes display, a quantum dot display, an interferometric modulator display (IMOD), and a digital microshutter display (DMS). The display is active in a full display mode or a multiplexed display mode (i.e., only part of the display is active at a time).

The display 83 further includes integrated electrodes 85 that provide the sensors for the touch sense part of the touch screen display. The electrodes 85 are distributed throughout the display area or where touch screen functionality is desired. For example, a first group of the electrodes are arranged in rows and a second group of electrodes are arranged in columns. As will be discussed in greater detail with reference to one or more of FIGS. 9-12, the row electrodes are separated from the column electrodes by a dielectric material.

The electrodes 85 are comprised of a transparent conductive material and are in-cell or on-cell with respect to layers of the display. For example, a conductive trace is placed in-cell or on-cell of a layer of the touch screen display. The transparent conductive material, which is substantially transparent and has negligible effect on video quality of the display with respect to the human eye. For instance, an electrode is constructed from one or more of: Indium Tin Oxide, Graphene, Carbon Nanotubes, Thin Metal Films, Silver Nanowires Hybrid Materials, Aluminum-doped Zinc Oxide (AZO), Amorphous Indium-Zinc Oxide, Gallium-doped Zinc Oxide (GZO), and poly polystyrene sulfonate (PEDOT).

In an example of operation, the processing module 42 is executing an operating system application 89 and one or more user applications 91. The user applications 91 includes, but is not limited to, a video playback application, a spreadsheet application, a word processing application, a computer aided drawing application, a photo display application, an image processing application, a database application, etc. While executing an application 91, the processing module generates data for display (e.g., video data, image data, text data, etc.). The processing module 42 sends the data to the video graphics processing module 48, which converts the data into frames of video 87.

The video graphics processing module 48 sends the frames of video 87 (e.g., frames of a video file, refresh rate for a word processing document, a series of images, etc.) to the display interface 93. The display interface 93 provides the frames of video to the display 83, which renders the frames of video into visible images.

While the display 83 is rendering the frames of video into visible images, the drive-sense circuits (DSC) provide sensor signals to the electrodes 85. When the screen is touched, capacitance of the electrodes 85 proximal to the touch (i.e., directly or close by) is changed. The DSCs detect the capacitance change for effected electrodes and provide the detected change to the touch screen processing module 82.

The touch screen processing module 82 processes the capacitance change of the effected electrodes to determine one or more specific locations of touch and provides this information to the processing module 42. Processing module 42 processes the one or more specific locations of touch to determine if an operation of the application is to be altered. For example, the touch is indicative of a pause command, a fast forward command, a reverse command, an increase volume command, a decrease volume command, a stop command, a select command, a delete command, etc.

Figure 5:
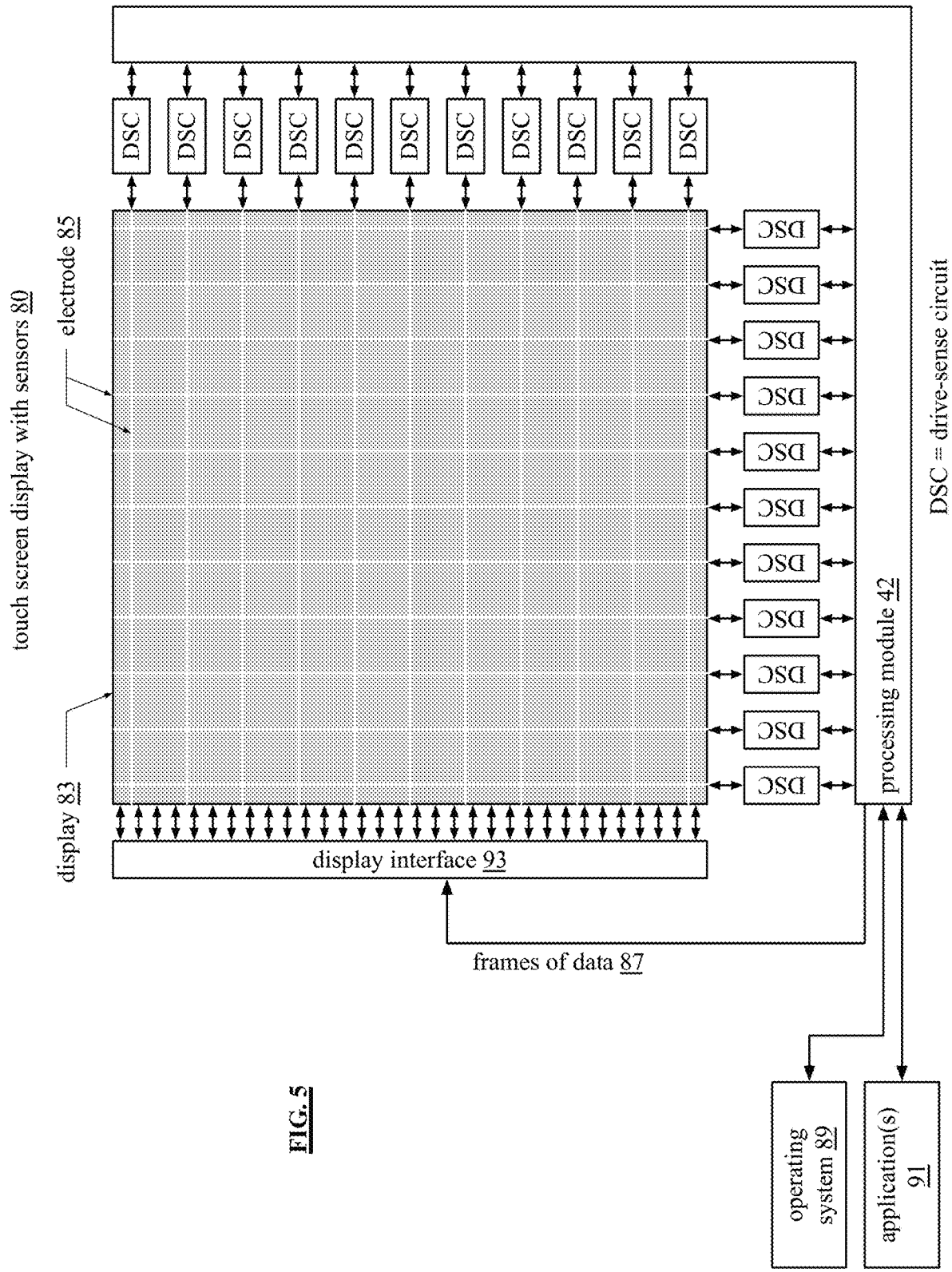
FIG. 5 is a schematic block diagram of another embodiment of a touch screen display in accordance with the present invention.

FIG. 5 is a schematic block diagram of another embodiment of a touch screen display 80 that includes a plurality of drive-sense circuits (DSC), the processing module 42, a display 83, and a plurality of electrodes 85. The processing module 42 is executing an operating system 89 and one or more user applications 91 to produce frames of data 87. The processing module 42 provides the frames of data 87 to the display interface 93. The touch screen display 80 operates similarly to the touch screen display 80 of FIG. 4 with the above noted differences. In an alternate embodiment, the touch screen displays of FIGS. 4 and 5 do not include a display but still include a touch sensory array of electrodes.

Figure 6:
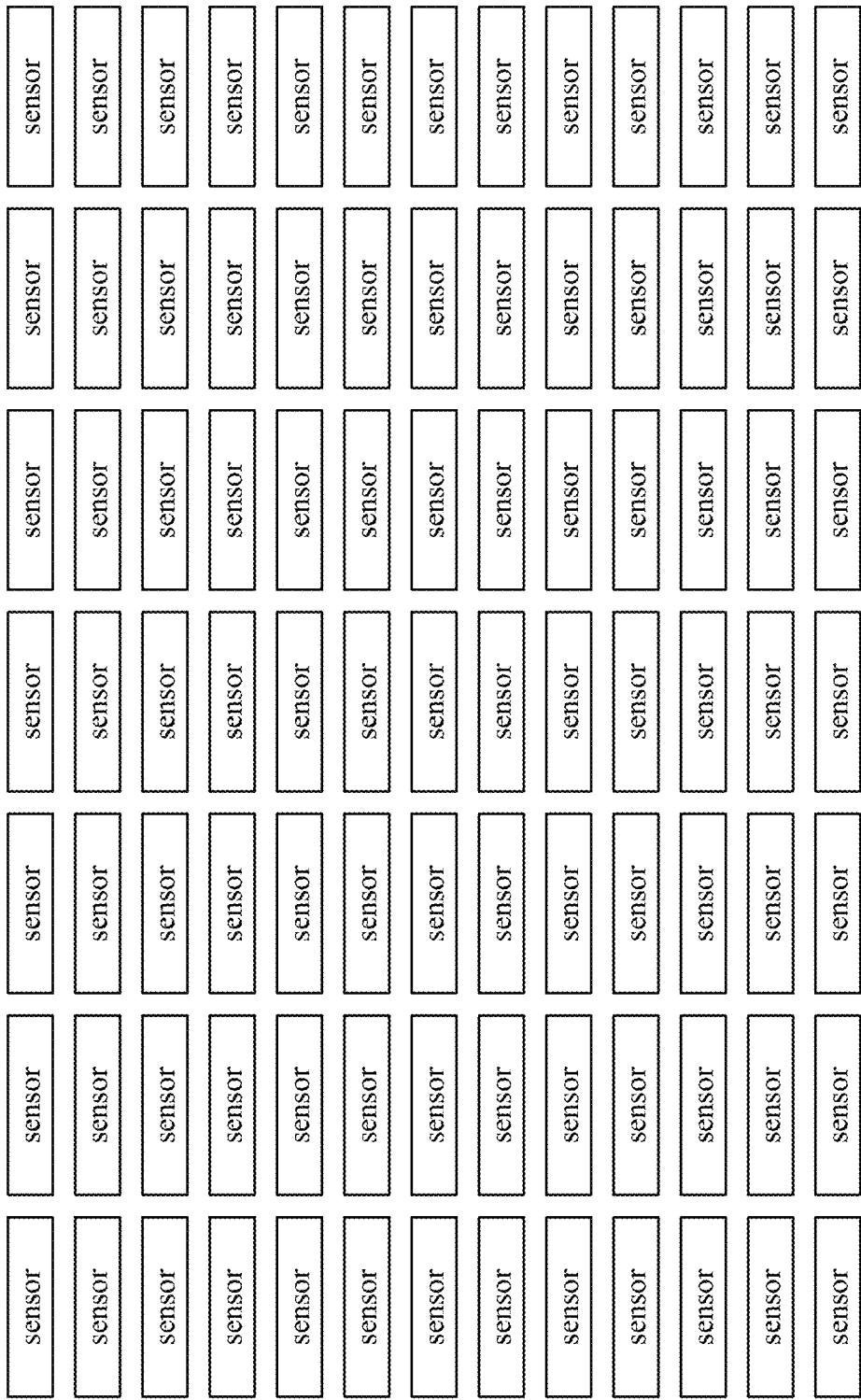
FIG. 6 is a schematic block diagram of an embodiment of a sensor grid for three-dimensional imaging in accordance with the present invention.

FIG. 6 is a schematic block diagram of an embodiment of a sensor grid 179 for three-dimensional imaging. The sensor grid 179 includes a plurality of sensors arranged in rows and columns, or in some other pattern. The sensors sense specific areas of an item (e.g., a person, an object, an animal, a touch pad, a thing, etc.) in a manner to produce a frame of sensor grid data 177. The number of frames per second of the sensor grid data 177 is dependent on the application. For example, of sensing touches or hover movements, the frame rate is 100 Hz to 300 Hz or more.

In an example, the drive sense circuits provide signals in the ultrasonic and/or radio frequency (RF) frequency range to the sensors. The sensors are positioned proximal to an item under test. As a specific example, the item under test may be a body part and the sensors are receiving ultrasonic signals to sense an ultrasound image of the body part. The reflection and/or refraction of the ultrasonic signals are detected by the sensors, which causes an electrical characteristic (e.g., voltage, current, impedance, frequency response, reactance, etc.) of the sensors to change.

The drive sense circuit detect the change in the sensors to produce drive sense data. The processing module 42 and/or 82 of the computing device processes the drive sense data to produce reduced three-dimensional data. The processing of drive sense data into reduced three-dimensional data will be discussed with reference to one or more of the subsequent figures.

Figure 7A:
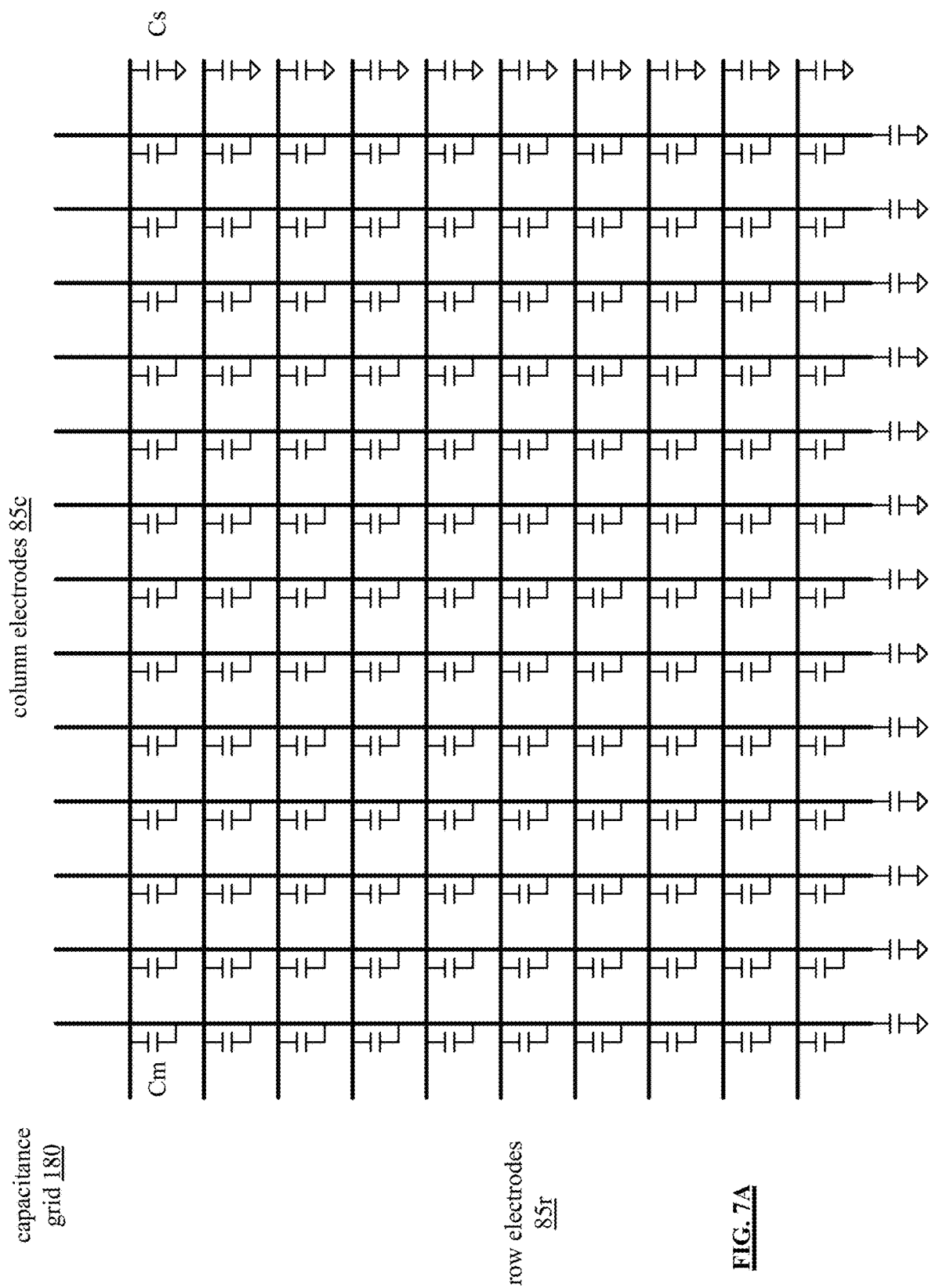
FIG. 7A is a schematic block diagram of an embodiment of a capacitive grid of a touch screen in accordance with the present invention.

FIG. 7A is a schematic block diagram of an embodiment of a capacitive grid 180 of a touch screen of a computing device. The capacitive grid 180 is formed by a plurality of column electrodes 85c intersecting with a plurality of row electrodes 85r. For each intersection of a row and column electrode, a mutual capacitance (Cm) exists. In addition, each electrode (row and column) has a self-capacitance (Cs) with respect to a ground reference of the touch screen. As such, the capacitive grid 180 includes a plurality of mutual capacitances (Cm) and a plurality of self-capacitances (Cs), where the number of mutual capacitances equals the number of rows multiplied by the number of columns and the number self-capacitances equal the number of rows plus the number of columns.

Figure 7B:
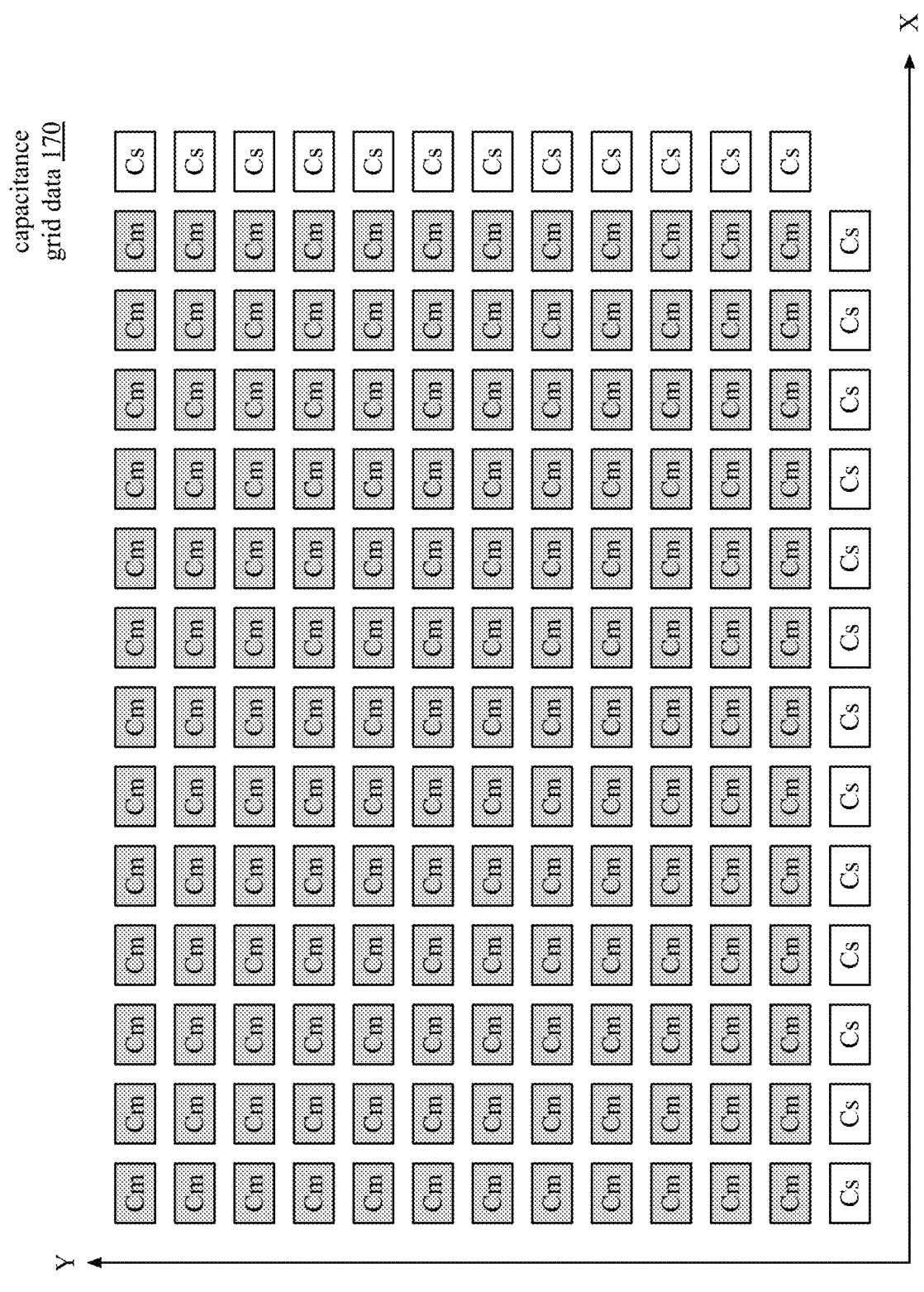
FIG. 7B is a schematic block diagram of an embodiment of a capacitive grid data of a touch screen in accordance with the present invention.

FIG. 7B is a schematic block diagram of an embodiment of a capacitive grid data 170 of a touch screen, which corresponds to the capacitive grid 180 of FIG. 7A. The capacitive grid data 170 includes a capacitance value for each mutual capacitance of the capacitive grid 180 and for each self-capacitance of the capacitive grid. In an alternative embodiment, the capacitive grid data 170 includes a sub-set of the mutual capacitances and/or a sub-set of the self-capacitances.

The capacitive grid data 170 is mapped to an x-y-z coordinate system (only x and y are shown in this figure). The x-y-z coordinate system allows for stimulus of the touch screen, which are detected by changes to capacitance values of mutual capacitors and/or of self-capacitors, to be mapped to a position on the touch screen. In particular, each mutual capacitance has an x-y-z coordinate, where the z coordinate corresponds to the degree of capacitance change. Each self-capacitance has a x-z coordinate (i.e., the self-capacitances along the x-axis) or a y-z coordinate (i.e., the self-capacitances along the y-axis). The capacitive grid data 170 is created for each sampling interval of the touch screen, which may vary from 30 Hz to 300 Hz or more.

In general, changes to the self and/or mutual capacitances result from changes in the dielectric properties of the capacitances. For example, when a human touches the screen, self-capacitance increases and mutual capacitance decreases due the dielectric properties of the person and the coupling of the person to the ground reference of the computing device. In another example, when an object is placed on the touch screen without a connection to ground, the mutual capacitances will increase or decrease depending on the dielectric properties of the object. This allows for different types of objects to be identified.

In many instances, on a frame-by-frame basis of capacitance grid data, only a small portion of the mutual and/or self capacitances are affected. Depending on the desired use of the capacitance grid data (e.g., detect a human touch, detect a pen touch, detect a hover, detect an object, detect a pattern, and/or detect an element of a screen-to-screen communication), a full frame of capacitance grid data may or may not be needed. The larger the touch screen, the more capacitance values per frame, which yields a large amount of data to be transmitted per frame. To preserve (without loss or with an acceptable level of loss) the information contained in the capacitive grid data 170 while reducing the amount of data being transmitted per frame, a variety of data reduction schemes can be employed. The various schemes and the mechanisms for determining how, when, and what to use will discussed with reference to one or more of the following figures.

Figure 8A:
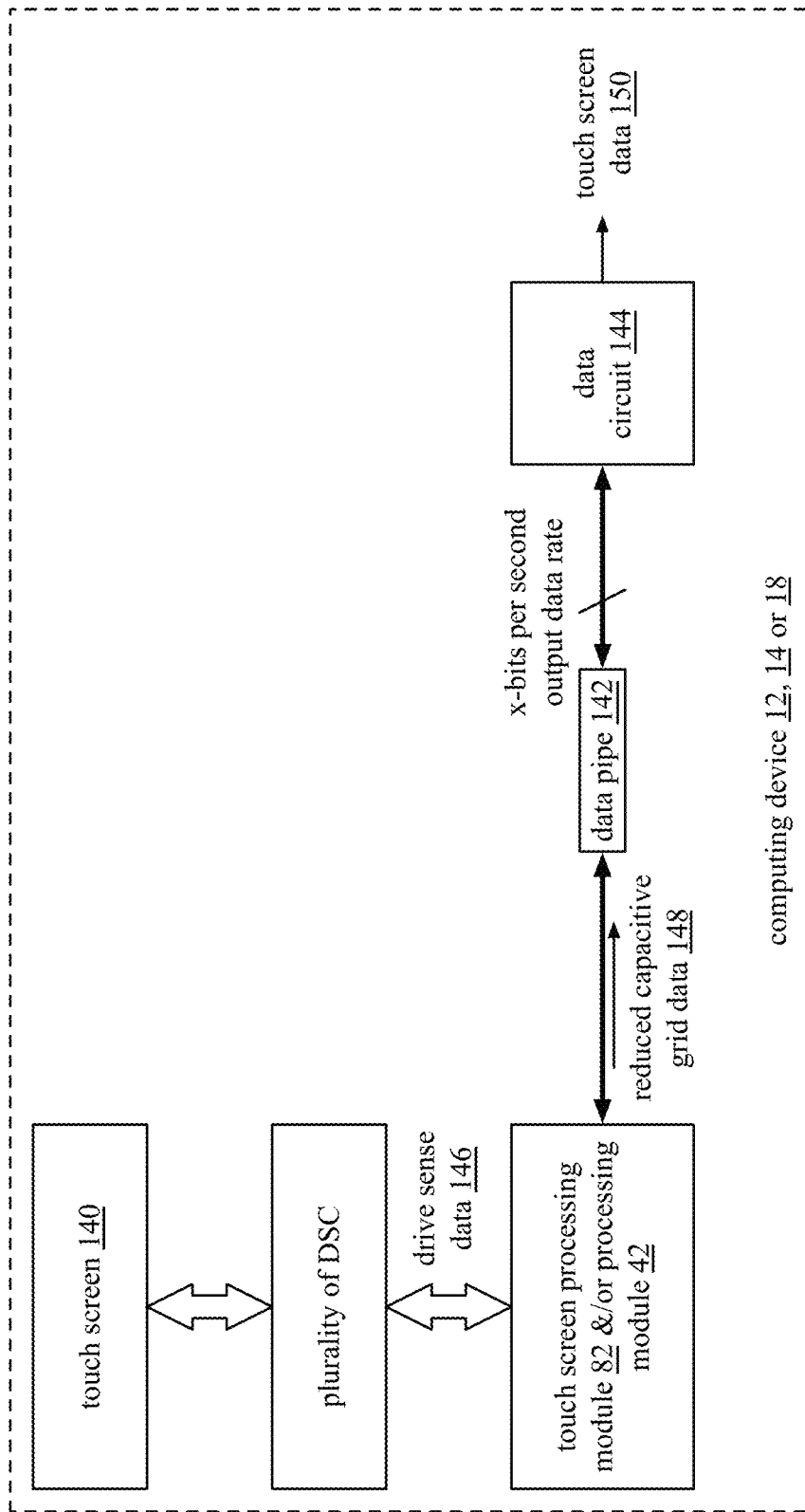
FIG. 8A is a schematic block diagram of an embodiment of a computing device that includes data reduction for touch screen data in accordance with the present invention.

FIG. 8A is a schematic block diagram of an embodiment of a computing device 12, 14, or 18 that includes a touch screen 140, a plurality of drive sense circuits (DSC), a processing module 42 and/or 82, a data communication medium (e.g., a data pipe 142), and a data circuit 144. The touch screen 140 may be a stand-alone touch screen (i.e., includes row and column electrodes, but no display function) or may be part of a touch screen display (e.g., 80 of FIG. 2, 90 of FIG. 3, 83 of FIG. 4 and/or FIG. 5). The data communication medium may be a wire, a bus, a USB connection, an HDMI connection, a wireless connection, an I2C connection, or other type of connection. Each physical connection medium has a corresponding data communication protocol, which define the data formatting and prescribe a maximum data rate (e.g., x-bits per second output data rate).

In an example of operation, the plurality of drive sense circuits (DSC) provides drive signals to the electrodes of the touch screen 140 and determines effects on the drive signals. The effects on the drive signals correspond to the capacitance values of the self and mutual capacitances of the capacitive grid of the touch screen and comprise the drive sense data 146. The processing module 42 and/or 82 process the drive sense data 146 to produce the capacitive grid data, which includes a capacitance value for at least some of the mutual capacitances and self-capacitances.

Depending on the intended use of the data, the output data rate of the data pipe 142, and amount of capacitance grid data (which typically corresponds to the size of the touch screen and resolution of touch sensitivity (e.g., spacing between electrodes)), the processing module 42 and/or 82 employs a data reduction scheme to produce reduced capacitive grid data 148.

The data circuit 144 receives the reduced capacitive data 148 via the data pipe 142 and produces touch screen data 150 therefrom. In general, the touch screen data 150 corresponds to the meaning of the changes of the capacitive grid data from frame to frame. For example, the meaning corresponds to a touch, a hover, a pattern, an object, and/or a screen-to-screen communication element.

In an example, the data circuit 144 is a video graphics processor coupled to a display for processing and displaying the reduced capacitive grid data 148 into a video graphics overlay (e.g., the touch screen data 150) indicating a human touch, pen touch, and/or hover with respect to an underlying graphic, image, or video. In another example, the data circuit 144 is a co-processor to process the reduced capacitive grid data 148 to identify a pattern, which the pattern provides an identification of an item. In yet another example, the data circuit 144 is a storage service (e.g., cloud storage) for storing the touch screen data 150. One or more embodiments of the data circuit 144 will be discussed with reference to one or more subsequent Figures.

Figure 8B:
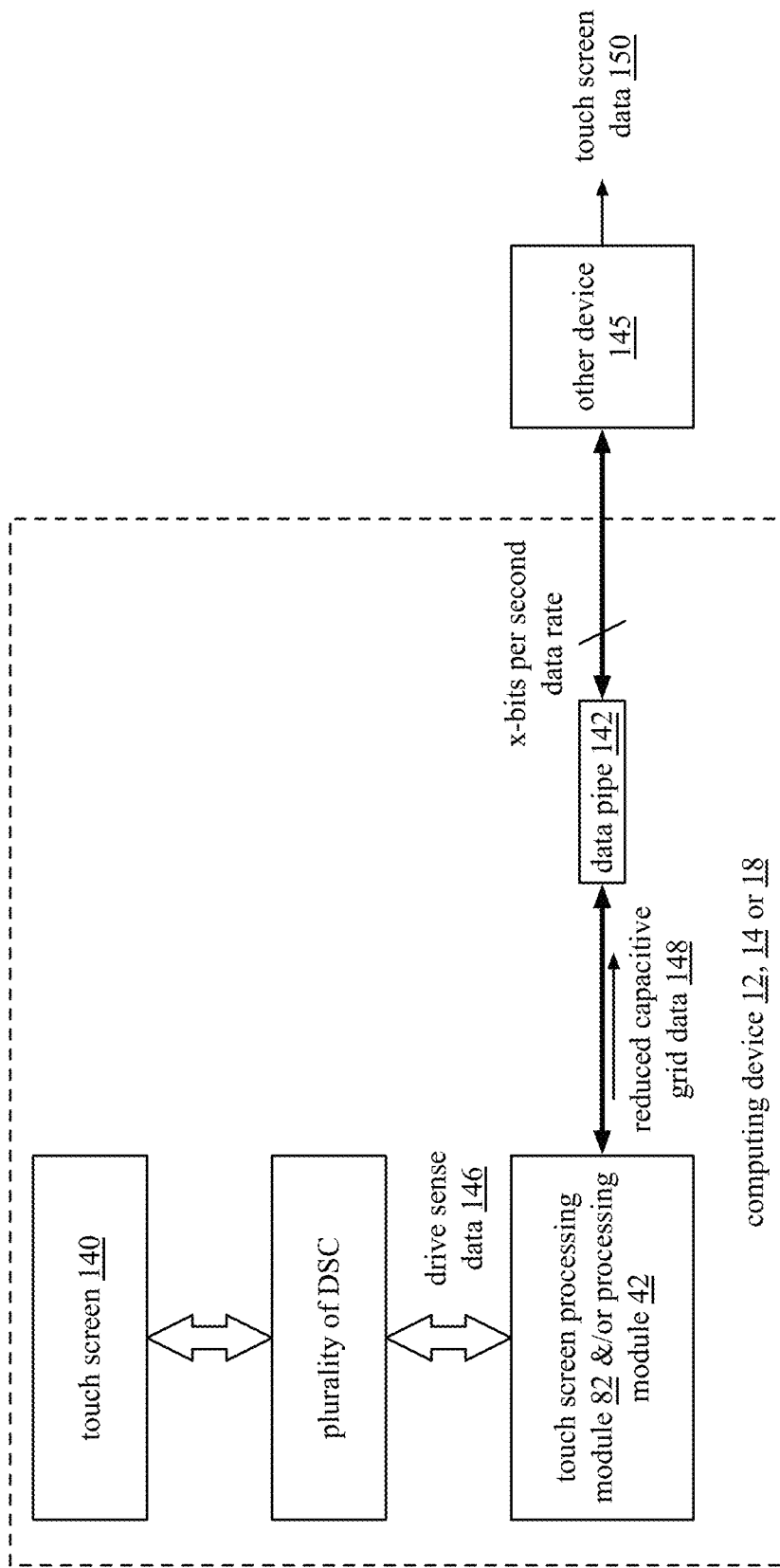
FIG. 8B is a schematic block diagram of another embodiment of a computing device that includes data reduction for touch screen data in accordance with the present invention.

FIG. 8B is a schematic block diagram of another embodiment of a computing device 12, 14, and/or 18 that is similar to the computing device of FIG. 8A with a difference being the data circuit 145 is external to the computing device. The data circuit 145 may be a variety of devices. For example, the data circuit 145 is a remote display, which includes a video graphics processing module. As another example, the data circuit 145 is another computing device. As yet another example, the data circuit 145 is a server of the communication system 10. As a further example, the data circuit 145 is a remote storage device.

Figure 9A:
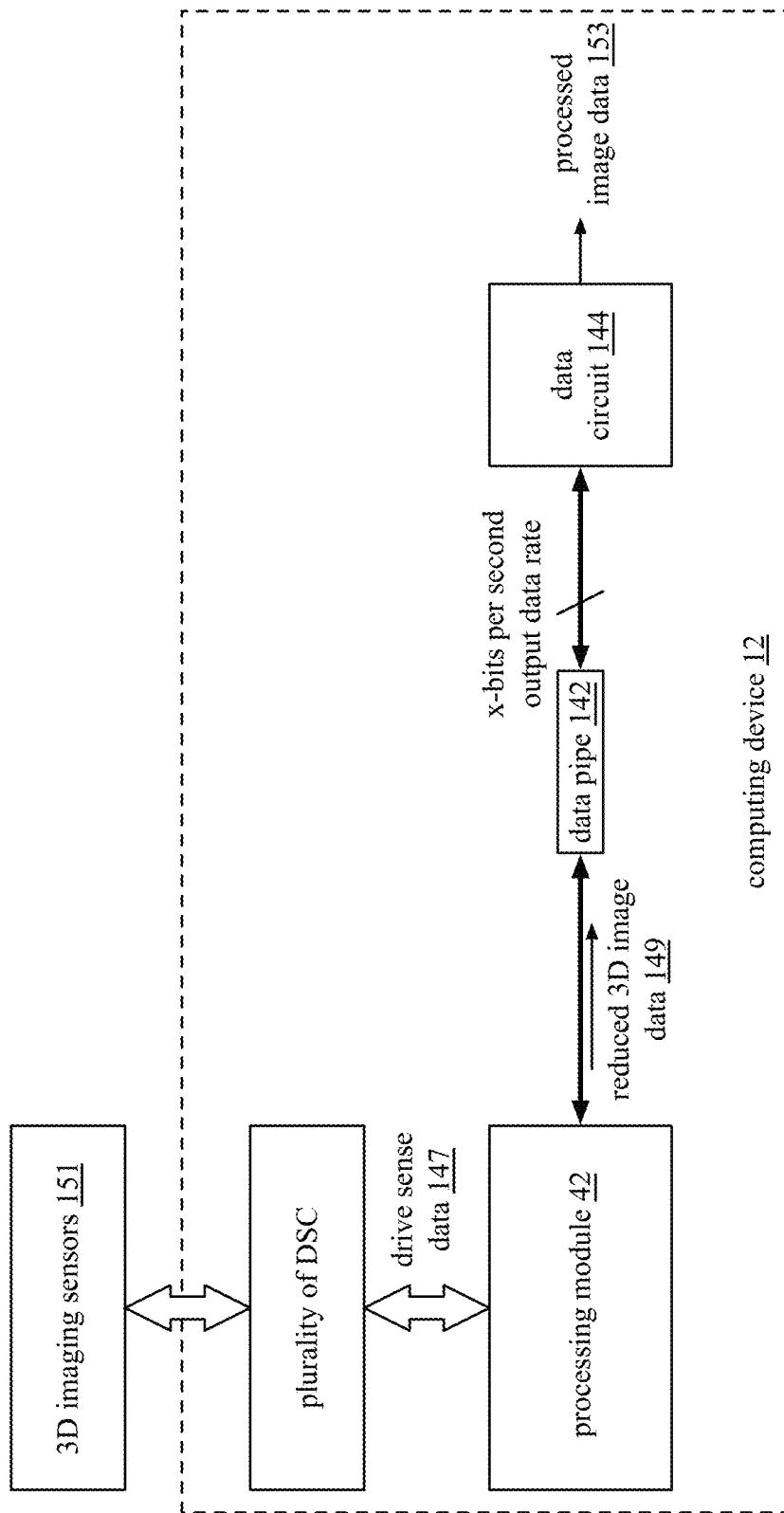
FIG. 9A is a schematic block diagram of an embodiment of a computing device that includes data reduction for 3D image data in accordance with the present invention.

FIG. 9A is a schematic block diagram of an embodiment of a computing device 12 that includes a processing module 42 and/or 82, a data communication medium (e.g., a data pipe 142), a data circuit 144, and a plurality of drive sense circuits (DSC) coupled three-dimensional (3D) imaging sensors 151. The 3D imaging sensors 151 form an imaging sensor grid to produce image grid data. In an embodiment, the image sensor grid is internal to the computing device and, in another embodiment, the image sensor grid is external to the computing device.

In an example of operation, the plurality of drive sense circuits (DSC) provides drive signals (e.g., ultrasound and/or RF) to the 3D imaging sensors 151. An item being imaged by the 3D imaging sensors affects the signals (e.g., reflects, refracts, and/or absorbs), which effects are detected by the drive sense signals as changes in the drive signals. The effects on the drive signals correspond to electrical characteristics of the sensors (e.g., voltage, impedance, current, reactance, frequency response, etc.) and comprise the drive sense data 147. The processing module 42 and/or 82 process the drive sense data 147 to produce the 3D image data, which includes electrical characteristic values for at least some of the sensors.

Depending on the intended use of the data, the output data rate of the data pipe 142, and amount of 3D image data (which typically corresponds to the size of a 3D imaging grid and resolution of imaging sensitivity (e.g., spacing between sensors)), the processing module 42 and/or 82 employs a data reduction scheme to produce reduced 3D imaging data 149.

The data circuit 144 receives the reduced 3D imaging data 149 via the data pipe 142 and produces processed image data 153 therefrom. In general, the 3D imaging data 153 corresponds to the meaning of the changes of the 3D imaging grid data from frame to frame. For example, the meaning corresponds to a movement of an item, topology of an item, etc.

In an example, the data circuit 144 is a video graphics processor coupled to a display for processing and displaying the reduced 3D imaging grid data 149 into a video graphics image (e.g., the processed image data 153). In another example, the data circuit 144 is a co-processor to process the reduced 3D imaging grid data 149 to identify a pattern, anomalies, variances, and/or other factors of the image data with reference to baseline image data. In yet another example, the data circuit 144 is a storage service (e.g., cloud storage) for storing the processed image data 153.

Figure 9B:
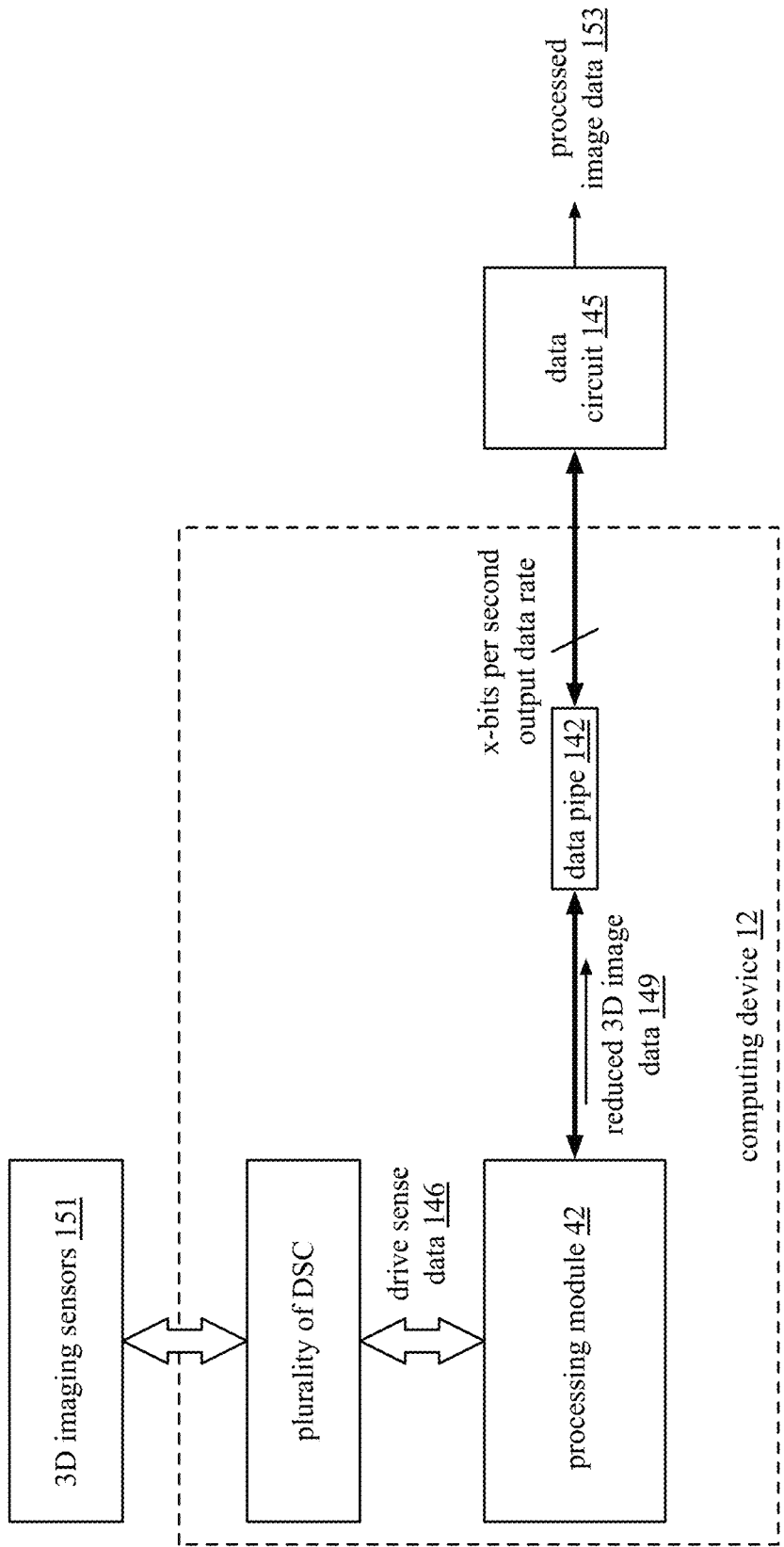
FIG. 9B is a schematic block diagram of another embodiment of a computing device that includes data reduction for 3D image data in accordance with the present invention.

FIG. 9B is a schematic block diagram of another embodiment of a computing device 12 that is similar to the computing device of FIG. 9A with a difference being the data circuit 145 is external to the computing device. The data circuit 145 may be a variety of devices. For example, the data circuit 145 is a remote display, which includes a video graphics processing module. As another example, the data circuit 145 is another computing device. As yet another example, the data circuit 145 is a server of the communication system 10. As a further example, the data circuit 145 is a remote storage device.

Figure 10:
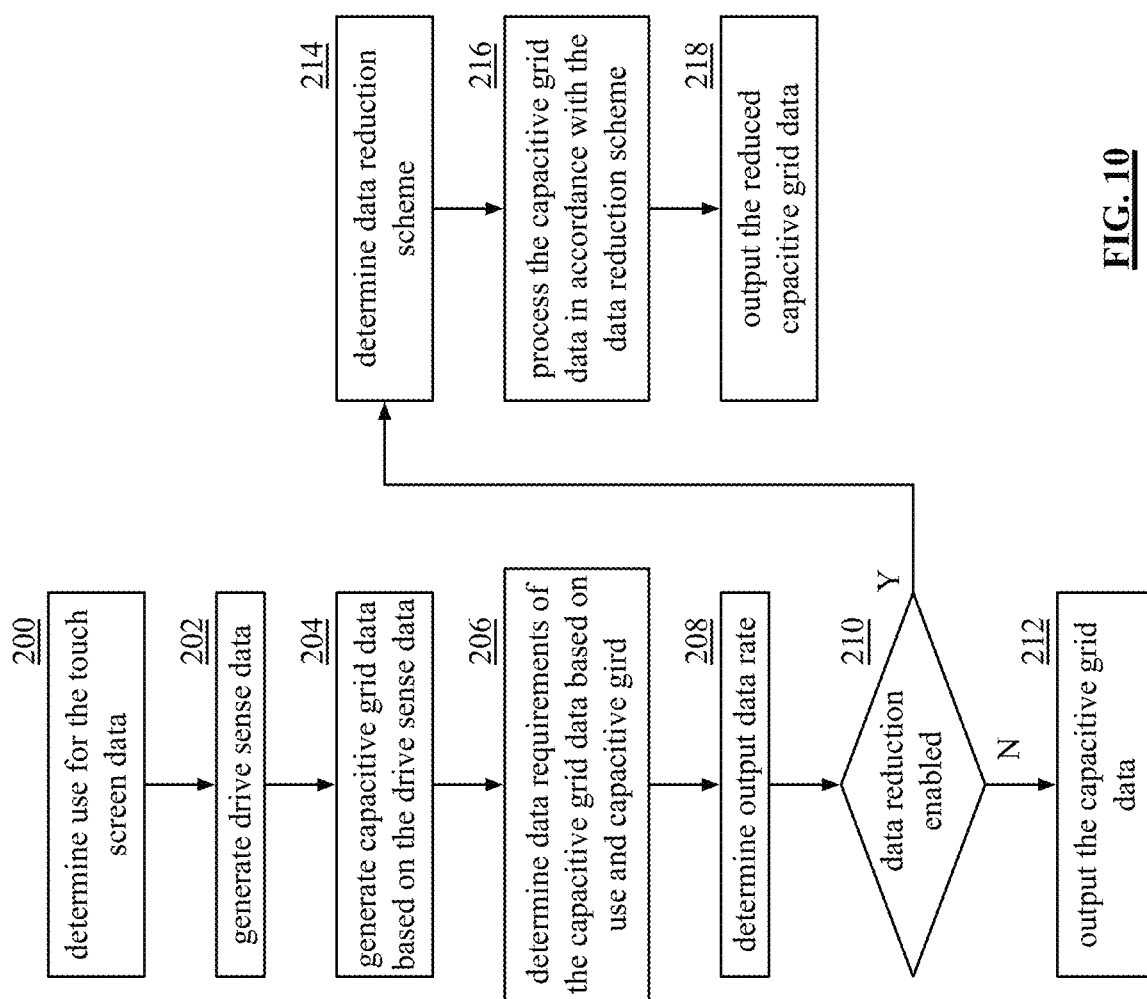
FIG. 10 is logic diagram of an example of a method for touch screen data reduction in accordance with the present invention.

FIG. 10 is logic diagram of an example of a method for touch screen data reduction that begins at step 200 where a processing module determines a use for the touch data (e.g., touch, hover, object recognition, pattern recognition, screen-to-screen communication and to what extent (e.g., coordinate location, heat map, detailed, etc.)). The method continues at step 202 where the processing module interacts with the touch screen to generate drive sense data. In an embodiment, the processing module generates a full screen of drive sense data for a first set of uses (e.g., touch, hover, etc. could be anywhere on the screen at any time). In another embodiment, the processing module generates drive sense data for a portion of the screen for a second set of uses (e.g., touch, hover, etc. in specific locations on the screen). An example of generating the drive sense data is discussed below with reference to FIGS. 11-13.

The method at step 204 where the processing module generates capacitance grid data based on the drive sense data. An example of this will be discussed in greater detail with reference to FIGS. 14 and 15. The method continues at step 204 where the processing module determines a use for the capacitance grid data. The use includes one or more of touch detection, hover detection, pattern recognition, object recognition, and/or screen-to-screen data communication. Examples of the various uses will be discussed with reference to one or more subsequent figures.

The method continues at step 206 where the processing module determines data requirements for the capacitance grid data based on the use and properties of the capacitance grid. The data requirements include data resolution of the touch screen (e.g., number of mutual capacitances and number of self-capacitances), bits per sample of the capacitance grid data, frame rate of the capacitance grid data, use of self-capacitance values, use of mutual capacitance values, and/or data rate of a frame of the capacitance grid data. Examples of the data requirements will be discussed with reference to one or more subsequent figures.

The method continues at step 208 where the processing module determines the output data rate. For example, the processing module determines (e.g., obtains, looks up, queries, etc.) the bits per second rate of the data pipe 142. The method continues at step 210 where the processing module determines whether data reduction is enabled. In an example, the processing module enables the data reduction when the output data rate cannot support the data requirements. In another example, the processing module enables the data reduction based on receiving an input signal from a user of the computing device, from a system administrator of the communication system, and/or based on a default setting.

When the data reduction is not enabled, the method continues at step 212 where the processing module outputs the capacitive grid data without data reduction to the data circuit 144 and/or 145. When the data reduction is enabled, the method continues at step 214 where the processing module determines a data reduction scheme based on the data requirements and the output data rate. The data reduction scheme includes a data elimination scheme and/or a data compression scheme. The determining of the data reduction scheme is discussed in greater detail with at least reference to FIGS. 16 and 17.

The method continues at step 216 where the processing module processes the capacitance grid data in accordance with the data reduction scheme to produce reduced capacitive gird data. The method continues at step 218 where the processing module provides (e.g., sends, transmits, stores and subsequent retrieval, etc.) the reduced capacitive grid data to a data circuit.

FIG. 11 illustrates a logic diagram of an example of a method for generating drive sense data. The method begins at step 220 where the processing module provides a self-capacitance signal to the drive sense circuits at step 220. An example of the self-capacitance signal is shown in FIG. 12. In this example, the self-capacitance signal is a sinusoidal signal having a frequency in the range of tens of KHz to hundreds of MHz.

Returning to the example method of FIG. 11, the method continues at step 222 where the processing module provides a plurality of mutual capacitance signals to a first set of the drive sense circuits. An example of the mutual capacitance signals is shown in FIG. 13. In this example, the mutual capacitance signals are sinusoidal signals having different frequencies from each other and from the self-capacitance signal, with frequencies in the range of tens of KHz to hundreds of MHz, or more.

Returning to the example method of FIG. 11, the method continues at step 224 where the processing module receives self-capacitance data from the drive sense circuits, where the self-capacitance data includes a plurality of self-capacitance values. The example method continues at step 226 where the processing module receives mutual capacitance data from a second set of the drive sense circuits, wherein the mutual capacitance data includes a plurality of mutual capacitance values. The example method continues at step 228 where the processing module generates the drive sense data from the self and mutual capacitance data.

Figure 14:
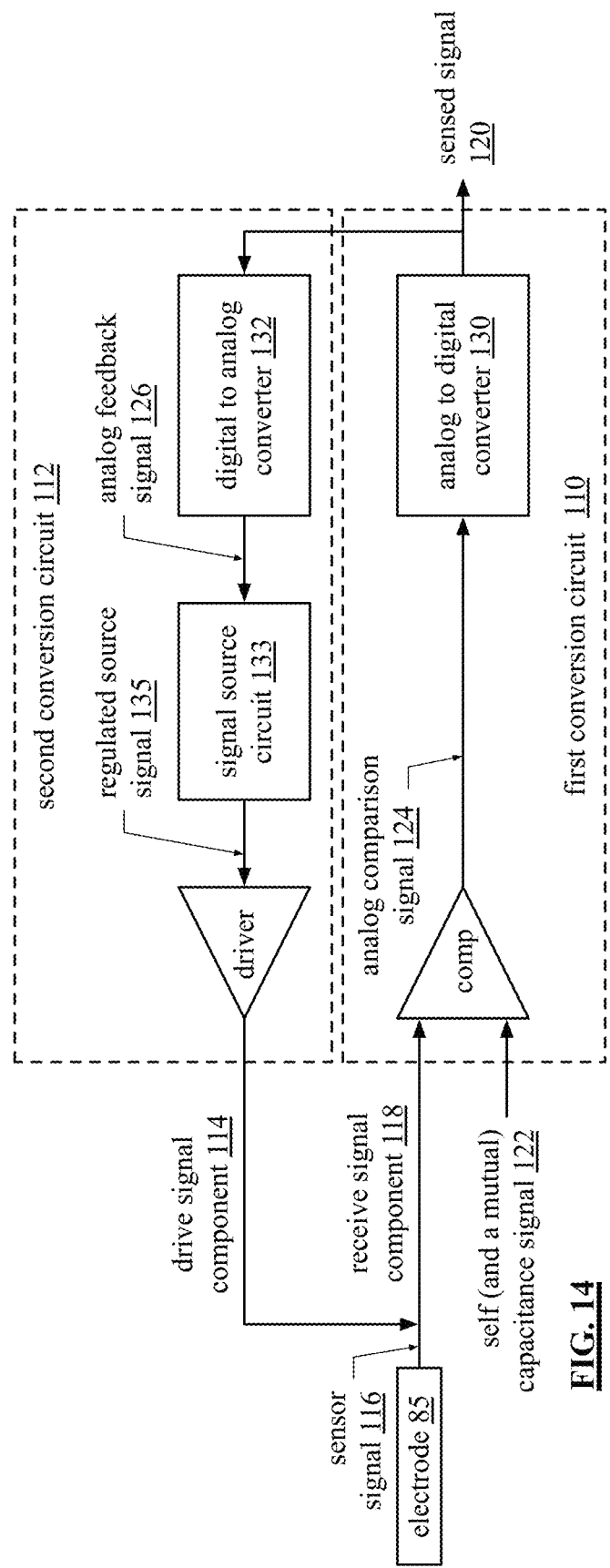
FIG. 14 is a schematic block diagram of an embodiment of a drive sense circuit in accordance with the present invention.

FIG. 14 is a schematic block diagram of an embodiment of a drive sense circuit 28 that includes a first conversion circuit 110 and a second conversion circuit 112. The first conversion circuit 110 converts a sensor signal 116 into a sensed signal 120. The second conversion circuit 112 generates the drive signal component 114 from the sensed signal 112. As an example, the first conversion circuit 110 functions to keep the sensor signal 116 substantially constant (e.g., substantially matching a reference signal) by creating the sensed signal 120 to correspond to changes in a receive signal component 118 of the sensor signal. The second conversion circuit 112 functions to generate a drive signal component 114 of the sensor signal based on the sensed signal 120 to substantially compensate for changes in the receive signal component 118 such that the sensor signal 116 remains substantially constant.

In an example, the drive signal 116 is provided to the electrode 85 as a regulated current signal. The regulated current (I) signal in combination with the impedance (Z) of the electrode creates an electrode voltage (V), where V=I*Z. As the impedance (Z) of electrode changes, the regulated current (I) signal is adjusted to keep the electrode voltage (V) substantially unchanged. To regulate the current signal, the first conversion circuit 110 adjusts the sensed signal 120 based on the receive signal component 118, which is indicative of the impedance of the electrode and change thereof. The second conversion circuit 112 adjusts the regulated current based on the changes to the sensed signal 120.

As another example, the drive signal 116 is provided to the electrode 85 as a regulated voltage signal. The regulated voltage (V) signal in combination with the impedance (Z) of the electrode creates an electrode current (I), where I=V/Z. As the impedance (Z) of electrode changes, the regulated voltage (V) signal is adjusted to keep the electrode current (I) substantially unchanged. To regulate the voltage signal, the first conversion circuit 110 adjusts the sensed signal 120 based on the receive signal component 118, which is indicative of the impedance of the electrode and change thereof. The second conversion circuit 112 adjusts the regulated voltage based on the changes to the sensed signal 120.

In an embodiment, the first conversion circuit 110 includes a comparator (comp) and an analog to digital converter 130 and the second conversion circuit 112 includes a digital to analog converter 132, a signal source circuit 133, and a driver. In an example of operation, the comparator compares the sensor signal 116 to an analog reference signal 122 to produce an analog comparison signal 124. The analog reference signal 124 includes a DC component and an oscillating component. As such, the sensor signal 116 will have a substantially matching DC component and oscillating component. An example of an analog reference signal 122 will be described in greater detail with reference to FIG. 15.

The analog to digital converter 130 converts the analog comparison signal 124 into the sensed signal 120. The analog to digital converter (ADC) 130 may be implemented in a variety of ways. For example, the (ADC) 130 is one of: a flash ADC, a successive approximation ADC, a rampcompare ADC, a Wilkinson ADC, an integrating ADC, a delta encoded ADC, and/or a sigma-delta ADC. The digital to analog converter (DAC) 214 may be a sigma-delta DAC, a pulse width modulator DAC, a binary weighted DAC, a successive approximation DAC, and/or a thermometer-coded DAC.

The digital to analog converter (DAC) 132 converts the sensed signal 120 into an analog feedback signal 126. The signal source circuit 133 (e.g., a dependent current source, a linear regulator, a DC-DC power supply, etc.) generates a regulated source signal 135 (e.g., a regulated current signal or a regulated voltage signal) based on the analog feedback signal 126. The driver increases power of the regulated source signal 135 to produce the drive signal component 114. In an alternate embodiment, the digital to analog converter 132 and/or the analog to digital converter 130 may be omitted from the DSC. If omitted from the DSC, the processing module would include at least an analog to digital converter.

Figure 15:
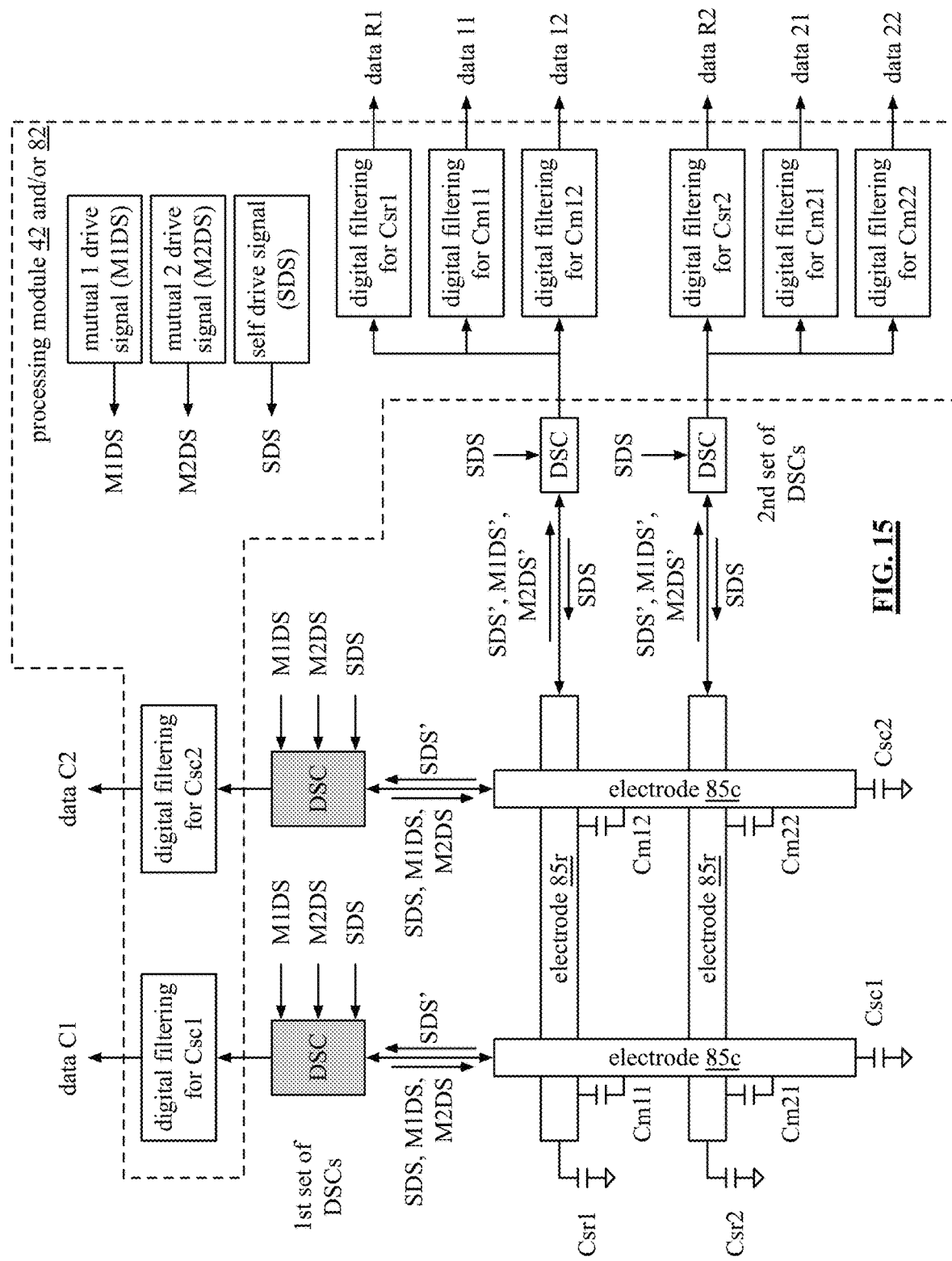
FIG. 15 is a schematic block diagram of an embodiment of drive sense circuits interacting with electrodes and a processing module in accordance with the present invention.

FIG. 15 is a schematic block diagram of an embodiment of drive sense circuits interacting with electrodes 85 and a processing module 42 and/or 82 to produce drive sense data. As shown, the gray-shaded drive sense circuits (DSC) are coupled to column electrodes 85$c$ and the white-shaded DSCs are coupled to row electrodes 85$r$. Each electrode has its own self-capacitance (Csc1 and Csc2 for the column electrodes and Csr1 and Csr2 for the row electrodes). Each intersection of a row and column electrode produces a mutual capacitance (Cm11, Cm12, Cm21, and Cm22).

The processing module 42 and/or 82 is configured to include an analog reference signal source for a first mutual capacitance drive signal (M1DS), an analog reference signal source for a second mutual capacitance drive signal (M2DS), and an analog reference signal source for a self-capacitance drive signal (SDS). The processing module 42 and/or 82 is further configure to include a digital filtering circuit for the self-capacitance value of the first column electrode (Csc1), a digital filtering circuit for the self-capacitance value of the second column electrode (Csc2), a digital filtering circuit for the self-capacitance value of the first-row electrode (Csr1), and a digital filtering circuit for the self-capacitance value of the second-row electrode (Csr2). The processing module is still further configured to includes a digital filtering circuit for the mutual-capacitance value of the first column and first row electrode intersection (Cm11), a digital filtering circuit for the mutual-capacitance value of the first column and second row electrode intersection (Cm21), a digital filtering circuit for the mutual-capacitance value of the second column and first row electrode intersection (Cm12), and a digital filtering circuit for the mutual-capacitance value of the second column and second row electrode intersection (Cm22).

The digital filtering circuit may be implemented in a variety of ways. For example, the digital filtering circuit is implemented as a bandpass filter. As another example, the digital filtering circuit is implemented as a decimation filter followed by a bandpass filter.

In an example of operation, the processing module 42 and/or 82 provides the self-capacitance drive signal (SDS) to each of the drive sense circuits (DSC). The DSC drive the signal (SDS) on to their respective electrodes. The self-capacitance of the electrode affects the drive signal (SDS), which the DSC detects (SDS'). When no external stimulus is present (e.g., no touch, no hover, etc.), the self-capacitance will be at a first value. When an external stimulus is present, the self-capacitance will be a second value. The respective values are reflected in effect on the drive signal (SDS'). The respective digital filtering circuits produce data C1, C2, R1, and R2, which are digital representations of the effects on the drive signals.

The processing module 42 and/or 82 provides the first and second mutual capacitance drive signals (M1DS and M2DS) to the first set of drive sense circuits (DSC); the gray-shaded DSCs. The first set of DSCs drive their respective mutual capacitance drive signal (M1DS or M2DS) onto its respective electrode. The mutual capacitance drive signals are coupled via the mutual capacitances to a row electrode. The DSC circuits (e.g., the second set) coupled to the row electrodes receive the mutual capacitance signals via the mutual capacitance between the row electrode and the columns as M1DS' and M2DS'.

The digital filtering circuits for Cm11, Cm12, Cm21, and Cm22 filter the M1DS' and M2DS' signals received from their respective drive sense circuits to produce mutual capacitance data 11, 12, 21, and 22. The mutual capacitance data and the self-capacitance data C1, C2, R1, and R2 and/or their analog inputs constitute the drive sense data.

Figure 16:
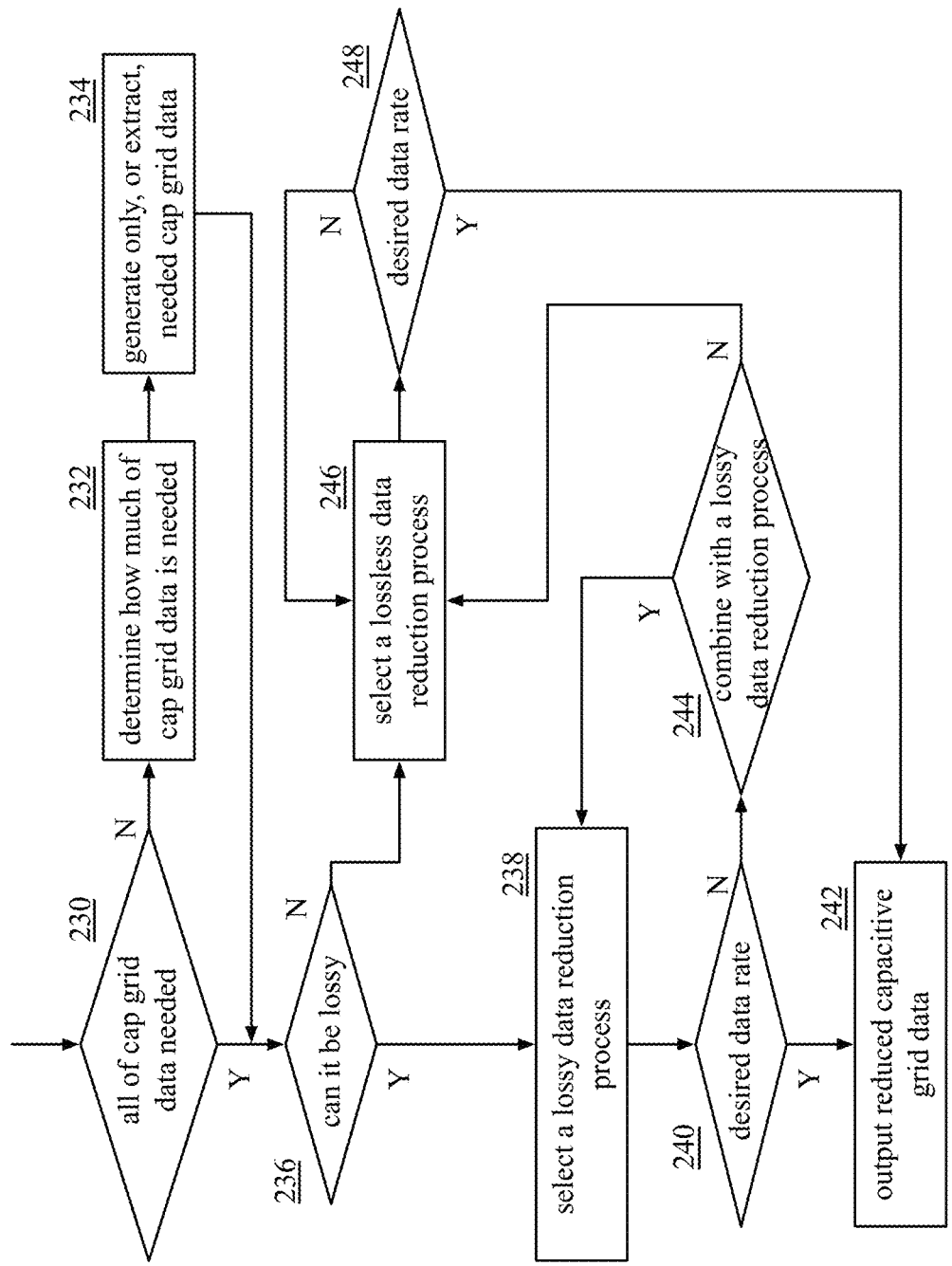
FIG. 16 is logic diagram of an example of a method of data reduction in accordance with the present invention.

FIG. 16 is logic diagram of an example of a method of data reduction that begins at step 230 where the processing module determines whether all of the capacitance grid data is needed for the particular use of the touch screen data. For example, when the use is detecting a touch in a specific area of the screen, only the capacitive grid data of the area is needed per frame. As another example, when the use is object and/or pattern recognition that could take place anywhere on the screen and change location at any time, then all of the capacitive grid data is needed per frame.

When all of the capacitive grid data is not needed, the method continues at step 232 where the processing module determines how much of the grid data is needed. For example, the grid location for one or more specific areas for detecting a touch, hover, etc. The method continues at step 234 where the processing module generates only the needed capacitive grid data or extracts the needed capacitive grid data from a full screen of capacitive grid data.

After step 234 or when all of the capacitive grid data per frame is needed, the method continues at step 236 where the processing module determines when the data reduction can be lossy (e.g., the grid capacitive data is reproducible, but with some loss of information). When the data reduction cannot be lossy (i.e., lossless such that the grid capacitive data is reproducible with negligible to no loss of information), the method continues at step 246 where the processing module selects a lossless data reduction process. One or more examples of selecting a lossless data reduction process is discussed with reference to FIGS. 20A-20D.

The method continues at step 248 where the processing module determines whether the processing module determines whether the selected lossless data reduction process will reduce the data to a desired data rate (e.g., at or below the output data rate). If yes, the method continues at step 242 where the processing module outputs the reduced capacitive grid data. If not, the method continues at step 246 where the processing module selects a different data reduction process or selects a complimentary data reduction processing (e.g., use two or more data reduction processes to achieve the desired data rate).

When the data reduction can be lossy per step 236, the method continues at step 238 where the processing module selects a lossy data reduction process. One or more examples of selecting a lossy data reduction process will be described with reference to FIGS. 20A-20D. The method continues at step 240 where the processing module determines whether the selected data reduction process will achieve the desired data rate. If yes, the method continues at step 242 where the processing module outputs the reduced capacitive grid data.

If not, the method continues at step 244 where the processing module determines whether to combine the selected lossy data reduction processing with another lossy data reduction process. If not, the method continues at step 246. If yes, the method continues at step 238. Once the desired data rate is achieved, the reduced capacitive grid data is outputted.

Figure 16B:
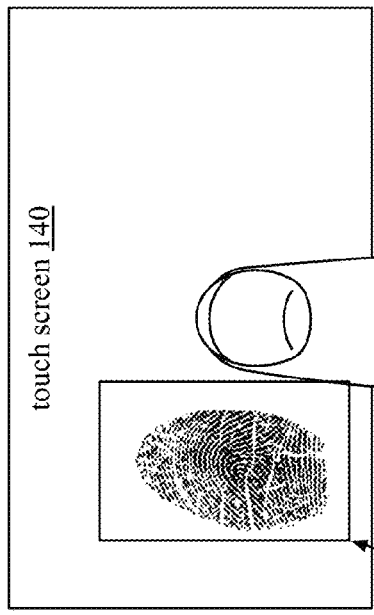
FIGS. 16A-16D are examples of various touch screen interactions and data requirements in accordance with the present invention.
Figure 16D:
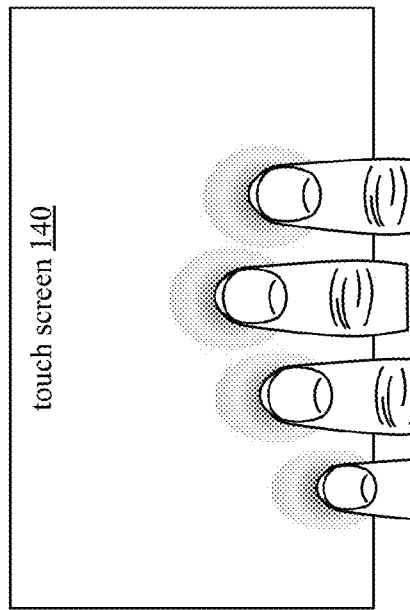
Figure 16A:
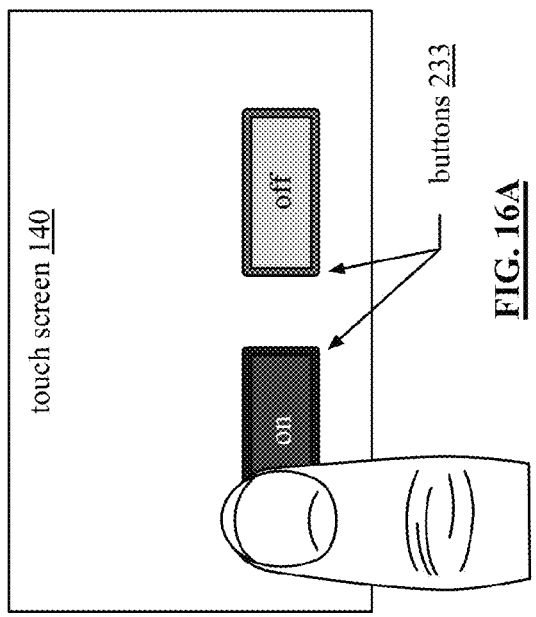

FIGS. 16A-16D are examples of various touch screen interactions and data requirements. FIG. 16A illustrates a touch screen 140 have two specific buttons 233: one for on and the other for off. To detect activation of a button, the x-y coordinates of touch (all coordinates of the touch or its center coordinates) within the specific area of the button is needed to detect activation of a button. As such, only a portion of the touch screen needs to be monitored and a small amount of data (i.e., less than full capacitive grid data) is needed to indicate a touch or no touch in the specific areas of the buttons. Thus, any data reduction of the capacitive grid data within the specific area 233 can be lossy.

FIG. 16B illustrates a touch screen 140 having a biometric touch area 235. Within this area 235, a person's finger print is read. As such, full capacitive grid data with the specific area is needed to properly read a finger print. Any data reduction of the capacitive grid data within the specific area 235 should be lossless.

Figure 16C:
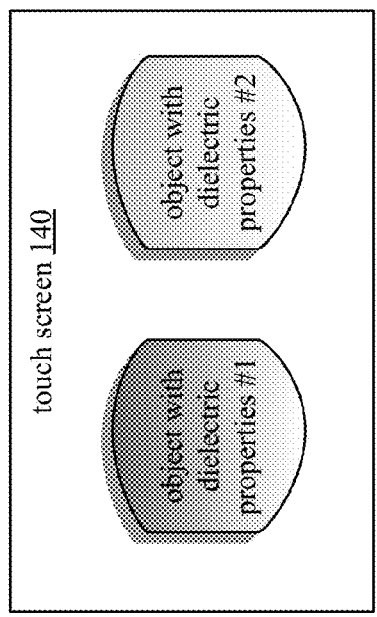

FIG. 16C illustrates a touch screen 140 on which one or more objects may be placed and are to be recognized. In this example, a first object with first dielectric properties is in a first position and a second object with second dielectric properties is in a second position. The differing dielectric properties cause different capacitance changes to capacitive grid. From the capacitance changes, the dielectric properties can be determined, which allows the object to be identified. In this instance, a full screen of capacitive gird data is needed per frame with full data requirements. Thus, any data reduction should be lossless.

FIG. 16D illustrates a touch screen 140 on which multiple touches can occur anywhere on the screen and heat map data of the touches is desired. In this example, the touches could be anywhere on the screen, thus the full capacitive grid data is needed. Since the data desired is a heat map, data reduction can be lossy.

Figure 17:
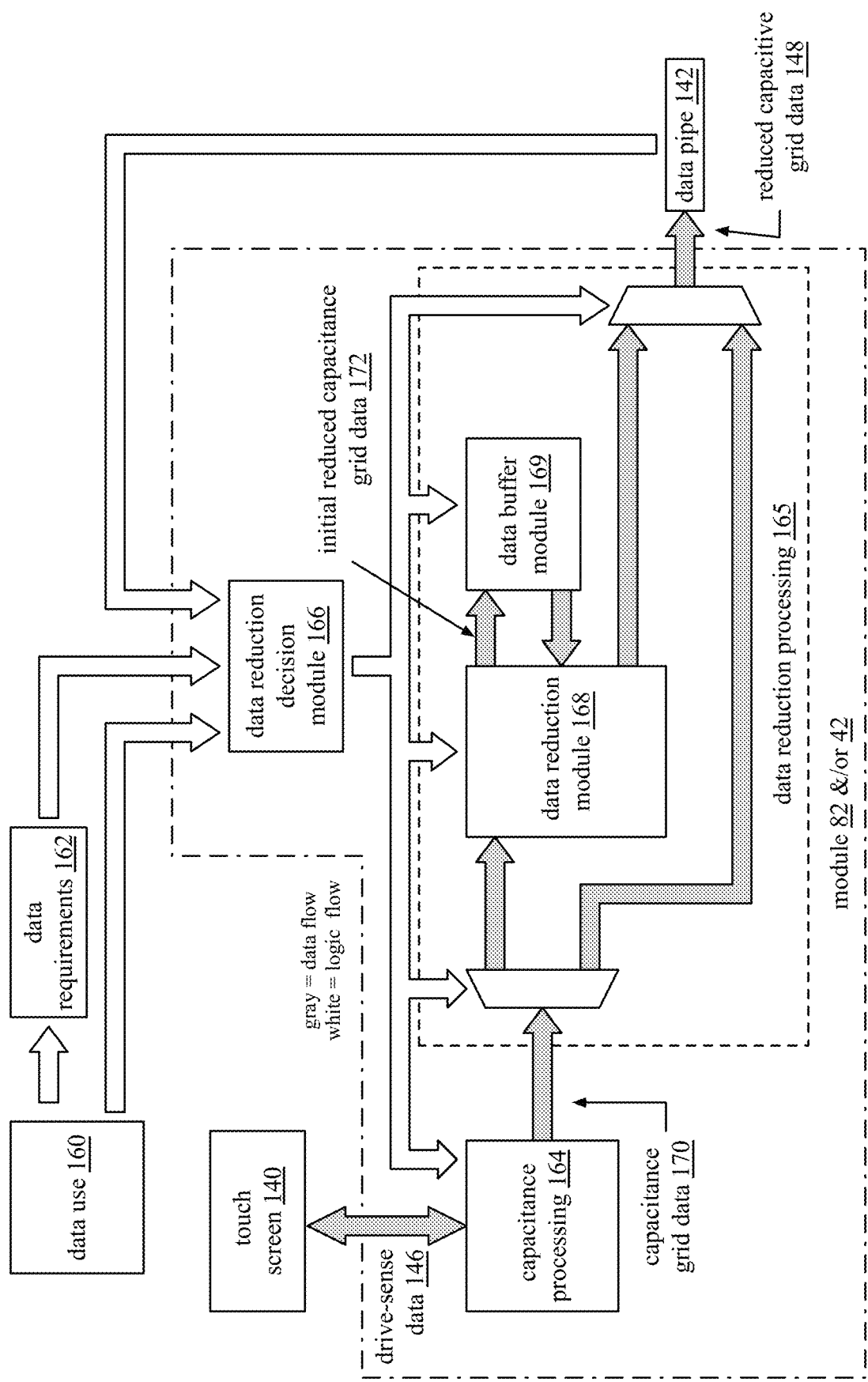
FIG. 17 is a schematic block diagram of an embodiment of a touch screen and a processing module in accordance with the present invention.

FIG. 17 is a schematic block diagram of an embodiment of a touch screen 140 and a processing module 42 and/or 82 of a computing device 12, 14, and/or 18. The processing module 42 and/or 82 is configured to include a capacitance processing circuit 164, a data reduction processing circuit 165, a data reduction decision module 166, a data buffer module 169, and multiplexors.

In an example of operation, data use 160 is an input for determining the data requirements 162. In combination with the data output rate of the data pipe 142, the data requirements 162 and the data use 160 are inputs for determining whether data reduction is needed and, if it is, determining how to implement it. Examples of determining the data requirements and the data reduction scheme are discussed with reference to one or more subsequent figures.

With the data reduction scheme determined, the capacitance processing circuit 164 receives drive sense data 146 from the touch screen. The capacitance processing circuit 164 processes the drive sense data 146 to produce capacitance grid data 170 for the full touch screen or selected portions thereof based on an input from the data reduction decision module. As an example, and as discussed with reference to FIG. 14, the drive sense data includes an impedance value for a particular capacitance of the capacitance grid. The capacitance processing circuit 164 converts the impedance value into a capacitance value based the equation $Zc=1/SC$, where $Zc$ is the impedance of the capacitor, $C$ is the capacitance of the capacitor, and $S$ equals $2*\pi*f$. The bit resolution of the capacitance value can be in the range of 8 bits to 64 bits or more.

If the data reduction decision module 166 determines that the capacitive grid data does not need to be reduced, the data reduction processing circuit 165 passes the capacitive grid data 170 to the data pipe 142. If, however, the data reduction decision module 166 determines that the capacitive grid data does need to be reduced, it selects a data reduction scheme, which includes one or more data reduction processes.

For a single data reduction process, the data reduction module 168 performs the specific data reduction process on the capacitive grid data to produce reduced capacitive grid data 148, which is outputted to the data pipe 142. For multiple data reduction processes, the data reduction module 168 performs a first data reduction process on the capacitive grid data 170 to produce initial reduced capacitive grid data 172, which is stored in the data buffer module 169. The data reduction module 168 performs a second data reduction process on the initial reduced capacitive grid data 172 to produce the reduced capacitive grid data 148.

Figure 18:
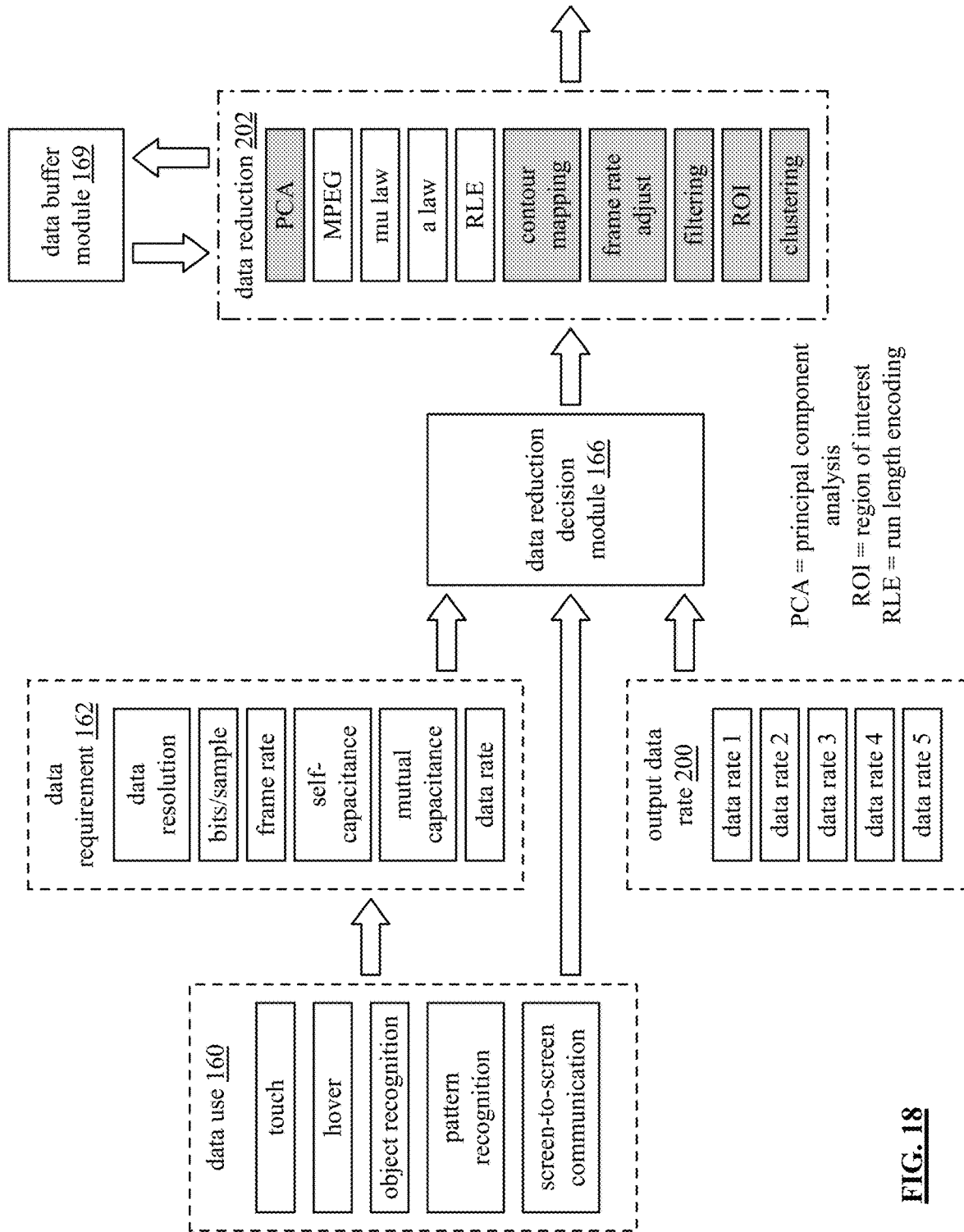
FIG. 18 is a schematic block diagram of an example of interaction between data use, data requirements, output data rate, and data reduction schemes in accordance with the present invention.

FIG. 18 is a schematic block diagram of an example of data use 160, data requirements 162, output data rate 200, and data reduction schemes 202 feeding the data reduction decision module 166. The data reduction decision module 166 uses the particular information of the data use, the data requirements, and the output data rate to select one or more data reduction processes. In this example, the data uses of a touch screen include a touch (person and/or pen in physical contact with the touch screen), a hover (person and/or pen in close proximity to the touch screen but not in physical contact), object recognition, pattern recognition, and/or screen-to-screen communication (STS) element processing.

For object and/or pattern recognition, an object or pattern includes one or more dielectric, impedance, current, and/or voltage characteristics that, when proximal to the touch screen, causes capacitance changes in the capacitive grid. If the object or pattern includes a ground path connection, both self and mutual capacitances will be effected. If the object or pattern does not include a ground path connection, only mutual capacitances will be effected. Based on the capacitance changes, the dielectric, impedance, current, and/or voltage characteristics can be determined, which can then be used to identify an object and/or a pattern.

For screen-to-screen communication, a transmitting touch screen is driven via the drive senses circuits with a particular arrangement of drive signals to represent a communication element (e.g., a bit of data, a byte of data, a coded communication signal, etc.). At a particular communication rate, the particular arrangement of drive signals is changed to represent different communication elements. When a receiving touch screen is proximal to the transmitting touch screen, the capacitive grid of the receiving touch screen is effected by the particular arrangement of drive signals to produce changes in the capacitive grid data.

The uses can be enabled singularly or in combinations. For example, touch and hover are concurrently enabled. As another example, touch and object recognition are concurrently enabled. As yet another example, touch and screen-to-screen communication are concurrently enabled. For other types of 3D sensing systems, the uses may include one or more of 3D imaging, data storage, image rendering, comparative analysis, interpretative analysis, etc.

The data requirements 162 includes one or more of data resolution, bits/sample, frame rate, self-capacitance data, mutual capacitance, and data rate. FIGS. 19 and 19A illustrate examples of data requirements.

The output data rate 200 is shown to include 5 data rates (i.e., data rate 1-5). In practice, more or less data rates may be used. Further, the output data rate 200 is tied to the type of communication medium being used. For example, USB has a first data rate, a wireless local area network connection has a second data rate, an internet connection has a third data rate, an I2C connection has a fourth data rate, and so on.

The data reduction 202 includes lossy data reduction processes (gray shaded) and lossless data reduction processes (white shaded). The lossy data reduction processes include Principal Component Analysis (PCA), contour mapping, frame rate adjustment, a filtering, region of interest (ROI), and/or clustering. The lossless data reduction processes included Motion Picture Expert Group (MPEG), mu-law, a-law, and Run Length Encoding (RLE). Note that there can be more of less data reduction processes than presently shown.

As an example of frame rate adjustment, the frame rate of the capacitive grid data is reduced from 300 Hz rate 100 Hz, 200 Hz, or other frame rate to reduce the number of frames of capacitive grid data per second.

As an example of filtering, undesired touches are attenuated (i.e., filtered out) and desired touches are passed substantially unattenuated. As a specific example, the side of a hand touch is filtered out and the pen touch is not. As another example of filtering, a group of capacitances changes is filtered to a centered x-y coordinate. As a specific example, a touch that changes capacitance of several self and mutual capacitances is reduced to a single x-y coordinate approximately centered in the grouping of mutual capacitances. As yet another example of filtering, touch uses self-capacitance values and does not use some or all of the mutual capacitance values.

Principal Component Analysis (PCA) is a machine-learning technique that projects a data set onto a linear combination of another smaller dataset call Principal Components. This reduces the dimensionality of data by seeking to preserve the data with maximum variation in just a few components. In other words, PCA preserves information as defined by maximum variance, which is useful in finding the data that most describe the information. It separates the information into structural and noise factors, so it is inherently low noise.

Determining the number of Principal Components to keep is done by keeping the components that explain the most variance in the data. For example, the Eigen Values from a Singular Value Decomposition (SVD), or other Eigen decomposition, of the correlation or covariance matrix of the image is included in a Principal Component. The Principal Component with the largest Eigen value is called the first Principal component and explains the most amount of variation in the data. For example, a data set after a CPA operation could have the first Principal Component explain roughly 45% of the data while the second Principal Component explains about 25% of the data. Those two components combined explain about 70% of the data. As such, an image (e.g., a frame of capacitive grid data) is reduced by PCA into two components whose length is equal to the number of rows in the image (or columns). Parameters and the components from the PCA are transmitted and used to reconstruct the image while preserving most of the information. If a greater degree of information is needed, more Principal Components can be retained. How many components to be retained can be a function of a set minimum of percentage of variance explained, the minimum level of variation differences between the components (i.e. when the difference between the Eigen values of the Principal Components is small, stop retaining them), a fixed number retained regardless of variance, etc.

In an example, a PCA or SVD function is performed. In particular, Principal component analysis (PCA) is usually explained via an Eigen-decomposition of the covariance or correlation matrix. However, it can also be performed via singular value decomposition (SVD) of the data matrix X. in SVD, X is represented as $X=USV^T$, where right singular vectors V are principal directions and singular values are related to the eigenvalues of covariance matrix. Principal components are given by $XV=USV^TV=US$.

Next, determine the number of principal components (PC's) to keep. One method is to look at the Eigen values of the PC's that represent the variance explained in the data by that component. Keep the components that explain a pre-specified percentage of the variance (i.e., >50%, >70%, >90%, etc.). Another method is to always keep a set number of PC's based on the total number modelled. Another is to look for a 'jump' the Eigen value differentials and keep the PC's up to that jump.

u-Law and a-Law compression have been used in communications. It is a technique that compresses the linear or logarithmic value of the data (usually audio data). It is a companding (e.g., compress and expand) technique that can expand 8-bit data to effectively higher bits. In general, u-Law and a-Law compression have a compression ratio of about 2:1.

For example:

| Input Range | Output Range | Step Size |
| --- | --- | --- |
| 0 to 31 | 0 to 31 | 1 |
| 32 to 94 | 32 to 63 | 2 |
| 96 to 220 | 64 to 95 | 4 |
| 224 to 472 | 96 to 127 | 8 |
| 480 to 976 | 128 to 159 | 16 |
| 992 to 1984 | 160 TO 191 | 32 |
| 2016 to 4000 | 192 to 223 | 64 |
| 4064 to 8032 | 224 to 255 | 126 |

Region of Interest (ROI) is useful in reducing the data by only transmitting a smaller region the encompasses the area where data existing. For example, capacitive grid data indicates five touches. Only five small bounding boxes that encompass the touches would be transmitted. The compression ratio of ROI is dependent on how much of the screen is being omitted. As such, ROI is can achieve compression ratios greater than 10:1.

Clustering K-Means ROI (clustering) is a machine-learning technique that seeks to find the clusters of data within a larger data set. There are many algorithms for clustering of which K-Means is popular. The clustering algorithm seeks to find data in clusters by comparing the distances between centroids and surrounding data. This is useful in clumping data together into arbitrarily shaped regions. This is more processor intensive than the bounding box approach, but it is more selective.

RLE, and MPEG are techniques commonly used for video compression and work well especially when the data is first de-noised by PCA, Filtering, Thresholding, etc. They work by transmitting only the differences in the data. For example, in a de-noised image only the areas where there is data separate from the background get transmitted. The data compression ratio for MPEG is up to 200:1. RLE can have compression ratios of 2:1 or more, depending on the variance of the data within a frame of the capacitive grid data.

Edge reduction takes an image and reduces it to an edge outline of capacitance changes (e.g., touches, hovers, objects, patterns, STS communication element). An edge outline is simply the edge detection of a flattened 2D binary image (or a 3D or color image that has been flattened to binary levels first). This gives the structure of the object (touch, hand, keyboard, etc.) in and X_Y plane. This information is very small and useful for downstream processing when doing image classification or other image processing techniques.

Contour reduction takes an image and reduces it to a contour outline resembling a topological map. Contour reduction can be thought of as "slicing" a 3D image into multiple 2D planes and getting the edge outline of each plane. The individual planes are then combined into a single 2D binarized plane showing all the outline information. This contour map contains richer information about the structure of the object than the simple edge outline. The levels of the slices can be pre-determined based on set dynamic range criteria or automatic based on the variation of the dynamic range. Once an image has been binarized with these techniques, only the locations and associated level of the active pixels are transmitted. A typical image processing pipeline would look at the 2D slice, binarized it by thresholding, perform erosion for de-noising, perform dilation for fill in the retained information, do edge detection to get the contour. Note that all the binarized data can be retained is necessary. It can also be used as a filter for ROI processing (see next section) or other filtering needs.

As an example, an image is reduced to binary levels (i.e., binarized or flattened) using standard morphological techniques (thresholding, % data kept, etc.). Next, erosion is performed to reduce noise and remove unconnected pixels (edged detection/contour creation can be performed here by subtracting the eroded image from the original image). Next, dilation is performed to fill in and smooth out blobs (edge detection/contour creation can be performed here by subtracting the original image from the dilated image). Next, create contours using any of the various edge detection techniques (sobel, canny, gradient, etc.). This can also be applied to grayscale images. The contour information is transmitted—typically the coordinates and level of 'white' pixels.

As another example, an image is sliced into a "n" number of planes. The planes can be defined at predetermined levels based on certain criteria or dynamically assigned. The levels can be determined on a linear, logarithmic or other scale. All values between levels would be flattened to a level (typically the upper level). From there, the contour of each level is found. The level and contour information is transmitted. Note that the contours can be flattened into a single 2D representation like a topological map. More examples of contour reduction will be discussed with reference to one or more of FIGS. 35-63.

FIG. 19 is a schematic block diagram of an example of data requirements that includes data resolution, bits/sample, frame rate, self-capacitance, mutual capacitance, and data rate, which is a function of the other data requirements factors. In this example, the data resolution corresponds to the number of rows and columns of a touch screen, which create the capacitive grid. With 5-millimeter spacing between the electrodes (rows and columns), a 2"×5" touch screen has 10 rows and 25 columns; a 6"×10" touch screen has 30 rows and 50 columns; a 9"×12" touch screen (15" screen) has 45 rows and 60 columns; a 15.7"×27.9" touch screen (32" screen) has 80 rows and 140 columns; a 27"×47.9" touch screen (55" screen) has 136 rows and 243 columns; and a 41.7"×74.1" touch screen (85" screen) has 211 rows and 376 columns.

In this example, the bits/sample (e.g., capacitance value per mutual capacitance and self-capacitance) is 8 bps, 16 bps, 24 bps, 32 bps, 48 bps, or 64 bps. The frame rate (e.g., number of capacitive grid data per second) is shown to be 30/s, 100/s, 200/s, or 300/s. Note that other bits/sample and frame rates may be used in practice.

The data requirements further include whether to includes self-capacitance or not and whether to include mutual capacitance or not. For example, when a ground path connection is not present, there is minimal need for self-capacitance values, so they may be omitted. As another example, when there is a ground path connection, mutual capacitance values may be omitted based on the user.

The data rate is a function of the other data requirements. FIG. 19A is an example of specific data requirements yielding a data rate. In this example, the data resolution is 136×243, the bits/second is 48, the frame rate is 300/s, self-capacitance values are to be included, and mutual capacitance values are to be included. With a resolution of 136×243 there are 33,048 mutual capacitors in the capacitive grid (e.g., 136*243) and 379 self-capacitors (e.g., 136+243). With 48 bits/sample a frame of capacitive grid data includes approximately 1.604 Mega-bits. At 300 frames per second, that yields 481.3 Mbps.

Figure 20A:
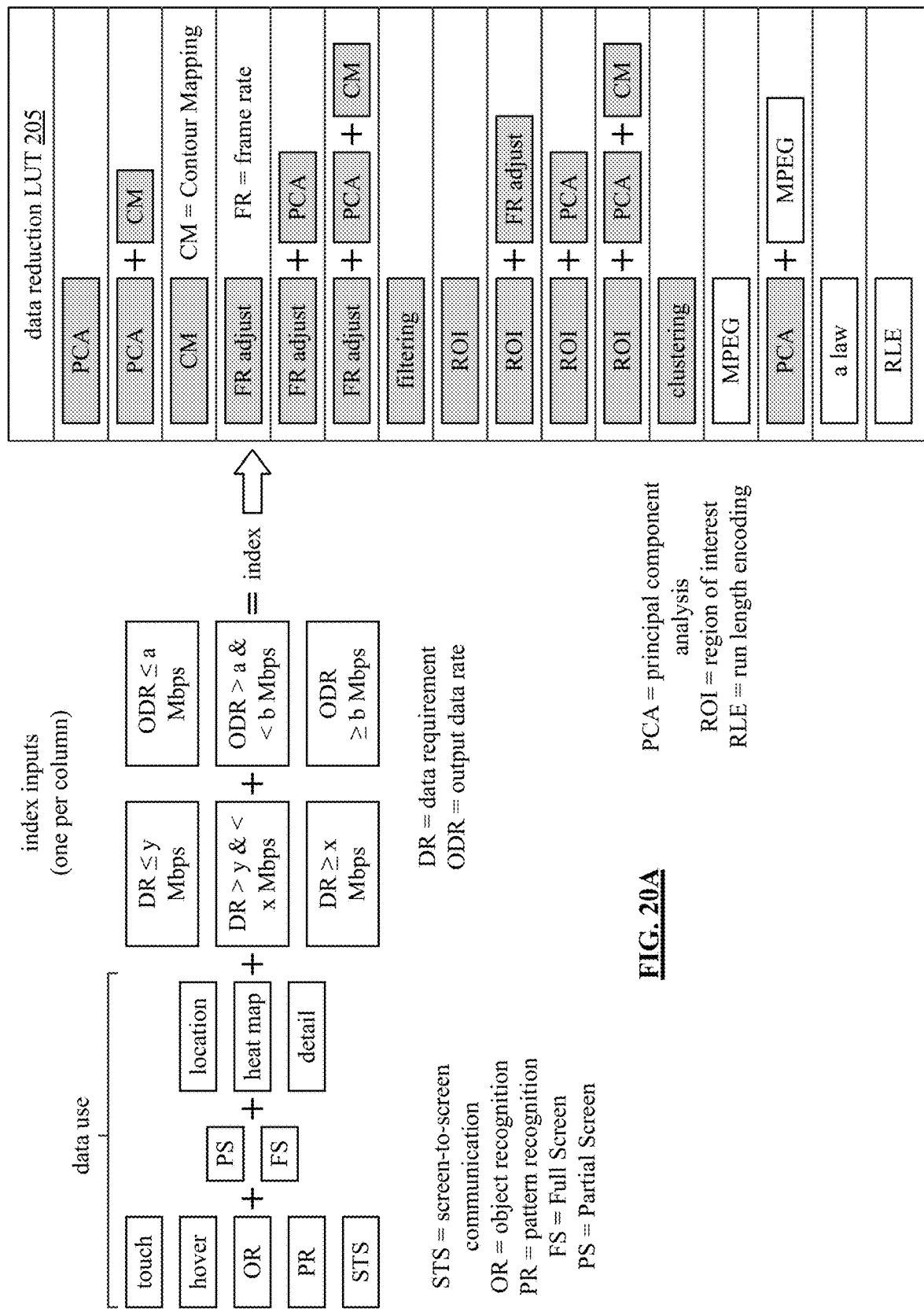
FIG. 20A is a schematic block diagram of an example of indexing a data reduction look up table (LUT) in accordance with the present invention.

FIG. 20A is a schematic block diagram of an example of indexing a data reduction look up table (LUT) to determine a data reduction scheme. Data use (type, screen, and nature), data requirements (DR), and output data rate (ODR) establish an index for accessing a look up table of data reduction schemes. A data reduction scheme includes one or more data reduction processes. For example, a first indexable data reduction scheme includes a data reduction process of PCA (principal component analysis); a second indexable data reduction scheme includes a data reduction process of PCA and CM (contour mapping); a third indexable data reduction scheme includes a data reduction process of CM; and so on. Note that the LUT may include more or less data reduction processes than included in this example and may include more less combinations of data reduction processes.

The data type of data uses include touch, hover, object recognition (OR), pattern recognition (PR), and screen-to-screen communication (STS). The screen of the data uses include full screen (FS) and partial screen (PS) (e.g., one or more button, an identification area, etc.). The data nature of the data uses include location, heat map, and detail. Depending on the desired use of the touch data, the data use types, screen, and data use nature may be in any combination. For example, for a button activation, the use type is touch, the screen is partial, and the use nature is location. For these conditions, only x-y coordinates of a touch in a specific area need to be captured, transmitted, and subsequently processed. Thus, the data requirements would be relatively low (e.g., less than y Mbps, where "y" is any number greater than 0). Depending on the output data rate, the particular data reduction scheme is selected.

As an example of an indexing function, data use type is represented by 3-bits, data use screen is represented by 1-bit, data requirements is represented by 2 or more bits, and output data rate is represented by e or more bits. Thus, an index includes 8 or more bits with the first 3-bits corresponding to data use type, the next bit corresponding to data use screen, the next 2 or more bits corresponding to data requirements, and the last 2 or more bits corresponding to the output data rate. Particular data schemes are placed in the LUT to correspond to a desired index value. A few examples are shown in FIGS. 20B-20D.

Figure 20B:
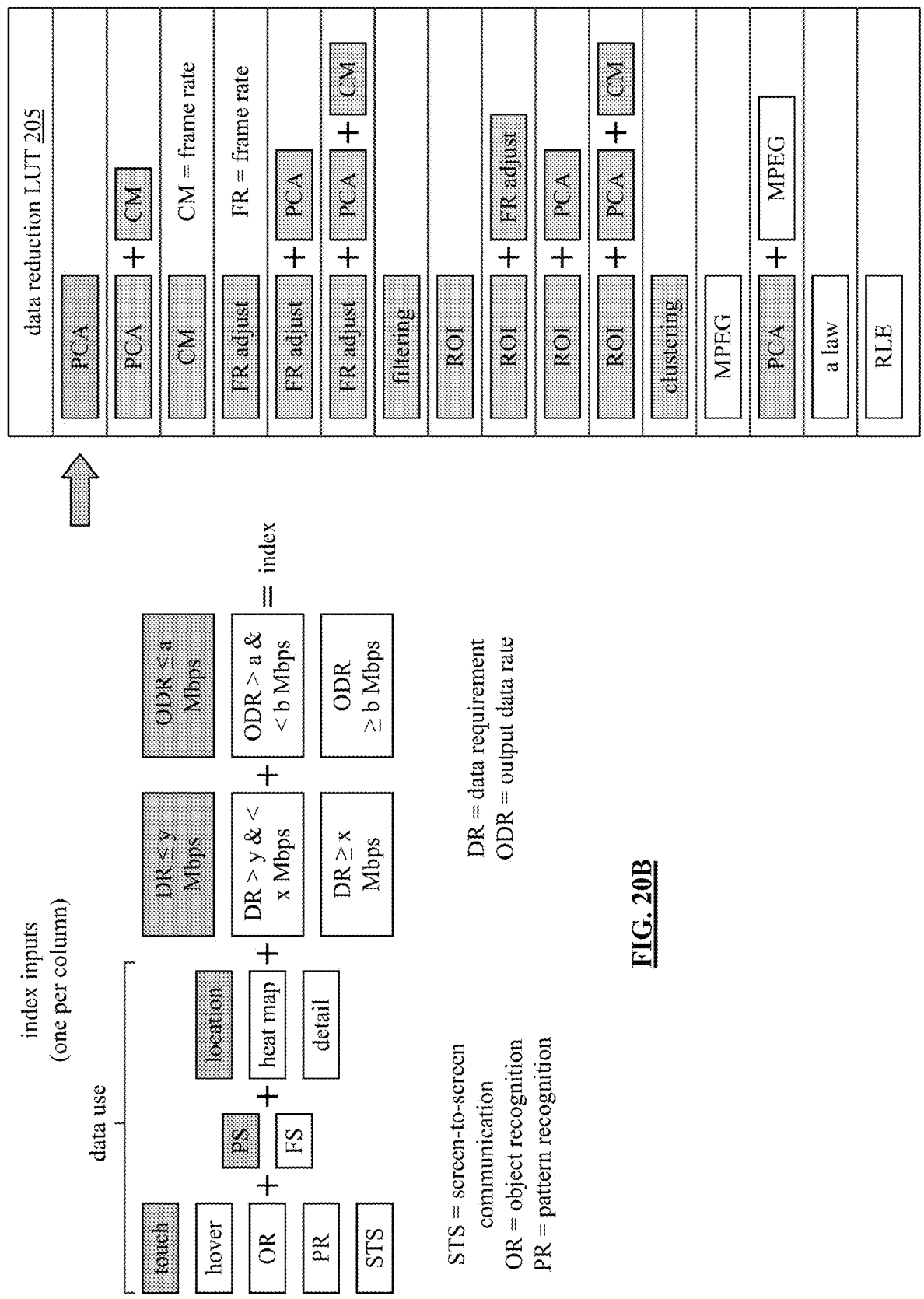
FIGS. 20B-20D are schematic block diagrams of specific examples of indexing a data reduction look up table (LUT) in accordance with the present invention.

FIG. 20B is a schematic block diagram of a specific example of indexing a data reduction look up table (LUT). In this example, the data use includes touch as a type, partial screen (PS) as a screen, and location as a nature. With touch having a 001 3-bit pattern, PS having a 0 1-bit pattern, and location having 01 2-bit pattern, the first six bits of the index are 001 0 01. The data requirements (DR) are less than y Mbps, which has a 2-bit pattern of 01. The output data rate (ODR) is less than "a" Mbps, which has a 2-bit pattern of 01. Thus, the 8-bit index is 001 0 01 01 01. In this example, the data reduction scheme at index 001 0 01 01 01 is PCA. Note that a variety of data reduction schemes could be chosen for these index inputs based on processing resources, data reduction processes available, design preferences, and/or other factors.

Figure 20C:
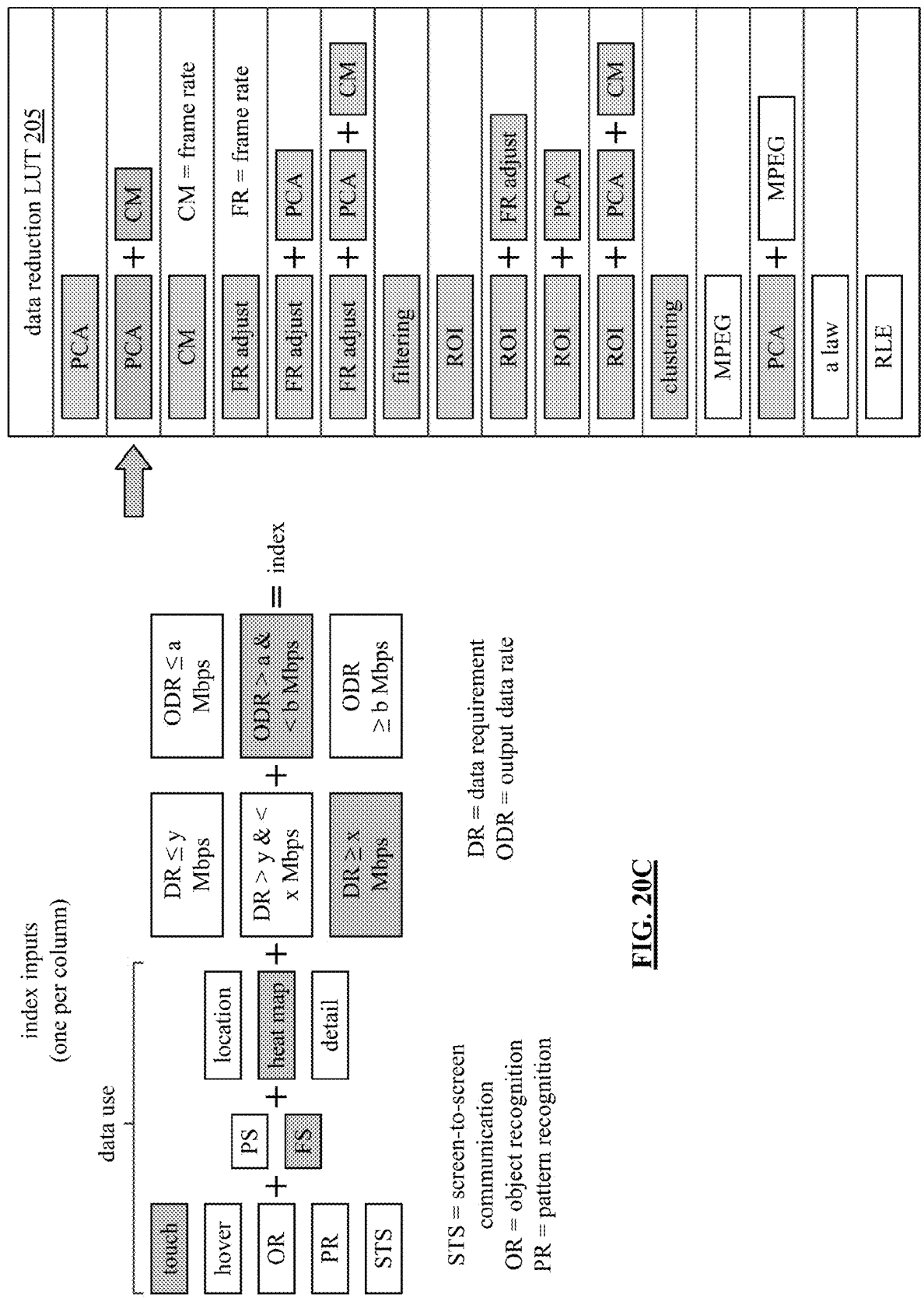

FIG. 20C is a schematic block diagram of another specific example of indexing a data reduction look up table (LUT). In this example, the data use includes touch as a type, full screen (FS) as a screen, and heat map as a nature. With touch having a 001 3-bit pattern, FS having a 1 1-bit pattern, and heat map having 10 2-bit pattern, the first six bits of the index are 001 1 10. The data requirements (DR) are greater than x Mbps, which has a 2-bit pattern of 11. The output data rate (ODR) is between "a" Mbps and "b" Mbps, which has a 2-bit pattern of 10. Thus, the 8-bit index is 001 1 10 11 10. In this example, the data reduction scheme at index 001 1 10 11 10 is PCA plus CM.

Figure 20D:
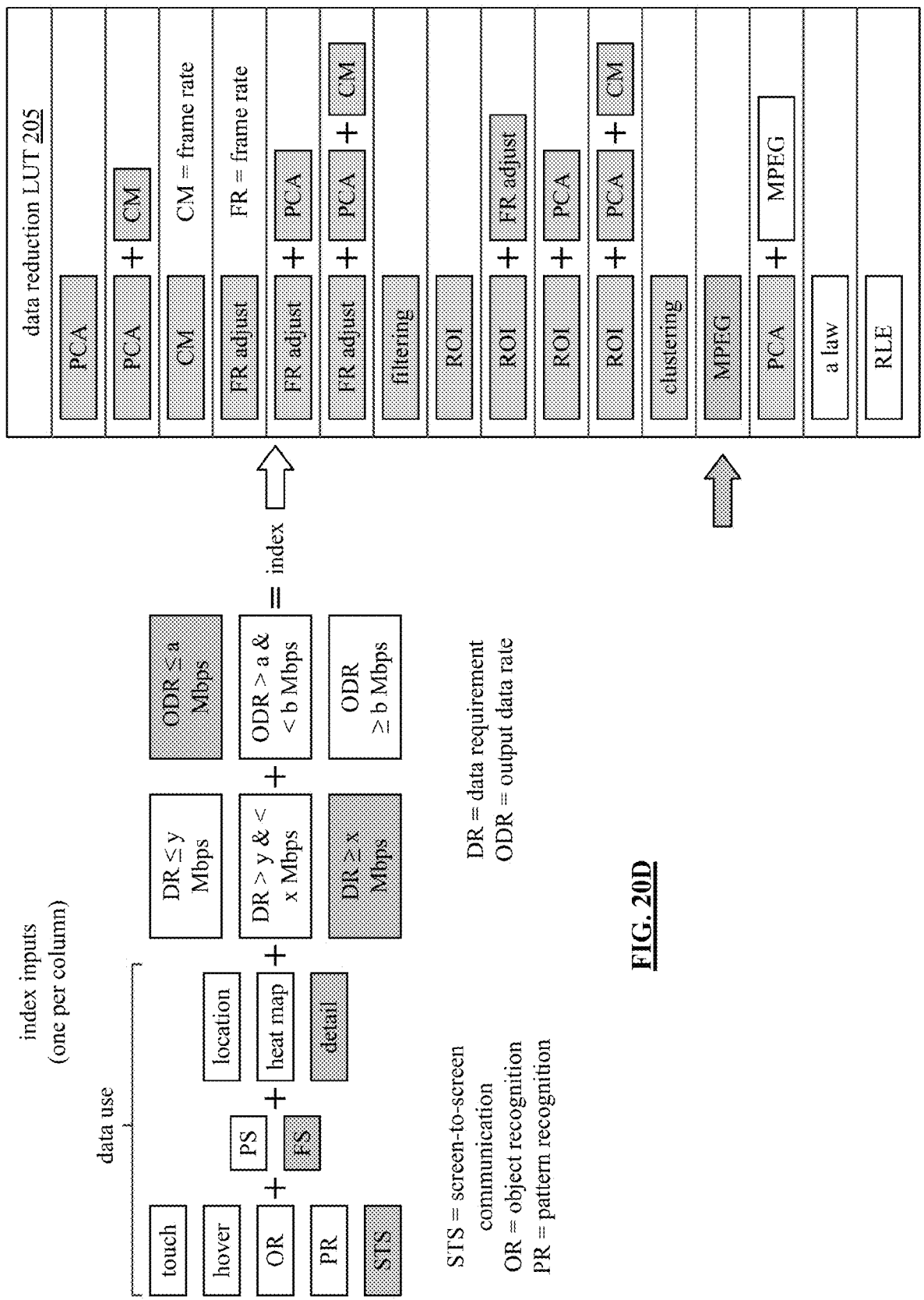

FIG. 20D is a schematic block diagram of another specific example of indexing a data reduction look up table (LUT). In this example, the data use includes STS as a type, full screen (FS) as a screen, and detail as a nature. With STS having a 101 3-bit pattern, FS having a 1 1-bit pattern, and detail having 11 2-bit pattern, the first six bits of the index are 101 1 11. The data requirements (DR) are greater than x Mbps, which has a 2-bit pattern of 11. The output data rate (ODR) is less than "a" Mbps, which has a 2-bit pattern of 01. Thus, the 8-bit index is 101 1 11 11 01. In this example, the data reduction scheme at index 101 1 11 11 01 is MPEG.

Figure 21:
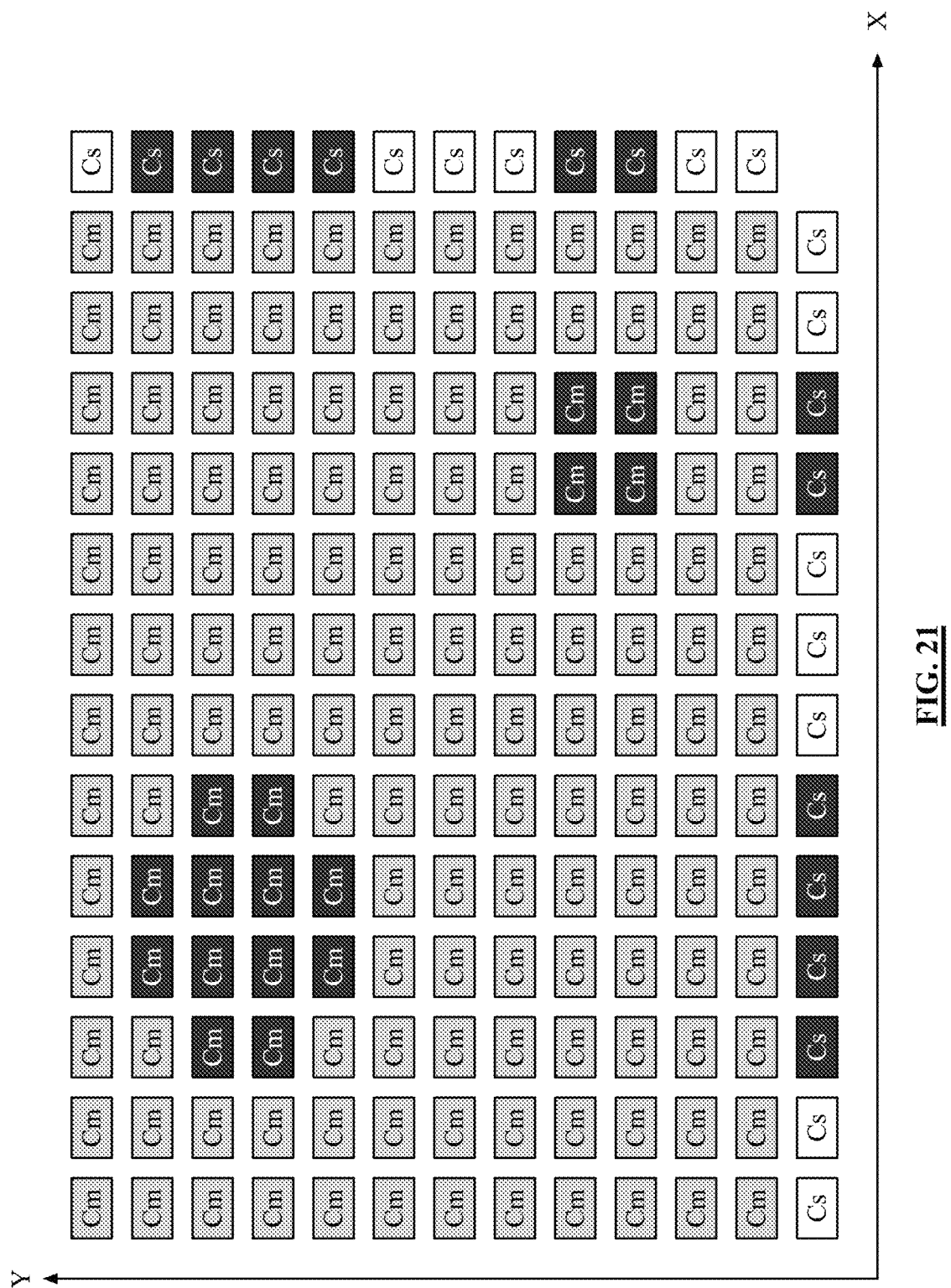
FIG. 21 is a schematic block diagram of an example of capacitance grid data in accordance with the present invention.

FIG. 21 is a schematic block diagram of an example of a frame of capacitance grid data that includes a plurality of mutual capacitances (Cm) and a plurality of self-capacitances (Cs). The capacitances are arranged in rows and columns corresponding to the electrode rows and electrode columns. Recall that an intersection of a row electrode and a column electrode for a mutual capacitance; the row electrode has a self-capacitance with respect to a ground path; and the column electrode has a self-capacitance with respect to the ground path.

The dark shaded capacitances indicate a capacitance change from a baseline capacitance value (capacitance value without an external stimulus). The light gray shaded mutual capacitances are approximately equal to their baseline capacitance value and the white shaded self-capacitances are approximately equal to their baseline capacitance value.

Figure 22:
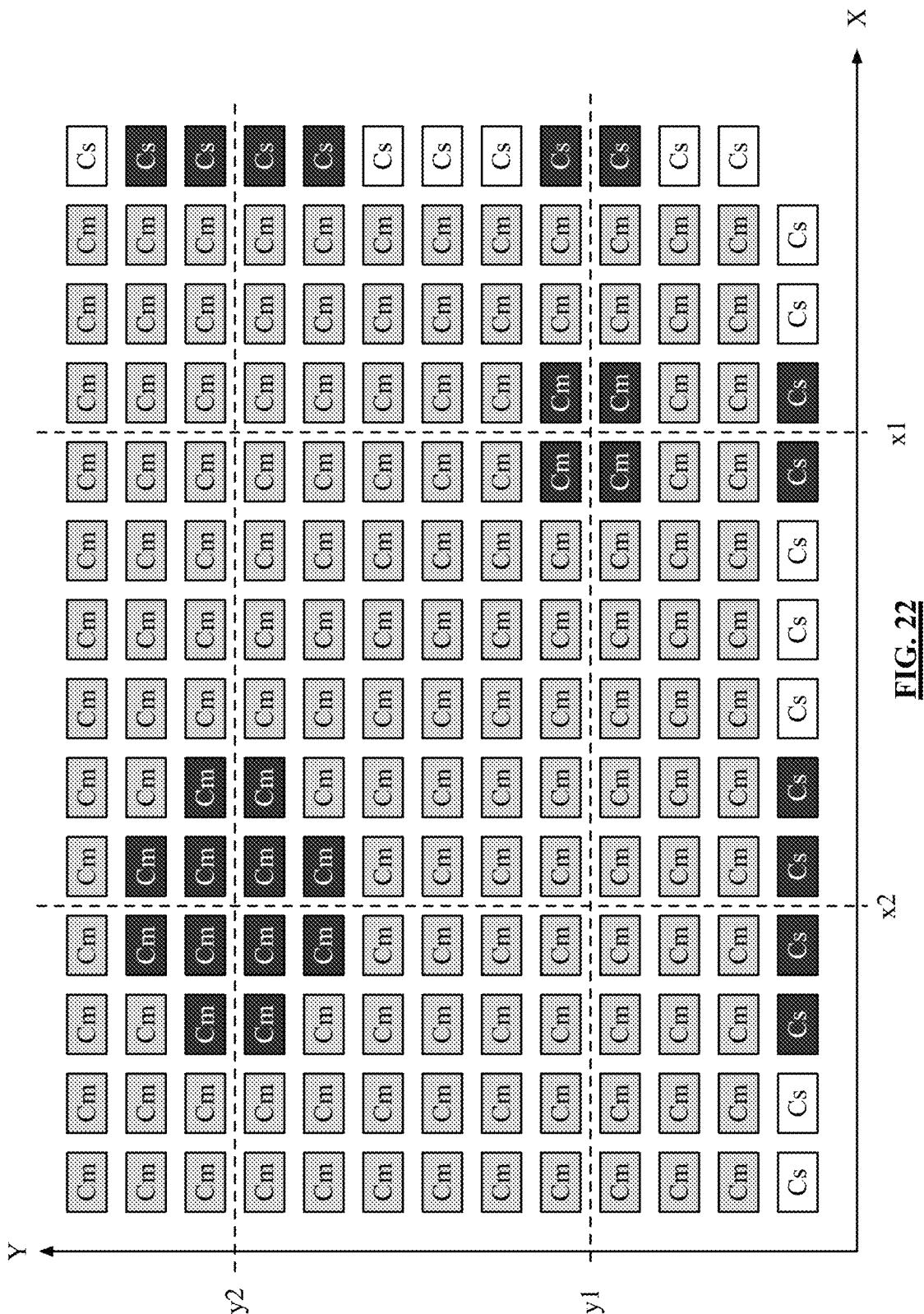
FIG. 22 is a schematic block diagram of an example of x-y coordinates of capacitance grid data caused by touches in accordance with the present invention.

A variety of techniques can be used to reduce the data for this frame of capacitive grid data. For example, as shown in FIG. 22, the frame of capacitive grid data can be reduced to x-y coordinates for a touch. In this example, the x-y coordinates correspond to an approximate center of each touch. The larger touch is centered at x2, y2 and the smaller touch is centered at x1, y1. Thus, for this frame of capacitive grid data, the data can be reduced to the x and y coordinates for the two touches.

Figure 23:
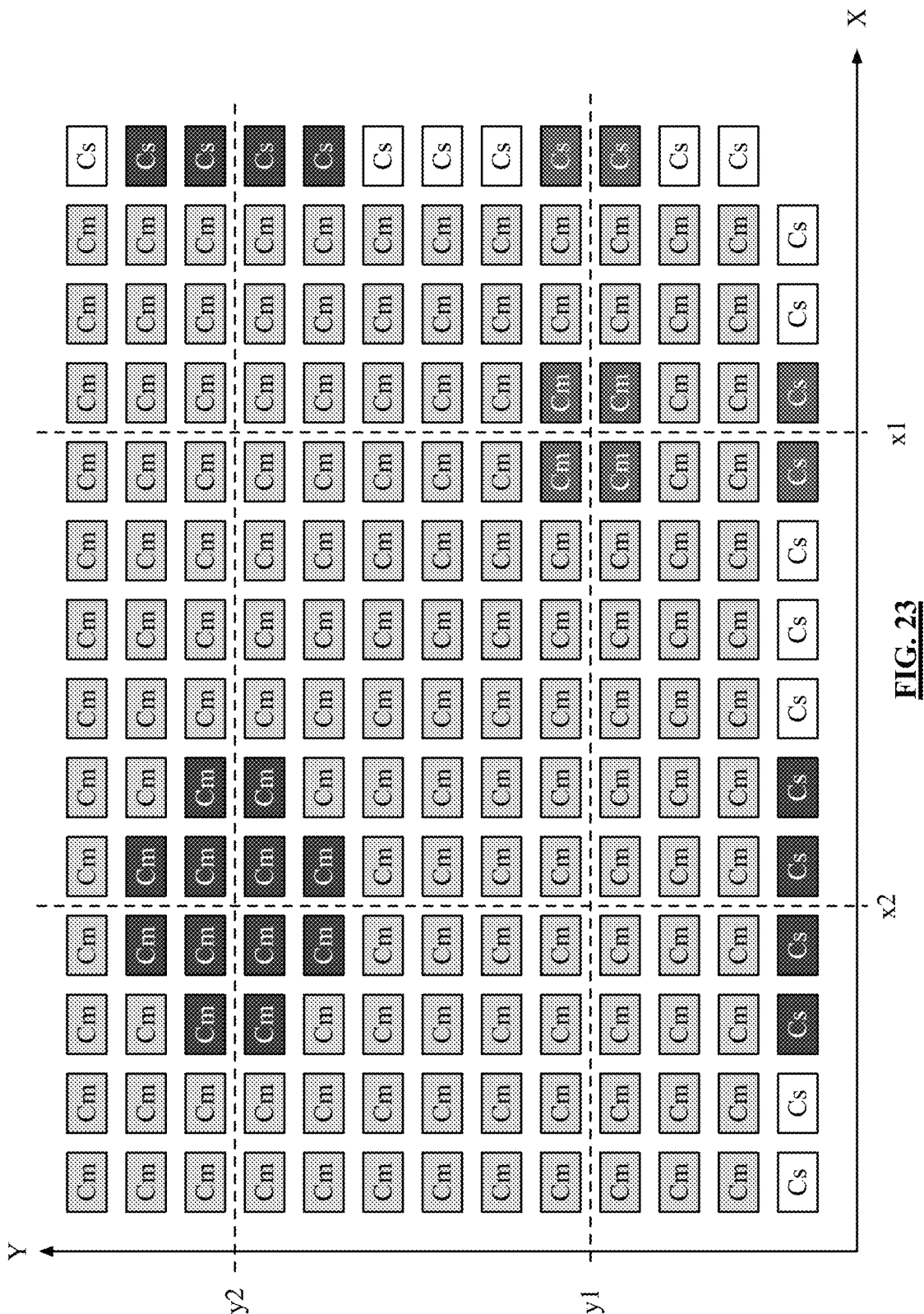
FIG. 23 is a schematic block diagram of an example of x-y coordinates of capacitance grid data caused by hovers in accordance with the present invention.
Figure 24:
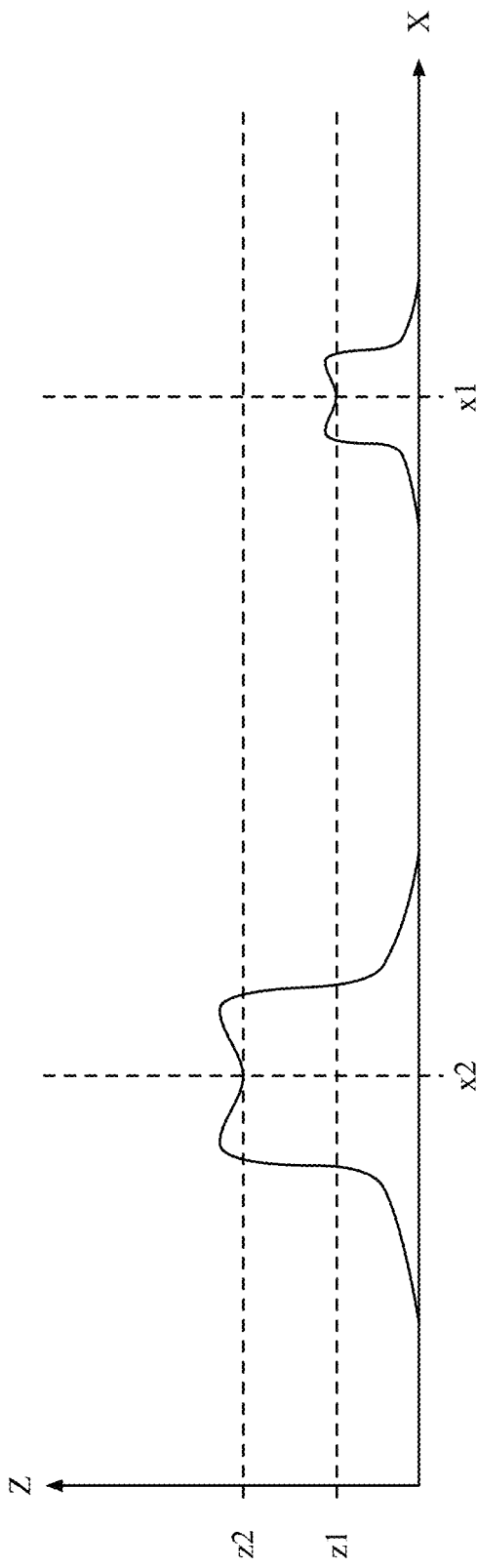
FIG. 24 is a schematic block diagram of an example of x-z coordinates of capacitance grid data caused by hovers in accordance with the present invention.
Figure 25:
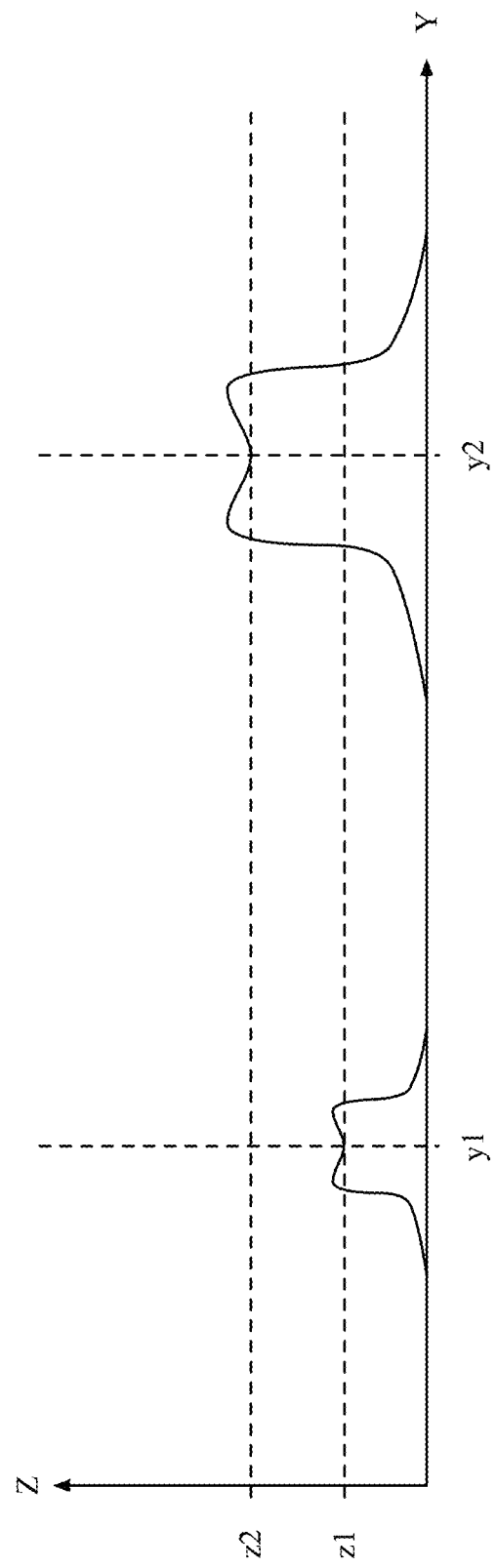
FIG. 25 is a schematic block diagram of an example of y-z coordinates of capacitance grid data caused by hovers in accordance with the present invention.

FIG. 23 is an example for reducing data of hovers. In this example, the x-y-z coordinates for the hover are determined and sent as the frame of capacitive grid data. The x-y coordinates indicate the position on the touch screen and the z-coordinate corresponds to a distance from the touch screen. FIG. 24 illustrates an example of x-z coordinates of capacitance grid data caused by the hovers of FIG. 23. FIG. 25 illustrates an example of y-z coordinates of capacitance grid data caused by the hovers of FIG. 23.

Figure 26:
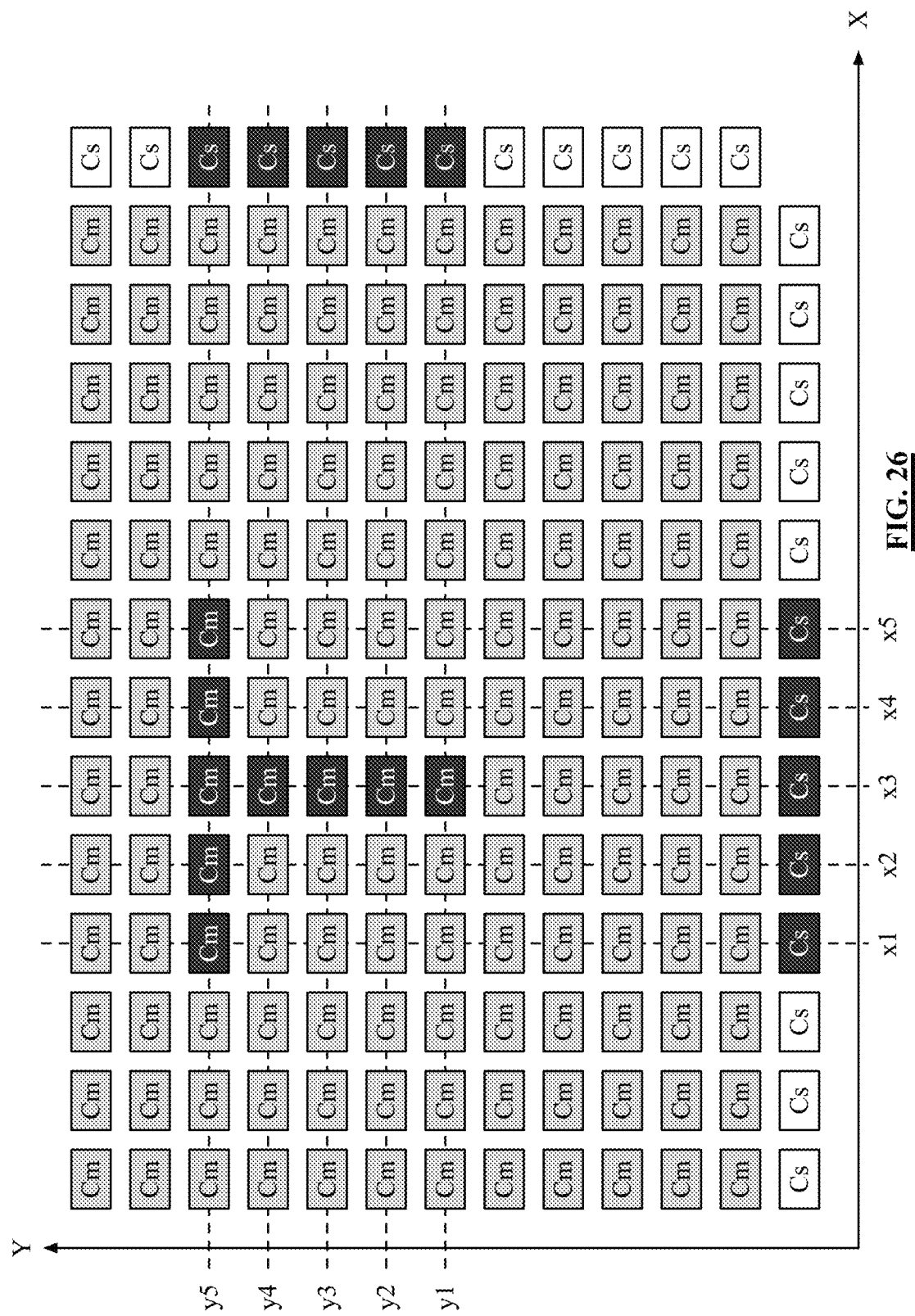
FIG. 26 is a schematic block diagram of an example of x-y coordinates of capacitance grid data caused by a pattern, an object, and/or a screen-to-screen communication element with a ground path in accordance with the present invention.

FIG. 26 is a schematic block diagram of an example of x-y coordinates of capacitance grid data caused by a pattern, an object, and/or a screen-to-screen communication element. In this example, there is a ground path connection between the item causing the capacitance change and the touch screen. As such, self and mutual capacitances are changed. For pattern recognition, the pattern could be created by an item placed on the screen with a marking to provide the pattern. For example, an item has a serial number stenciled on it, where the stenciled serial number is done using a material that affects proximal capacitances of the capacitive grid. The pattern could also be created via signaling that affects the proximal capacitances of the capacitive grid.

For object recognition, an object includes one or more materials that affect proximal capacitances of the capacitive grid. The manner in which the objects affect the proximal capacitances are used to identify the object.

For screen to screen communication, signaling from one device is communicated through the body to another device. As such, both touch and signal recognition are active. In another embodiment, the devices are in a proximal position to each other such that signaling on the electrode grid of one device is received by the electrode grid of the other device.

The amount of data to convey a frame of capacitive grid data for each of pattern recognition, object recognition, and screen to screen communication can vary greater. For example, the x-y-z coordinates of the affected capacitances is sent. As another example, the entire capacitive grid data per frame is sent.

Figure 27:
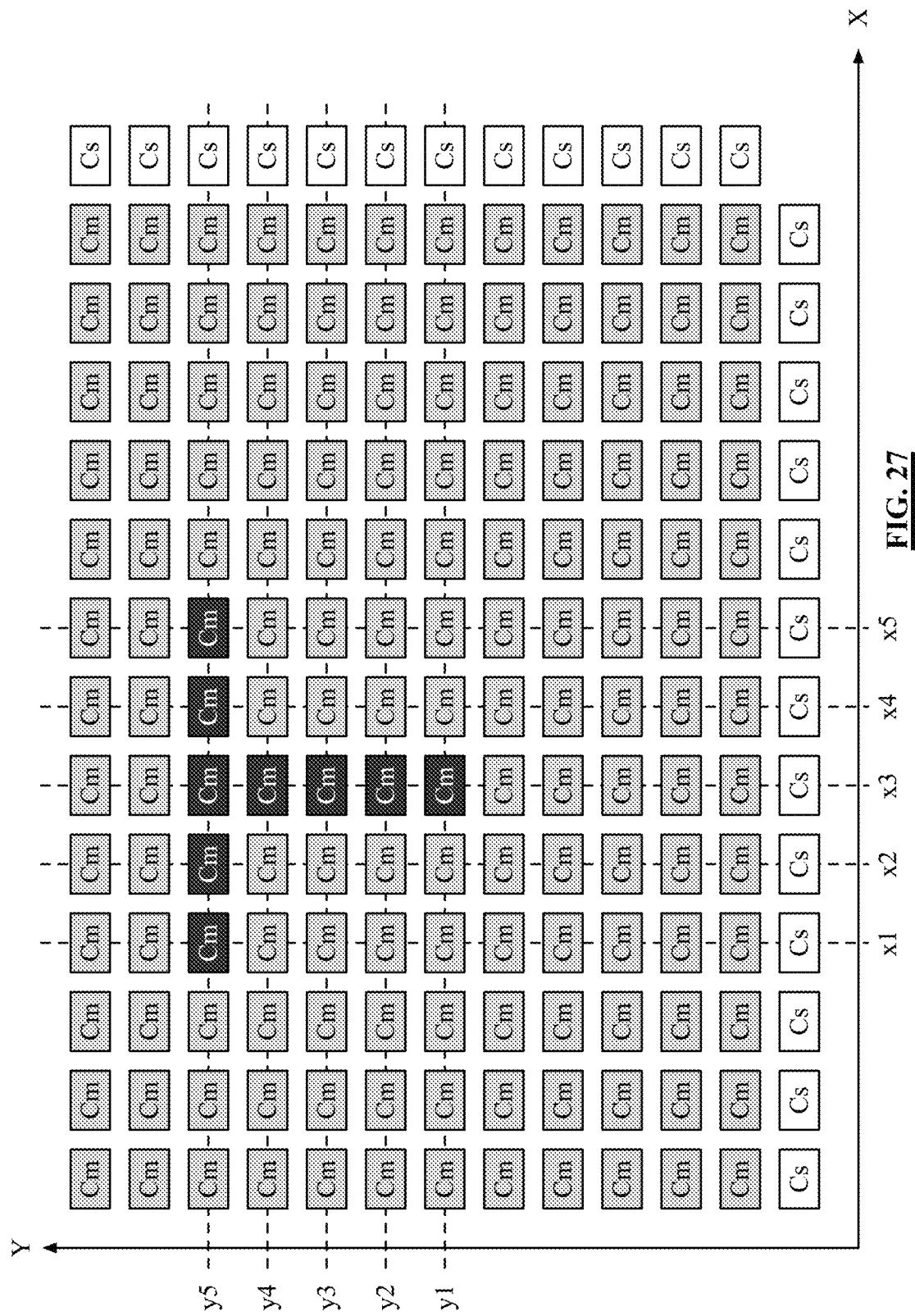
FIG. 27 is a schematic block diagram of an example of x-y coordinates of capacitance grid data caused by a pattern, an object, and/or a screen-to-screen communication element without a ground path in accordance with the present invention.

FIG. 27 is a schematic block diagram of an example of x-y coordinates of capacitance grid data caused by a pattern, an object, and/or a screen-to-screen communication element similar to the example of FIG. 26 with a difference being the example of FIG. 27 does not include a ground path. As such, only the mutual capacitances are effected by the object, pattern, and/or STS communication. In this example, there is no need to send the capacitance values for the self-capacitances of the electrodes.

Figure 28:
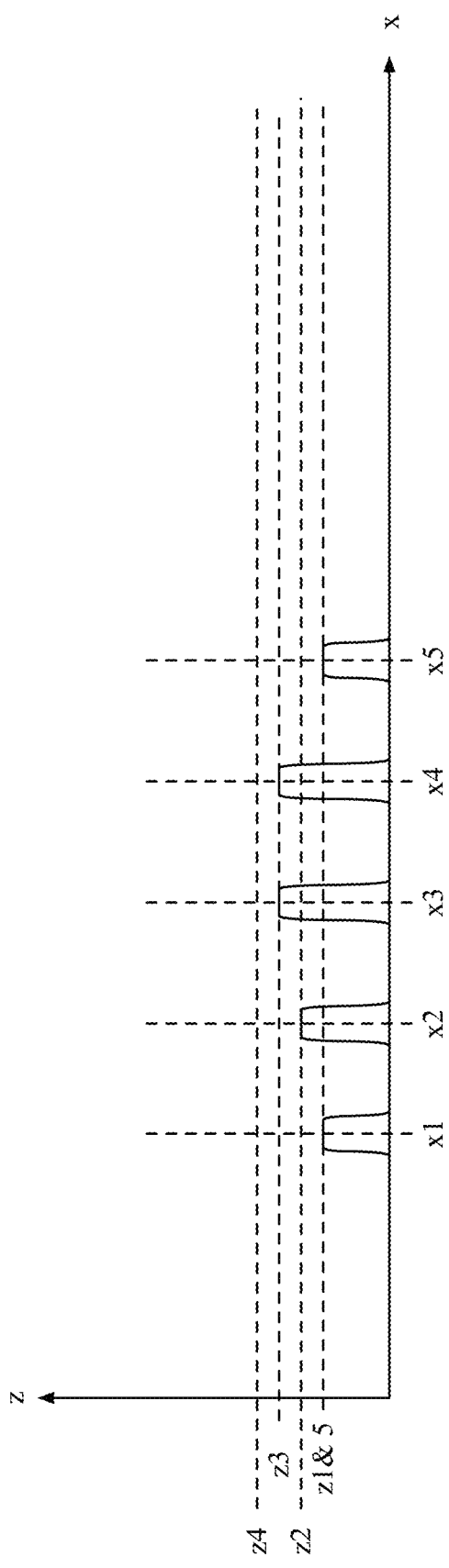
FIG. 28 is a schematic block diagram of an example of x-z coordinates of capacitance grid data caused by a pattern, an object, and/or a screen-to-screen communication element in accordance with the present invention.
Figure 29:
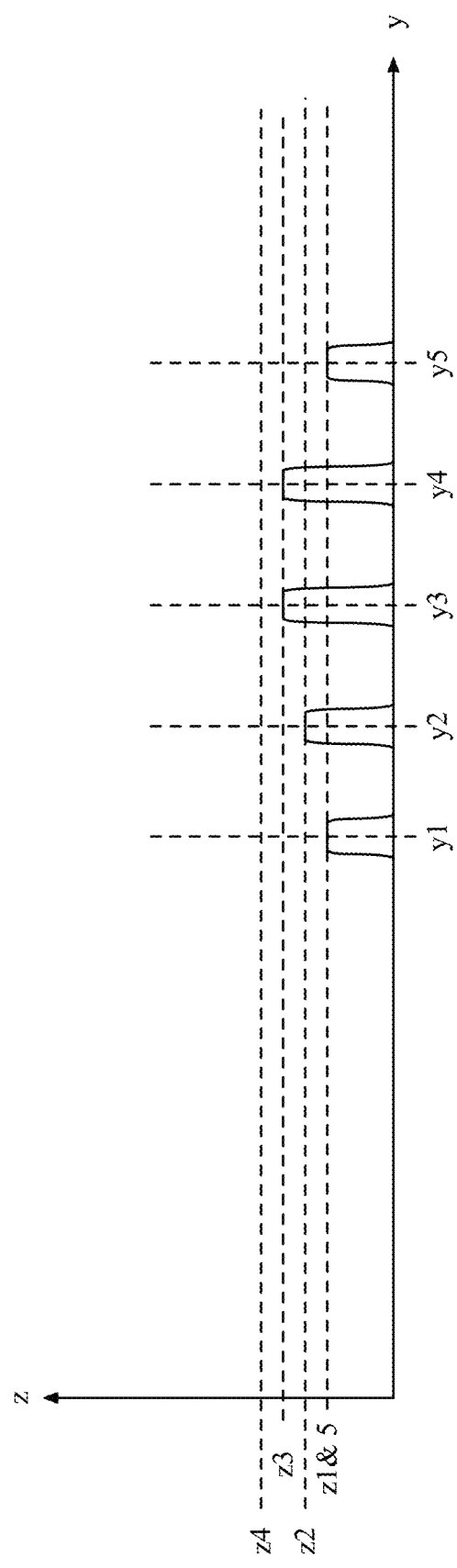
FIG. 29 is a schematic block diagram of an example of y-z coordinates of capacitance grid data caused by a pattern, an object, and/or a screen-to-screen communication element in accordance with the present invention.

FIG. 28 is a schematic block diagram of an example of x-z coordinates of capacitance grid data caused by a pattern, an object, and/or a screen-to-screen communication element of the examples of FIGS. 26 and 27. FIG. 29 is a schematic block diagram of an example of y-z coordinates of capacitance grid data caused by a pattern, an object, and/or a screen-to-screen communication element of the examples of FIGS. 26 and 27.

Figure 30:
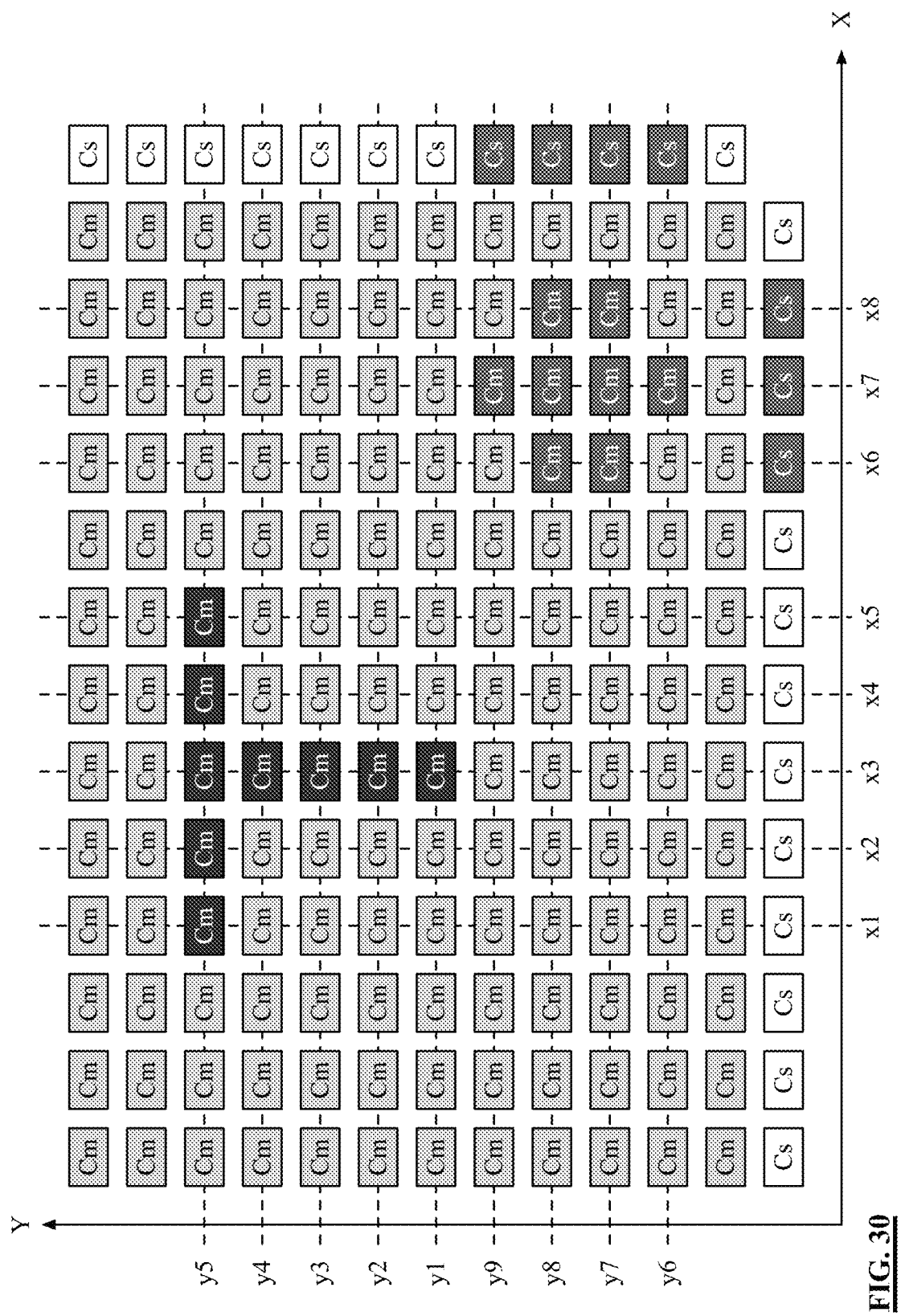
FIG. 30 is a schematic block diagram of an example of x-y coordinates of capacitance grid data caused by a pattern, an object, and/or a screen-to-screen communication element and a touch and/or hover in accordance with the present invention.

FIG. 30 is a schematic block diagram of an example of x-y coordinates of capacitance grid data caused by a pattern, an object, and/or a screen-to-screen (STS) communication element and a concurrent touch and/or hover. This example is a combination of FIG. 27 and FIGS. 21 and/or 23. In this instance, the pattern, object, and/or STS communication element has different data requirements than the touch and/or hover. As such, the capacitive grid data for the touch and/or hover is processed as discussed with reference to FIGS. 21 and/or 23 and the capacitive grid data for the pattern, object, and/or STS communication element is processed as discussed with reference to FIG. 27.

Figure 31:
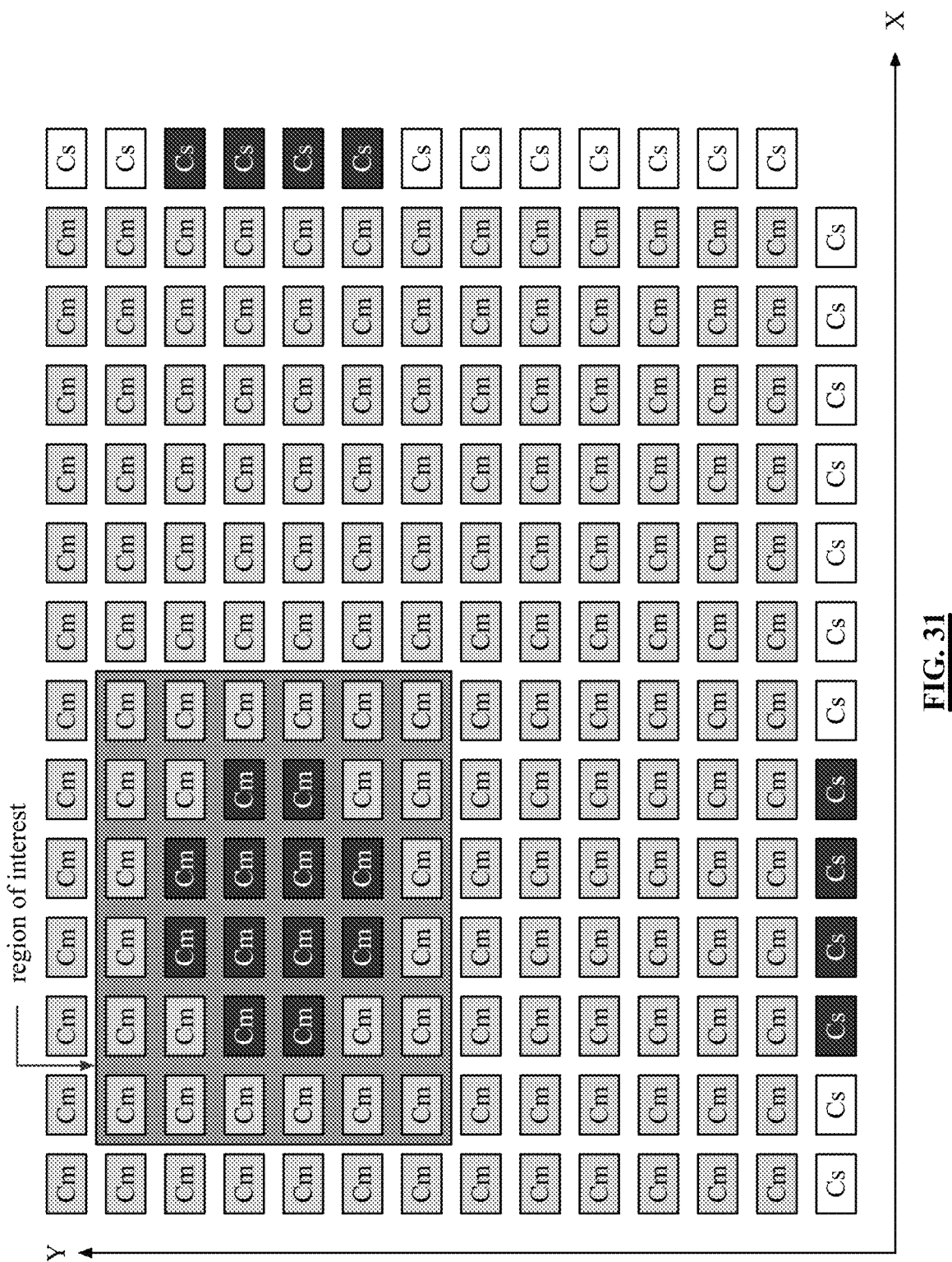
FIG. 31 is a schematic block diagram of an example of capacitance grid data caused by a touch, a hover, a pattern, an object, and/or a screen-to-screen communication element within a region in accordance with the present invention.

FIG. 31 is a schematic block diagram of an example of capacitance grid data caused by a touch, a hover, a pattern, an object, and/or a screen-to-screen communication element within a region of interest. As shown, the region of interest surrounds the capacitance effect (dark shaded capacitances) to ensure that the entire capacitance effect is captured. In addition, the region of interest is used for anticipating movement of the capacitance effect from frame to frame. For region of interest, the capacitive grid data includes the mutual capacitance values and/or the self-capacitance values associated with the grid.

Figure 32:
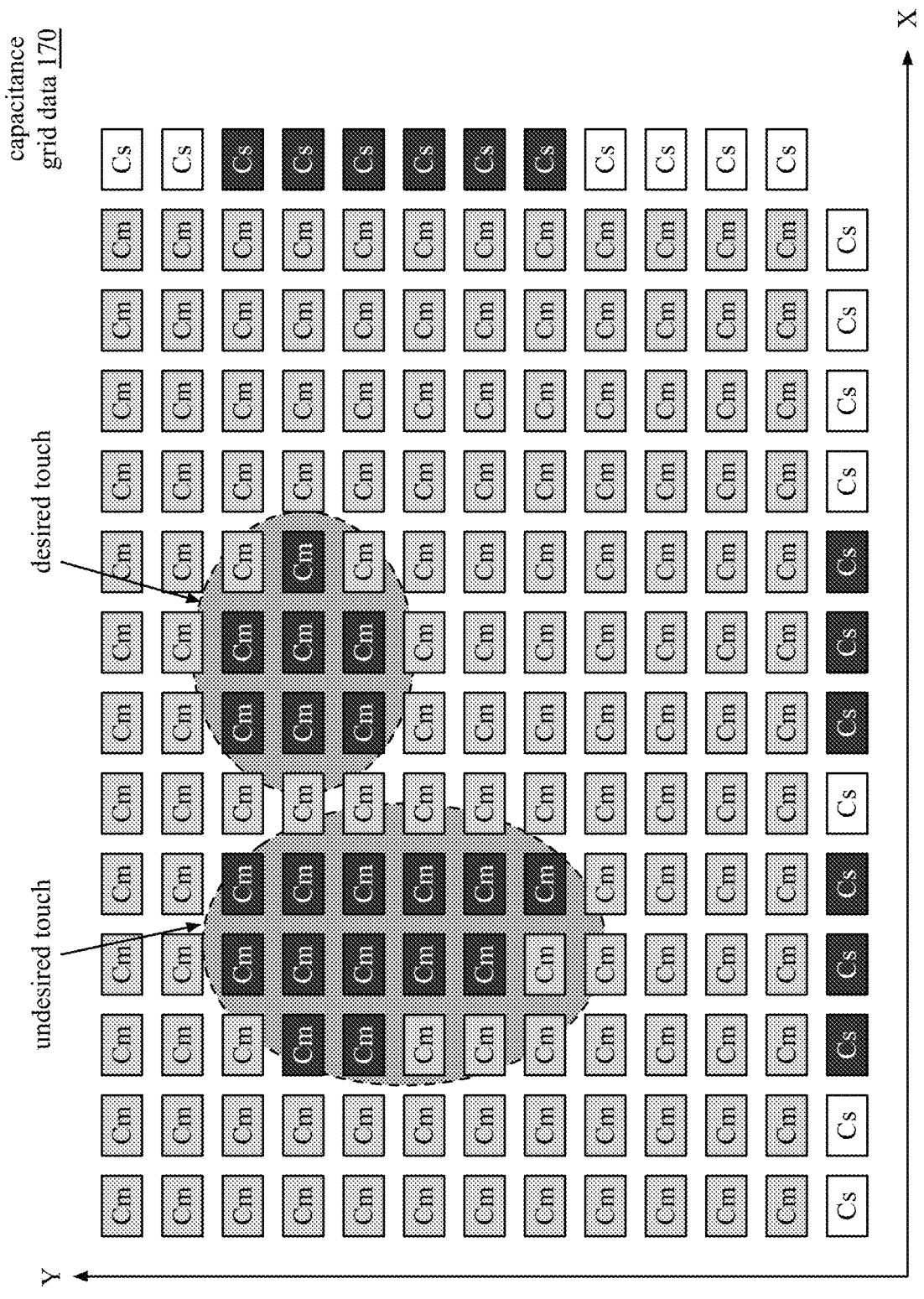
FIG. 32 is a schematic block diagram of an example of capacitance grid data caused by a desired touch and an undesired touch in accordance with the present invention.
Figure 33:
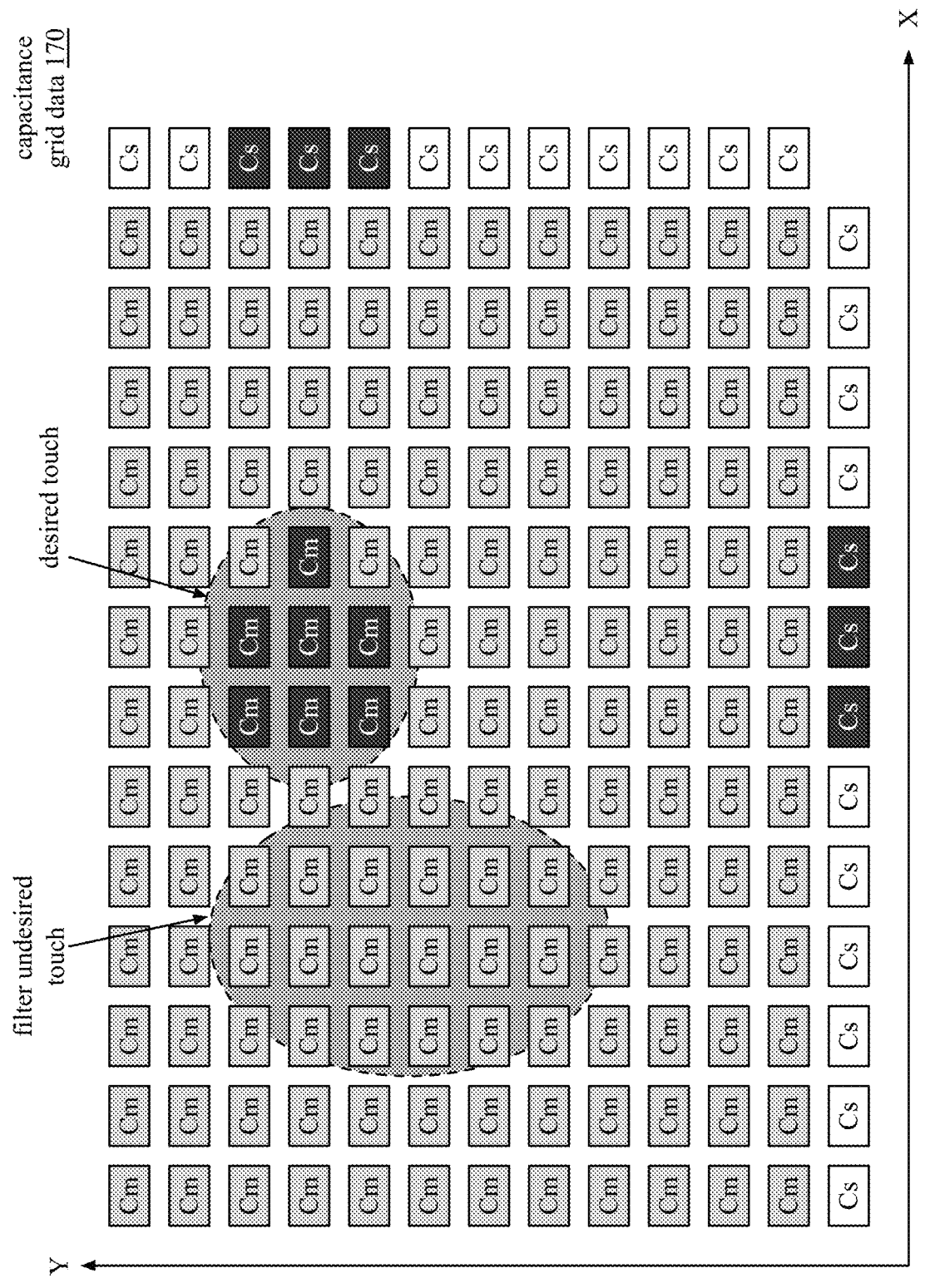
FIG. 33 is a schematic block diagram of an example of filtering the capacitive grid data to remove an undesired touch in accordance with the present invention.

FIG. 32 is a schematic block diagram of an example of filtering the capacitance grid data. In this example, the capacitances are affected by a desired touch and by an undesired touch. For example, the desired touch is a pen touch and the undesired touch is a hand resting on the screen. In this instance, the touches are classified into desired or undesired touches. The undesired touches are filtered (e.g., at least partially attenuated such that they are treated as non-touches). The desired touches are used substantially unattenuated. FIG. 33 illustrates the undesired touch of FIG. 32 being filtered. In this example, the undesired touch is filtered to represent a non-touch (i.e., remove the capacitance change from the capacitive grid data).

Figure 34:
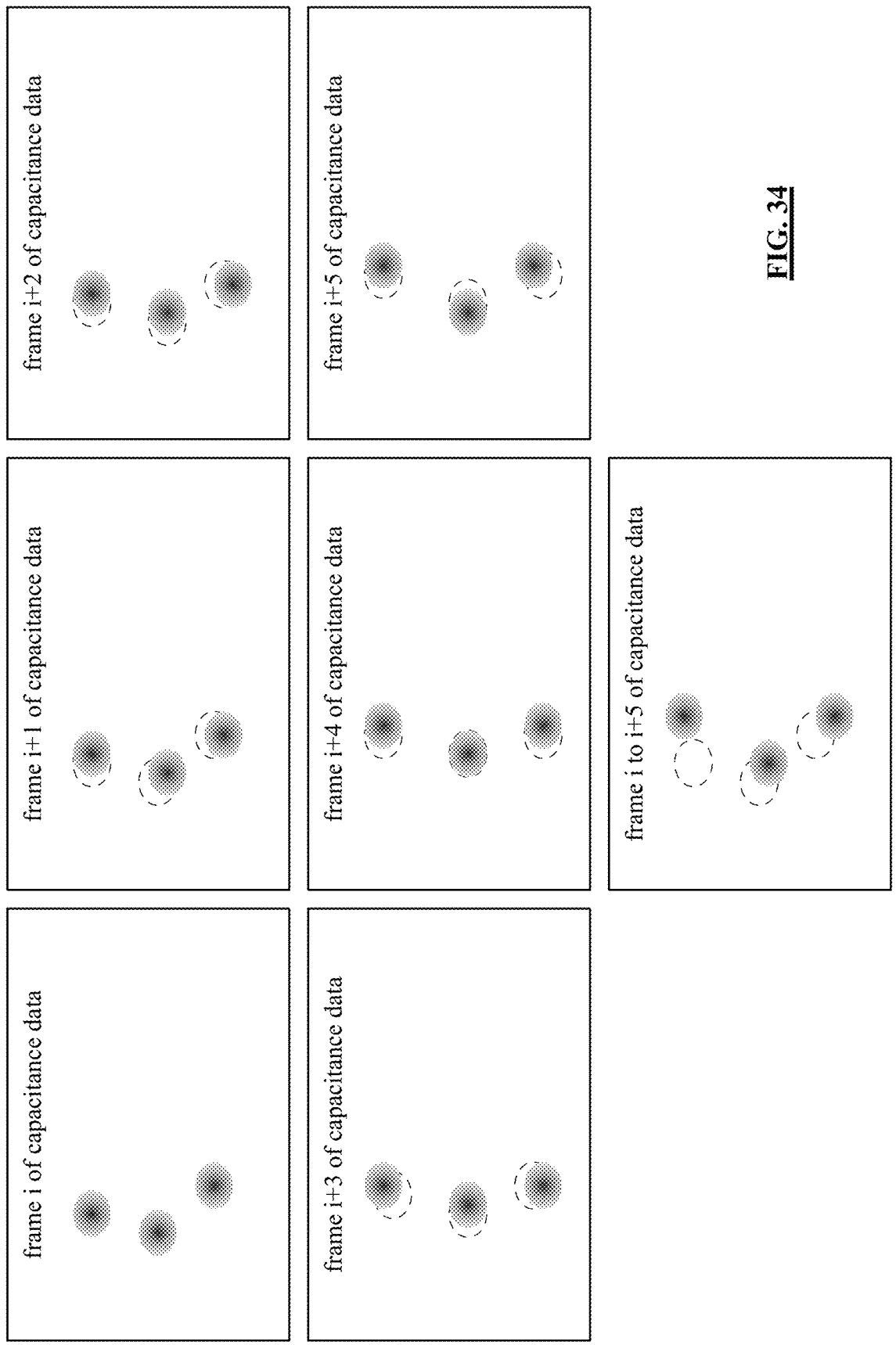
FIG. 34 is a schematic block diagram of an example of several frames of capacitive grid data with touches or hovers in accordance with the present invention.

FIG. 34 is a schematic block diagram of an example of several frames of capacitive grid data with touches or hovers that are moving from frame to frame. Depending on the speed of movement of the touches, some of the frames could be skipped to reduce the amount of capacitive grid data. For example, frames i+1, I+3, and i+5 could be skipped with negligible loss of relatively slow movement, while reducing the amount of data by 2 times.

As another example, the capacitive grid data could be encoding using MPEG encoding. In this example, frame i would include a full representation of the capacitive grid data, which could be reduced using another data reduction scheme. The remaining frames would be encoded to represent differences from frame i. This pattern would repeat for every n groupings of consecutive frames, where n is an integer equal to or greater than 3.

Figure 35:
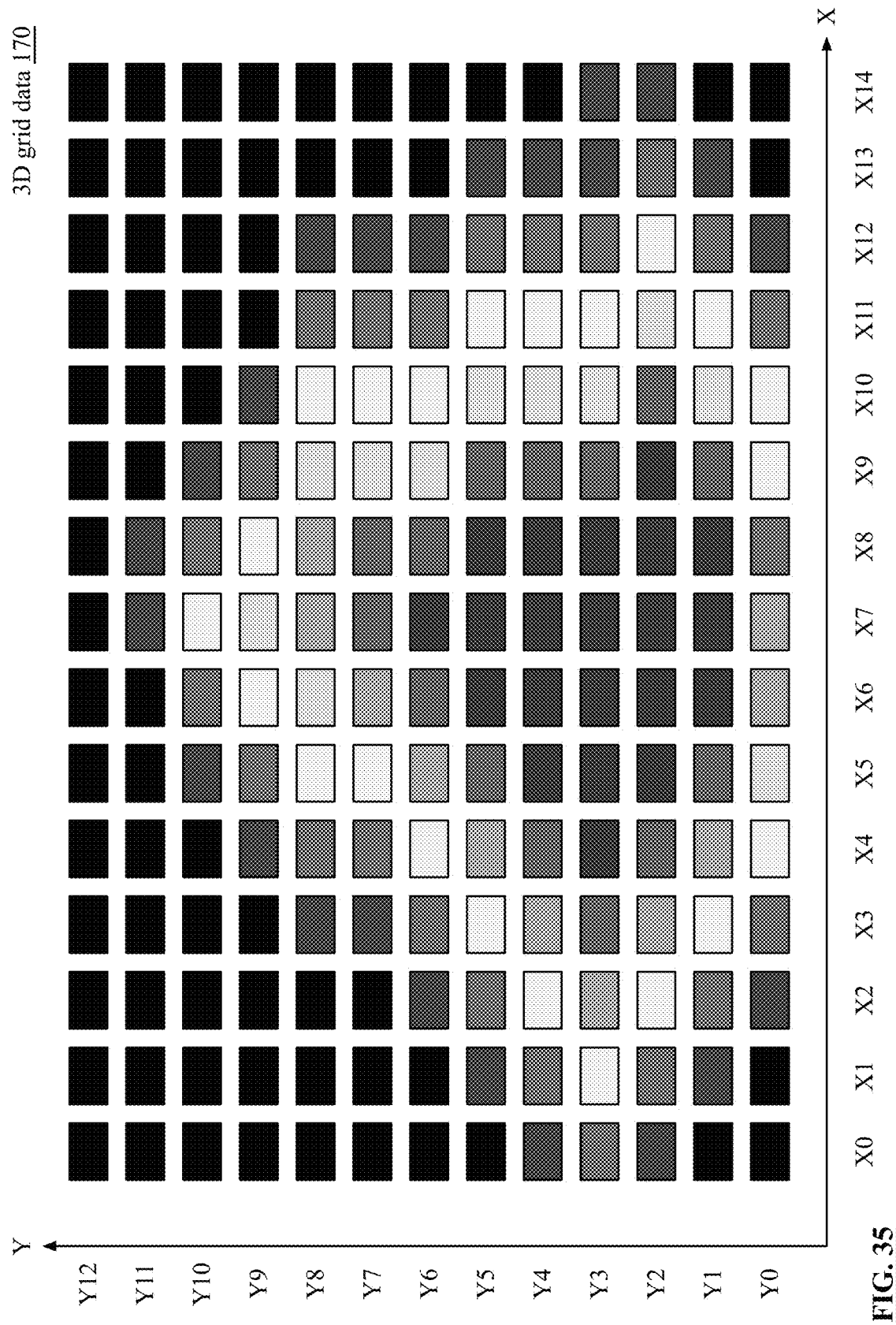
FIG. 35 is a schematic block diagram of an example of x-y-z values of a capacitive grid data forming a heat map in accordance with the present invention.

FIG. 35 is a schematic block diagram of an example of x-y-z values of a capacitive grid data forming a heat map. The color is represented of the z component divided into nine levels. Level 0 corresponds to no capacitance effect, which is represented by the black capacitance cells (a capacitance cell is a mutual capacitance or a self-capacitance). Level 1 corresponds to a capacitance change within a first range of values, which is represented by the blue capacitance cells. Level 2 corresponds to a capacitance change within a second range of values, which is represented by the green capacitance cells. Level 3 corresponds to a capacitance change within a third range of values, which is represented by the yellow capacitance cells.

Level 4 corresponds to a capacitance change within a fourth range of values, which is represented by the tangerine capacitance cells. Level 5 corresponds to a capacitance change within a fifth range of values, which is represented by the orange capacitance cells. Level 6 corresponds to a capacitance change within a sixth range of values, which is represented by the red capacitance cells. Level 7 corresponds to a capacitance change within a seventh range of values, which is represented by the dark red capacitance cells. Level 8 corresponds to a capacitance change within an eighth range of values, which is represented by the purple capacitance cells.

The 3D grid data 170 can be reduced using contour mapping. Contour mapping reduces the data per layer to a binary value. Per layer, binary transitions are determined to identify a one or more boundaries for the layer. The one or more boundaries per layer are transmitted as a contour map to represent the 3D grid data 170, which could be capacitive grid data, 3D image data, or 3D sensed data. FIGS. 36-62 provide examples of contour mapping of the 3D grid data of FIG. 35.

Figure 36:
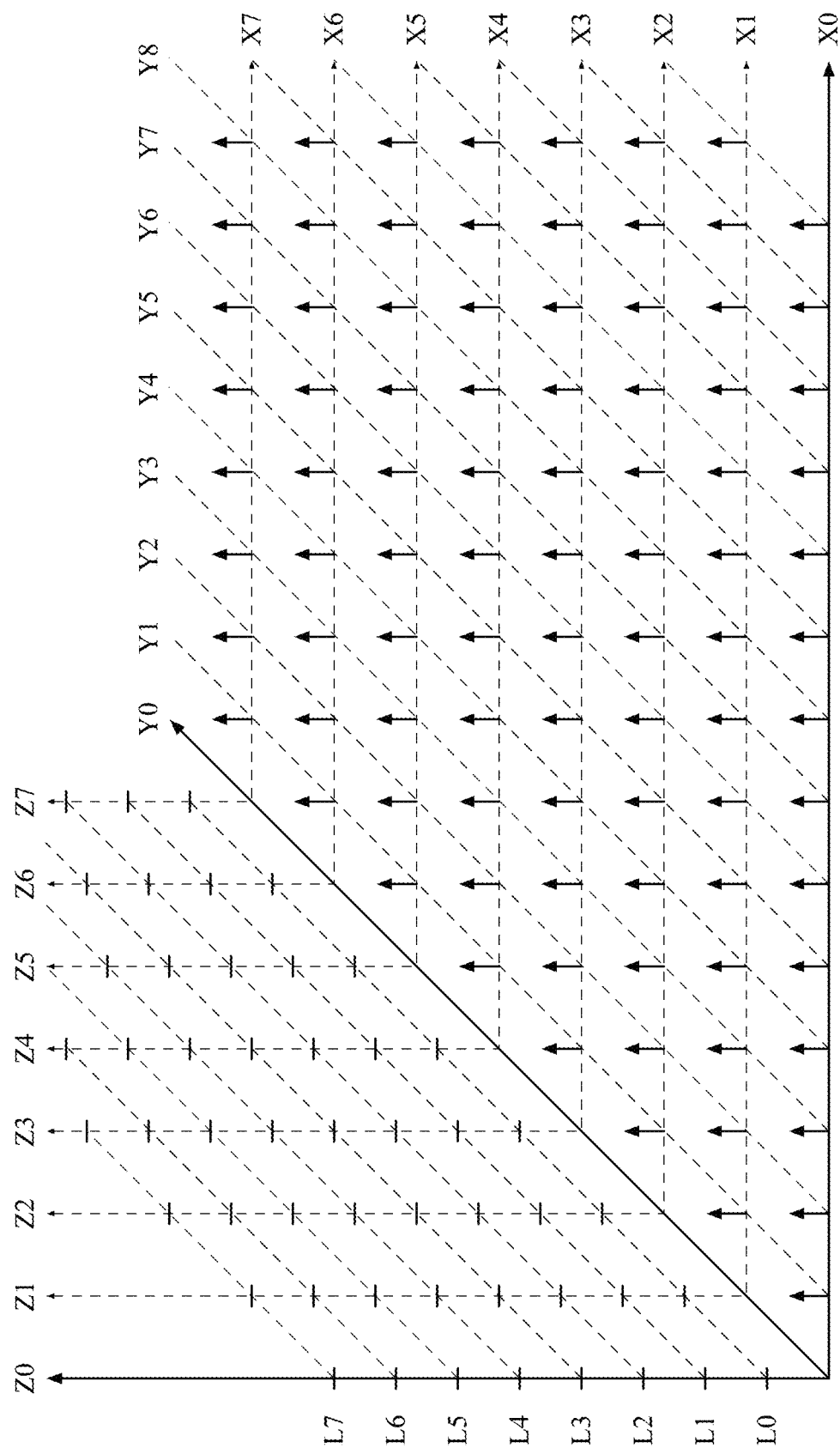
FIG. 36 is a schematic block diagram of an example of z-value layers of a capacitive grid data for contour mapping data reduction in accordance with the present invention.

FIG. 36 is a schematic block diagram of an example of z-value layers of a capacitive grid data for contour mapping data reduction. In this example, each capacitance (self and mutual capacitors) of the capacitive grid data have an x-y coordinate and a z-coordinate. The x-y coordinates are determined based on the physical position of the mutual capacitances and self-capacitances. The z-coordinate is determined based on the effect on the capacitances. The z-coordinate is divided into nine regions: below L0 is Level 0, which corresponds to capacitance values not affected. Level 1 is between L0 and L1; Level 2 is between L1 and L2; Level 3 is between L2 and L3; Level 4 is between L3 and L4; Level 5 is between L4 and L5; Level 6 is between L5 and L6; and Level 7 is between L6 and L7.

In this example, the level of effect on the capacitance is an absolute value. For example, for a touch, mutual capacitance decreases and self-capacitance increases. As another example, for a hover, mutual capacitance decreases and self-capacitance increases. Self and/or mutual capacitance values will vary up and/or down based on outside stimuli to the capacitors, where the outside stimuli include changing dielectric property, changing the area (physical or effective) of the capacitor plates, and/or changing the distance (physical or effective) between the capacitor plates.

Figures 37, 38:
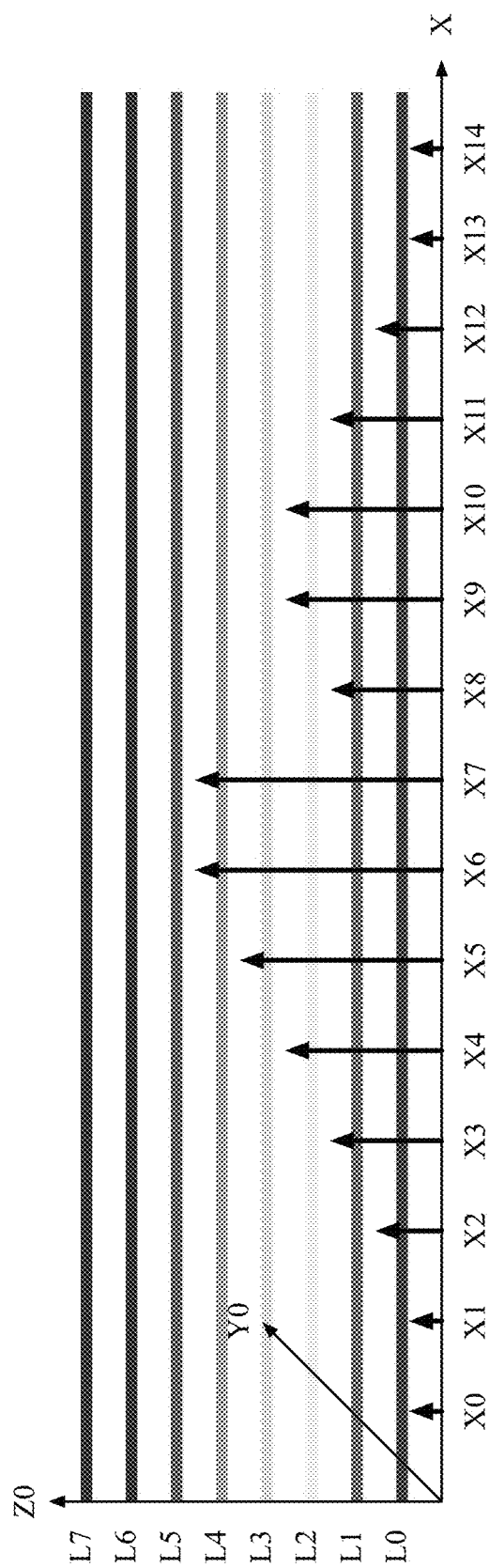
FIG. 37 is a schematic block diagram of an example of x-y0-z0 values for the capacitive grid of FIG. 35 in accordance with the present invention.
FIG. 38 is a diagram of an example of creating binary values for each layer of the data of FIG. 37 in accordance with the present invention.

FIG. 37 is a schematic block diagram of an example of x-y0-z0 values for the capacitive grid of FIG. 35. In this example, the capacitance values at x0, and at x1 are not affected and have a z value below L0; thus they are at Level 0 (which are black cells in FIG. 35). The capacitance value at x2 has a z value above L0 and below L1; thus it is at Level 1 (which is a blue cell in FIG. 35). The capacitance value at x3 has a z value above L1 and below L2; thus it is at Level 2 (which is a green cell in FIG. 35). The capacitance value at x4 has a z value above L2 and below L3; thus it is at Level 3 (which is a yellow cell in FIG. 35).

The capacitance value at x5 has a z value above L3 and below L4; thus it is at Level 4 (which is a tangerine cell in FIG. 35). The capacitance value at x6 has a z value above L4 and below L5; thus it is at Level 5 (which is an orange cell in FIG. 35). The capacitance value at x7 has a z value above L4 and below L5; thus it is at Level 5 (which is an orange cell in FIG. 35). The capacitance value at x8 has a z value above L1 and below L2; thus it is at Level 2 (which is a green cell in FIG. 35). The capacitance value at x9 has a z value above L2 and below L3; thus it is at Level 3 (which is a yellow cell in FIG. 35).

The capacitance value at x10 has a z value above L2 and below L3; thus it is at Level 3 (which is a yellow cell in FIG. 35). The capacitance value at x11 has a z value above L1 and below L2; thus it is at Level 2 (which is a green cell in FIG. 35). The capacitance value at x12 has a z value above L0 and below L1; thus it is at Level 1 (which is a blue cell in FIG. 35). The capacitance value at x13 has a z value below L0; thus it is at Level 0 (which is a black cell in FIG. 35). The capacitance value at x14 has a z value below L0; thus it is at Level 0 (which is a black cell in FIG. 35).

FIG. 38 is a diagram of an example of creating binary values for each layer of the data of FIG. 37. For the first layer, which corresponds to line L0 (the blue line), z values that fall below line L0 are set to 0 and z values above line L0 are set to 1. For the second layer, which corresponds to line L1 (the green line), z values that fall below line L1 are set to 0 and z values above line L1 are set to 1. For the third layer, which corresponds to line L2 (the yellow line), z values that fall below line L2 are set to 0 and z values above line L2 are set to 1.

For the fourth layer, which corresponds to line L3 (the tangerine line), z values that fall below line L3 are set to 0 and z values above line L3 are set to 1. For the fifth layer, which corresponds to line L4 (the orange line), z values that fall below line L4 are set to 0 and z values above line L4 are set to 1. For the sixth layer, which corresponds to line L5 (the red line), z values that fall below line L5 are set to 0 and z values above line L5 are set to 1. For the seventh layer, which corresponds to line L6 (the dark red line), z values that fall below line L6 are set to 0 and z values above line L6 are set to 1. For the eighth layer, which corresponds to line L7 (the purple line), z values that fall below line L7 are set to 0 and z values above line L7 are set to 1.

For each layer, transitions (1 to 0 or 0 to 1) are identified, which corresponds to edges of the binary data of the respective layer. The shaded boxes indicate the transitions. For this example, the z values for x1-x13 are below line L5, thus layers six-eight includes all zero and have no transitions.

Figures 39, 40:
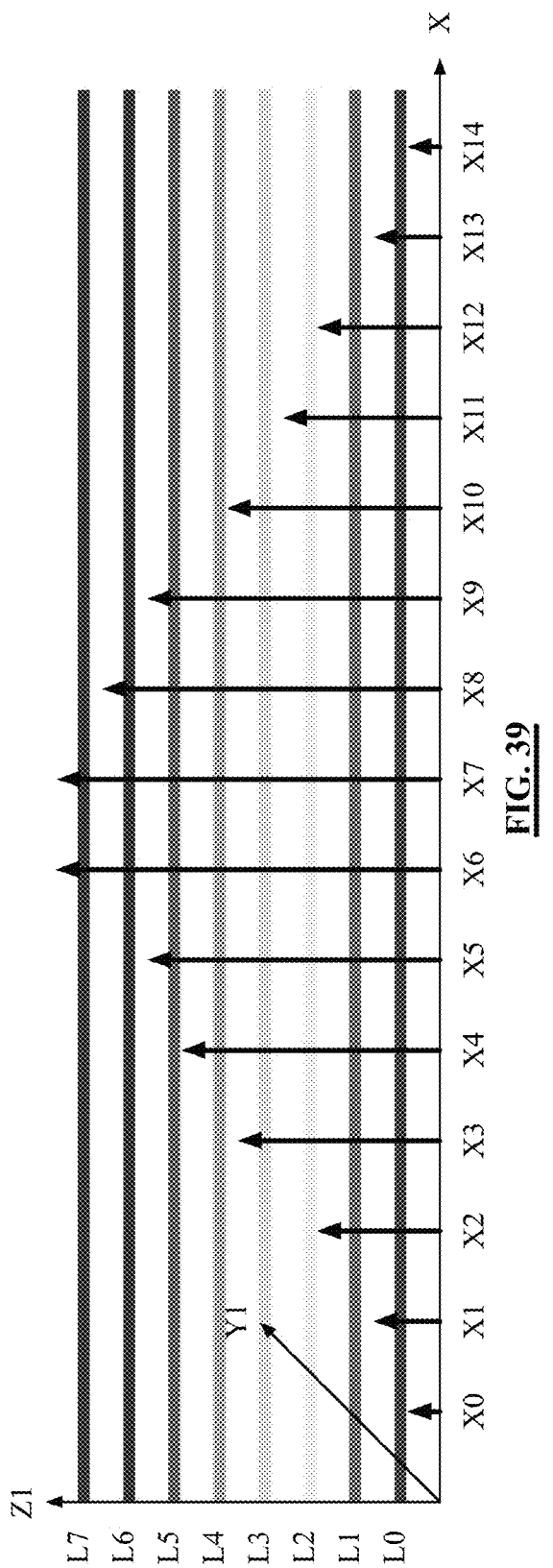
FIG. 39 is a schematic block diagram of an example of x-y1-z1 values for the capacitive grid of FIG. 35 in accordance with the present invention.
FIG. 40 is a diagram of an example of creating binary values for each layer of the data of FIG. 39 in accordance with the present invention.

FIG. 39 is a schematic block diagram of an example of x-y1-z1 values for the capacitive grid of FIG. 35. The capacitance value at x1 has a z value below L0; thus it is at Level 0 (which is a black cell in FIG. 35). The capacitance value at x1 has a z value above L0 and below L1; thus it is at Level 1 (which is a blue cell in FIG. 35). The capacitance value at x2 has a z value above L1 and below L2; thus it is at Level 2 (which is a green cell in FIG. 35). The capacitance value at x3 has a z value above L3 and below L4; thus it is at Level 4 (which is a tangerine cell in FIG. 35).

The capacitance value at x4 has a z value above L4 and below L5; thus it is at Level 5 (which is an orange cell in FIG. 35). The capacitance value at x5 has a z value above L5 and below L6; thus it is at Level 6 (which is a red cell in FIG. 35). The capacitance values at x6 and x7 have a z value above L7; thus it is at Level 8 (which are purple cells in FIG. 35). The capacitance value at x8 has a z value above L6 and below L7; thus it is at Level 7 (which is a dark red cell in FIG. 35).

The capacitance value at x9 has a z value above L5 and below L6; thus it is at Level 6 (which is a red cell in FIG. 35). The capacitance value at x10 has a z value above L3 and below L4; thus it is at Level 4 (which is a tangerine cell in FIG. 35). The capacitance value at x11 has a z value above L2 and below L3; thus it is at Level 3 (which is a yellow cell in FIG. 35). The capacitance value at x12 has a z value above L1 and below L2; thus it is at Level 2 (which is a green cell in FIG. 35). The capacitance value at x13 has a z value above L0 and below L1; thus it is at Level 1 (which is a blue cell in FIG. 35). The capacitance value at x14 has a z value below L0; thus it is at Level 0 (which is a black cell in FIG. 35).

FIG. 40 is a diagram of an example of creating binary values for each layer of the data of FIG. 39. A similar binary process is applied to the data of FIG. 39 as was discussed with reference to FIG. 38 for the data of FIG. 37. In this example, each layer has at least one transition, which are highlighted via the gray shaded boxes.

Figures 41, 42:
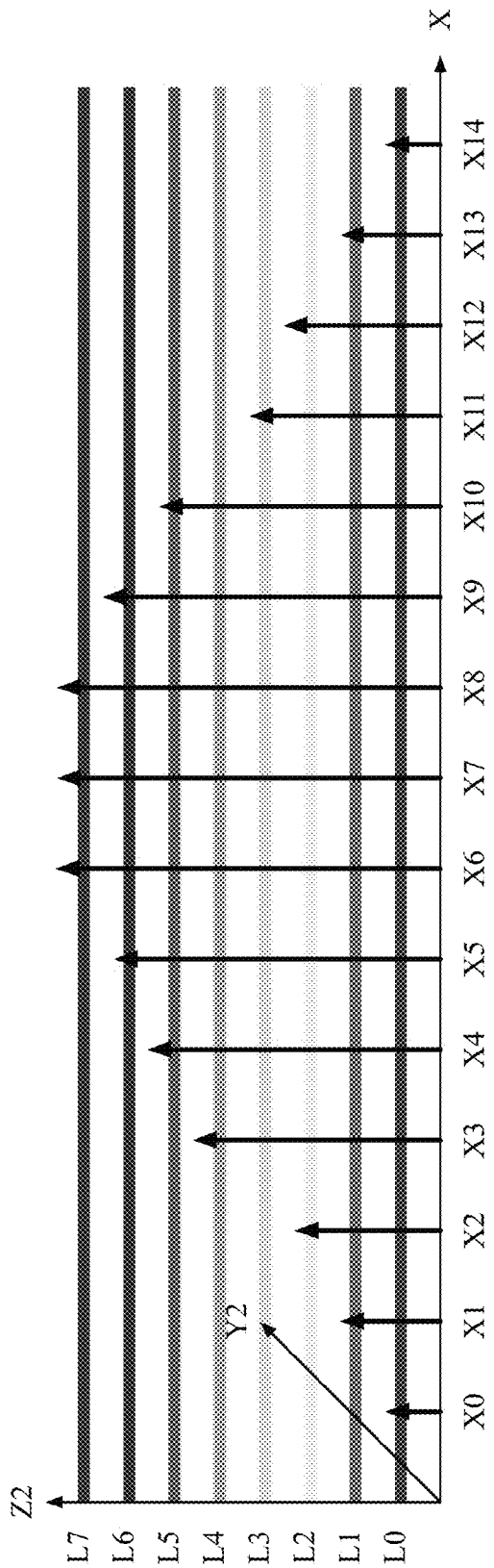
FIG. 41 is a schematic block diagram of an example of x-y2-z2 values for the capacitive grid of FIG. 35 in accordance with the present invention.
FIG. 42 is a diagram of an example of creating binary values for each layer of the data of FIG. 41 in accordance with the present invention.

FIG. 41 is a schematic block diagram of an example of x1-y2-z2 values for the capacitive grid of FIG. 35. The capacitance value at x0 has a z value below L0; thus it is at Level 0 (which is a black cell in FIG. 35). The capacitance value at x1 has a z value above L1 and below L2; thus it is at Level 2 (which is a green cell in FIG. 35). The capacitance value at x2 has a z value above L2 and below L3; thus it is at Level 3 (which is a yellow cell in FIG. 35). The capacitance value at x3 has a z value above L4 and below L5; thus it is at Level 5 (which is an orange cell in FIG. 35).

The capacitance value at x4 has a z value above L5 and below L6; thus it is at Level 6 (which is a red cell in FIG. 35). The capacitance value at x5 has a z value above L6 and below L7; thus it is at Level 7 (which is a dark red cell in FIG. 35). The capacitance values at x6, 7, and 8 have a z value above L7; thus it is at Level 8 (which is an a purple cell in FIG. 35). The capacitance value at x9 has a z value above L6 and below L7; thus it is at Level 7 (which is a dark red cell in FIG. 35).

The capacitance value at x10 has a z value above L5 and below L6; thus it is at Level 6 (which is a red cell in FIG. 35). The capacitance value at x11 has a z value above L3 and below L4; thus it is at Level 4 (which is a tangerine cell in FIG. 35). The capacitance value at x12 has a z value above L2 and below L3; thus it is at Level 3 (which is a yellow cell in FIG. 35). The capacitance value at x13 has a z value above L1 and below L2; thus it is at Level 2 (which is a green cell in FIG. 35). The capacitance value at x has a z value above L0 and below L1; thus it is at Level 1 (which is a blue cell in FIG. 35).

FIG. 42 is a diagram of an example of creating binary values for each layer of the data of FIG. 41. A similar binary process is applied to the data of FIG. 41 as was discussed with reference to FIG. 38 for the data of FIG. 37. In this example, each layer has at least one transition, which are highlighted via the gray shaded boxes.

Figures 43, 44:
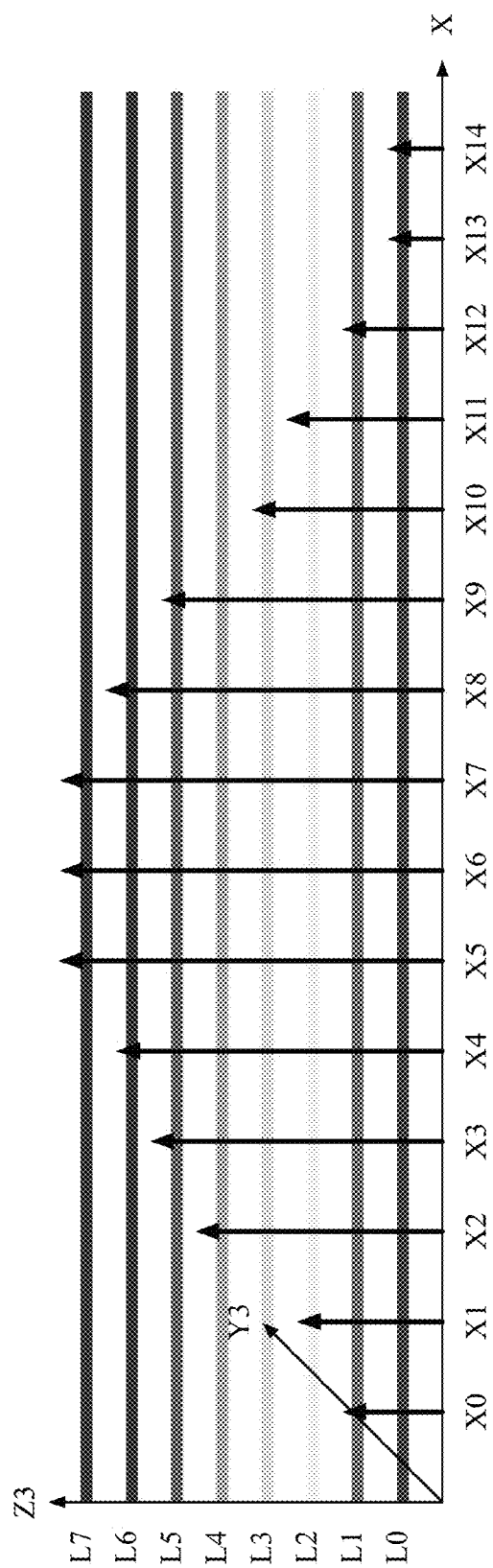
FIG. 43 is a schematic block diagram of an example of x-y3-z3 values for the capacitive grid of FIG. 35 in accordance with the present invention.
FIG. 44 is a diagram of an example of creating binary values for each layer of the data of FIG. 43 in accordance with the present invention.

FIG. 43 is a schematic block diagram of an example of x1-y3-z3 values for the capacitive grid of FIG. 35. The capacitance value at x0 has a z value above L1 and below L2; thus it is at Level 2 (which is a green cell in FIG. 35). The capacitance value at x1 has a z value above L2 and below L3; thus it is at Level 3 (which is a yellow cell in FIG. 35). The capacitance value at x2 has a z value above L4 and below L5; thus it is at Level 5 (which is an orange cell in FIG. 35). The capacitance value at x3 has a z value above L5 and below L6; thus it is at Level 6 (which is a red cell in FIG. 35).

The capacitance value at x4 has a z value above L6 and below L7; thus it is at Level 7 (which is a dark red cell in FIG. 35). The capacitance values at x5, 6, 7 have a z value above L7; thus it is at Level 8 (which is an a purple cell in FIG. 35). The capacitance value at x8 has a z value above L6 and below L7; thus it is at Level 7 (which is a dark red cell in FIG. 35). The capacitance value at x9 has a z value above L5 and below L6; thus it is at Level 6 (which is a red cell in FIG. 35).

The capacitance value at x10 has a z value above L3 and below L4; thus it is at Level 4 (which is a tangerine cell in FIG. 35). The capacitance value at x11 has a z value above L2 and below L3; thus it is at Level 3 (which is a yellow cell in FIG. 35). The capacitance value at x12 has a z value above L1 and below L2; thus it is at Level 2 (which is a green cell in FIG. 35). The capacitance values at x13 and x14 have a z value above L0 and below L1; thus it is at Level 1 (which is a blue cell in FIG. 35).

FIG. 44 is a diagram of an example of creating binary values for each layer of the data of FIG. 43. A similar binary process is applied to the data of FIG. 43 as was discussed with reference to FIG. 38 for the data of FIG. 37. In this example, each layer has at least one transition, which are highlighted via the gray shaded boxes.

FIG. 45 is a schematic block diagram of an example of x1-y4-z4 values for the capacitive grid of FIG. 35. The capacitance value at x0 has a z value above L0 and below L1; thus it is at Level 1 (which is a blue cell in FIG. 35). The capacitance value at x1 has a z value above L1 and below L2; thus it is at Level 2 (which is a green cell in FIG. 35). The capacitance value at x2 has a z value above L2 and below L3; thus it is at Level 3 (which is a yellow cell in FIG. 35). The capacitance value at x3 has a z value above L4 and below L5; thus it is at Level 5 (which is an orange cell in FIG. 35).

The capacitance value at x4 has a z value above L5 and below L6; thus it is at Level 6 (which is a red cell in FIG. 35). The capacitance value at x5 has a z value above L6 and below L7; thus it is at Level 7 (which is a dark red cell in FIG. 35). The capacitance values at x6 and x7 have a z value above L7; thus it is at Level 8 (which is an purple cell in FIG. 35). The capacitance value at x8 has a z value above L6 and below L7; thus it is at Level 7 (which is a dark red cell in FIG. 35). The capacitance value at x9 has a z value above L5 and below L6; thus it is at Level 6 (which is a red cell in FIG. 35).

The capacitance value at x10 has a z value above L3 and below L4; thus it is at Level 4 (which is a tangerine cell in FIG. 35). The capacitance value at x11 has a z value above L2 and below L3; thus it is at Level 3 (which is a yellow cell in FIG. 35). The capacitance value at x12 has a z value above L1 and below L2; thus it is at Level 2 (which is a green cell in FIG. 35). The capacitance value at x13 has a z value above L0 and below L1; thus it is at Level 1 (which is a blue cell in FIG. 35). The capacitance value at x14 has a z value below L0; thus it is at Level 0 (which is a black cell in FIG. 35).

FIG. 46 is a diagram of an example of creating binary values for each layer of the data of FIG. 45. A similar binary process is applied to the data of FIG. 45 as was discussed with reference to FIG. 38 for the data of FIG. 37. In this example, each layer has at least one transition, which are highlighted via the gray shaded boxes.

Figures 47, 48:
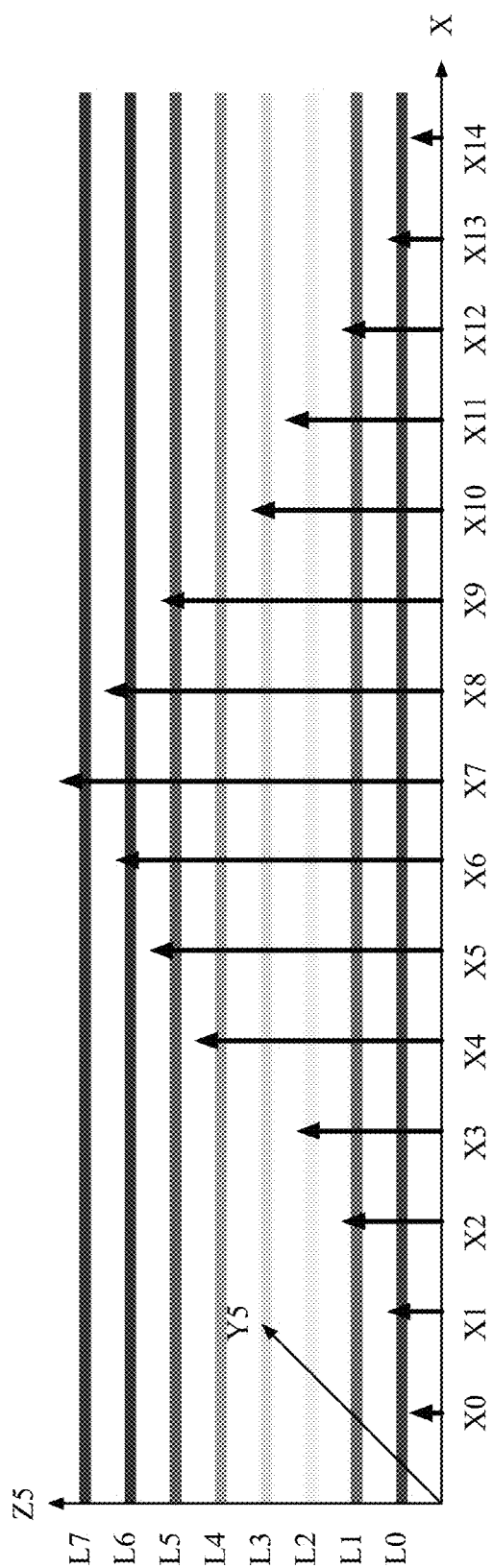
FIG. 47 is a schematic block diagram of an example of x-y5-z5 values for the capacitive grid of FIG. 35 in accordance with the present invention.
FIG. 48 is a diagram of an example of creating binary values for each layer of the data of FIG. 47 in accordance with the present invention.

FIG. 47 is a schematic block diagram of an example of x1-y5-z5 values for the capacitive grid of FIG. 35. The capacitance value at x0 has a z value below L0; thus it is at Level 0 (which is a black cell in FIG. 35). The capacitance value at x1 has a z value above L0 and below L1; thus it is at Level 1 (which is a blue cell in FIG. 35). The capacitance value at x2 has a z value above L1 and below L2; thus it is at Level 2 (which is a green cell in FIG. 35). The capacitance value at x3 has a z value above L2 and below L3; thus it is at Level 3 (which is a yellow cell in FIG. 35).

The capacitance value at x5 has a z value above L4 and below L5; thus it is at Level 5 (which is an orange cell in FIG. 35). The capacitance value at x5 has a z value above L5 and below L6; thus it is at Level 6 (which is a red cell in FIG. 35). The capacitance value at x6 has a z value above L6 and below L7; thus it is at Level 7 (which is a dark red cell in FIG. 35). The capacitance value at x7 has a z value above L7; thus it is at Level 8 (which is an purple cell in FIG. 35). The capacitance value at x9 has a z value above L6 and below L7; thus it is at Level 7 (which is a dark red cell in FIG. 35).

The capacitance value at x10 has a z value above L3 and below L4; thus it is at Level 4 (which is a tangerine cell in FIG. 35). The capacitance value at x11 has a z value above L2 and below L3; thus it is at Level 3 (which is a yellow cell in FIG. 35). The capacitance value at x12 has a z value above L1 and below L2; thus it is at Level 2 (which is a green cell in FIG. 35). The capacitance value at x13 has a z value above L0 and below L1; thus it is at Level 1 (which is a blue cell in FIG. 35). The capacitance value at x14 has a z value below L0; thus it is at Level 0 (which is a black cell in FIG. 35).

FIG. 48 is a diagram of an example of creating binary values for each layer of the data of FIG. 47. A similar binary process is applied to the data of FIG. 47 as was discussed with reference to FIG. 38 for the data of FIG. 37. In this example, each layer has at least one transition, which are highlighted via the gray shaded boxes.

Figures 49, 50:
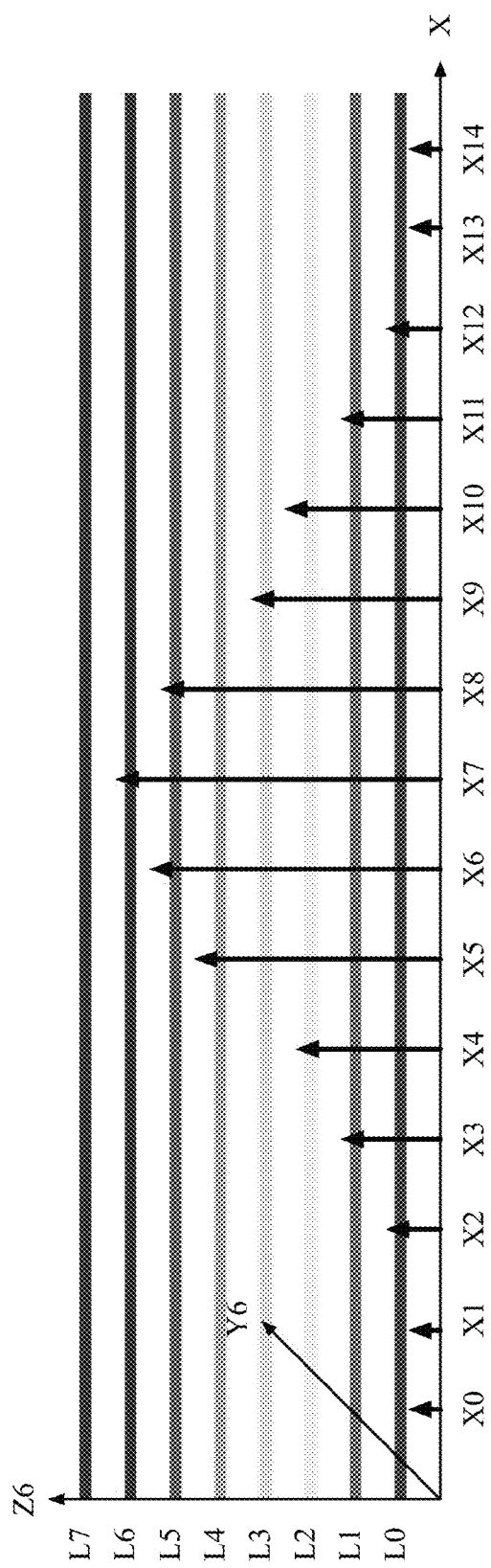
FIG. 49 is a schematic block diagram of an example of x-y6-z6 values for the capacitive grid of FIG. 35 in accordance with the present invention.
FIG. 50 is a diagram of an example of creating binary values for each layer of the data of FIG. 49 in accordance with the present invention.

FIG. 49 is a schematic block diagram of an example of x1-y6-z6 values for the capacitive grid of FIG. 35. The capacitance values at x0 and x1 have a z value below L0; thus it is at Level 0 (which is a black cell in FIG. 35). The capacitance value at x2 has a z value above L0 and below L1; thus it is at Level 1 (which is a blue cell in FIG. 35). The capacitance value at x3 has a z value above L1 and below L2; thus it is at Level 2 (which is a green cell in FIG. 35). The capacitance value at x4 has a z value above L2 and below L3; thus it is at Level 3 (which is a yellow cell in FIG. 35).

The capacitance value at x5 has a z value above L4 and below L5; thus it is at Level 5 (which is an orange cell in FIG. 35). The capacitance value at x6 has a z value above L5 and below L6; thus it is at Level 6 (which is a red cell in FIG. 35). The capacitance value at x7 has a z value above L6 and below L7; thus it is at Level 7 (which is a dark red cell in FIG. 35). The capacitance value at x8 has a z value above L5 and below L6; thus it is at Level 6 (which is a red cell in FIG. 35). The capacitance value at x9 has a z value above L3 and below L4; thus it is at Level 4 (which is a tangerine cell in FIG. 35).

The capacitance value at x10 has a z value above L2 and below L3; thus it is at Level 3 (which is a yellow cell in FIG. 35). The capacitance value at x11 has a z value above L1 and below L2; thus it is at Level 2 (which is a green cell in FIG. 35). The capacitance value at x12 has a z value above L0 and below L1; thus it is at Level 1 (which is a blue cell in FIG. 35). The capacitance values at x13 and x14 have a z value below L0; thus it is at Level 0 (which is a black cell in FIG. 35).

FIG. 50 is a diagram of an example of creating binary values for each layer of the data of FIG. 49. A similar binary process is applied to the data of FIG. 49 as was discussed with reference to FIG. 38 for the data of FIG. 37. In this example, layers 0-6 have at least one transition, which are highlighted via the gray shaded boxes. Layer 7 has no transitions.

FIG. 51 is a schematic block diagram of an example of x1-y7-z7 values for the capacitive grid of FIG. 35. The capacitance values at x0-x2 has a z value below L0; thus it is at Level 0 (which is a black cell in FIG. 35). The capacitance value at x3 has a z value above L0 and below L1; thus it is at Level 1 (which is a blue cell in FIG. 35). The capacitance value at x4 has a z value above L1 and below L2; thus it is at Level 2 (which is a green cell in FIG. 35). The capacitance value at x5 has a z value above L2 and below L3; thus it is at Level 3 (which is a yellow cell in FIG. 35).

The capacitance value at x6 has a z value above L4 and below L5; thus it is at Level 5 (which is an orange cell in FIG. 35). The capacitance values at x7 and x8 have a z value above L5 and below L6; thus it is at Level 6 (which is a red cell in FIG. 35). The capacitance value at x9 has a z value above L3 and below L4; thus it is at Level 4 (which is a tangerine cell in FIG. 35). The capacitance value at x10 has a z value above L2 and below L3; thus it is at Level 3 (which is a yellow cell in FIG. 35). The capacitance value at x11 has a z value above L1 and below L2; thus it is at Level 2 (which is a green cell in FIG. 35). The capacitance value at x12 has a z value above L0 and below L1; thus it is at Level 1 (which is a blue cell in FIG. 35). The capacitance values at x13 and x14 have a z value below L0; thus it is at Level 0 (which is a black cell in FIG. 35).

FIG. 52 is a diagram of an example of creating binary values for each layer of the data of FIG. 51. A similar binary process is applied to the data of FIG. 51 as was discussed with reference to FIG. 38 for the data of FIG. 37. In this example, layers 0-5 have at least one transition, which are highlighted via the gray shaded boxes. Layers 6 and 7 have no transitions.

Figures 53, 54:
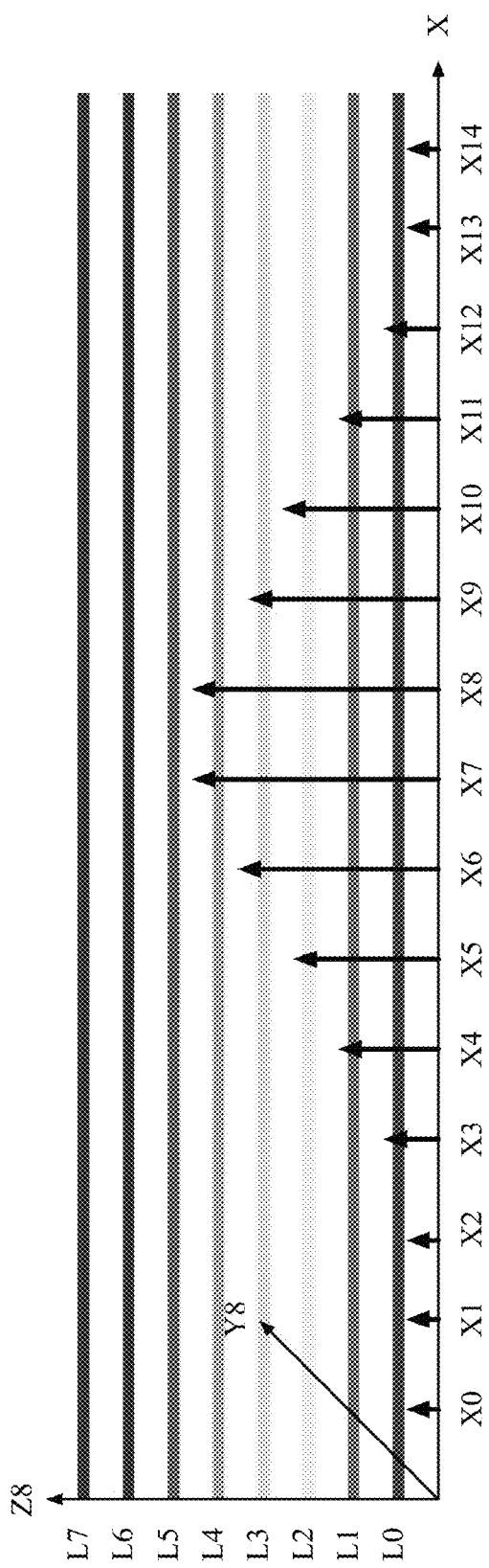
FIG. 53 is a schematic block diagram of an example of x-y8-z8 values for the capacitive grid of FIG. 35 in accordance with the present invention.
FIG. 54 is a diagram of an example of creating binary values for each layer of the data of FIG. 53 in accordance with the present invention.

FIG. 53 is a schematic block diagram of an example of x-y8-z8 values for the capacitive grid of FIG. 35. The capacitance values at x0-x2 have a z value below L0; thus it is at Level 0 (which is a black cell in FIG. 35). The capacitance value at x3 has a z value above L0 and below L1; thus it is at Level 1 (which is a blue cell in FIG. 35). The capacitance value at x4 has a z value above L1 and below L2; thus it is at Level 2 (which is a green cell in FIG. 35). The capacitance value at x5 has a z value above L2 and below L3; thus it is at Level 3 (which is a yellow cell in FIG. 35). The capacitance value at x6 has a z value above L3 and below L4; thus it is at Level 4 (which is a tangerine cell in FIG. 35).

The capacitance values at x7 and x8 have a z value above L4 and below L5; thus it is at Level 5 (which is an orange cell in FIG. 35). The capacitance value at x9 has a z value above L3 and below L4; thus it is at Level 4 (which is a tangerine cell in FIG. 35). The capacitance value at x10 has a z value above L2 and below L3; thus it is at Level 3 (which is a yellow cell in FIG. 35). The capacitance value at x11 has a z value above L1 and below L2; thus it is at Level 2 (which is a green cell in FIG. 35). The capacitance value at x12 has a z value above L0 and below L1; thus it is at Level 1 (which is a blue cell in FIG. 35). The capacitance values at x13 and x14 have a z value below L0; thus it is at Level 0 (which is a black cell in FIG. 35).

FIG. 54 is a diagram of an example of creating binary values for each layer of the data of FIG. 53. A similar binary process is applied to the data of FIG. 53 as was discussed with reference to FIG. 38 for the data of FIG. 37. In this example, layers 0-4 have at least one transition, which are highlighted via the gray shaded boxes. Layers 5-7 have no transitions.

Figures 55, 56:
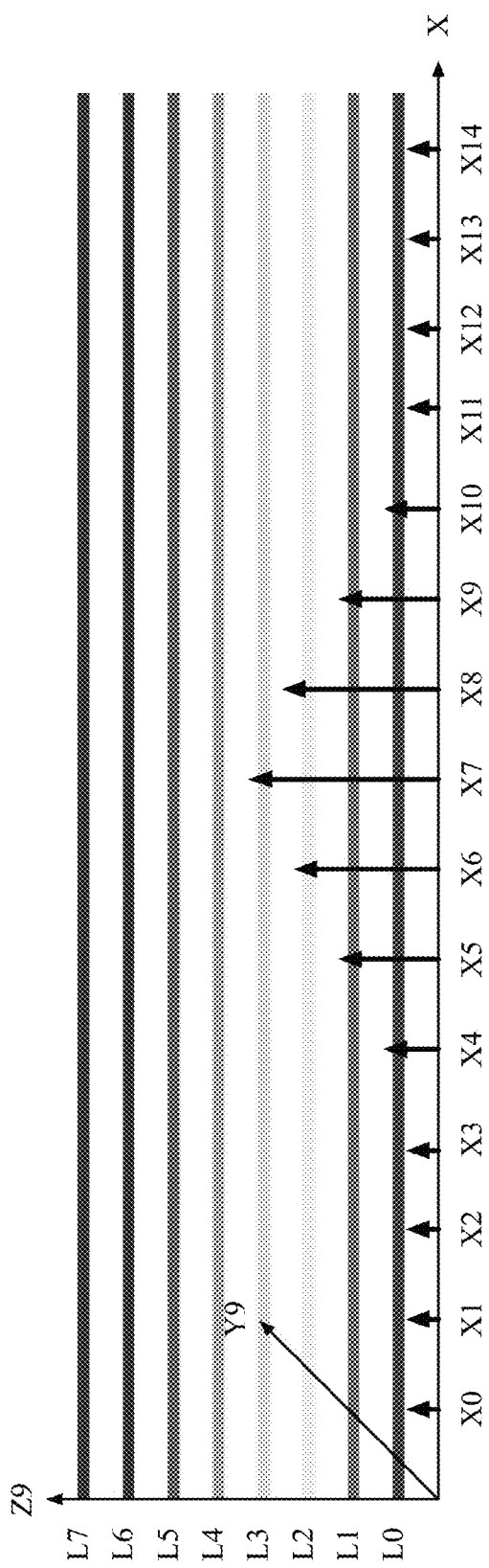
FIG. 55 is a schematic block diagram of an example of x-y9-z9 values for the capacitive grid of FIG. 35 in accordance with the present invention.
FIG. 56 is a diagram of an example of creating binary values for each layer of the data of FIG. 55 in accordance with the present invention.

FIG. 55 is a schematic block diagram of an example of x1-y9-z9 values for the capacitive grid of FIG. 35. The capacitance values at x0-x3 have a z value below L0; thus it is at Level 0 (which is a black cell in FIG. 35). The capacitance value at x4 has a z value above L0 and below L1; thus it is at Level 1 (which is a blue cell in FIG. 35). The capacitance value at x5 has a z value above L1 and below L2; thus it is at Level 2 (which is a green cell in FIG. 35). The capacitance value at x6 has a z value above L2 and below L3; thus it is at Level 3 (which is a yellow cell in FIG. 35).

The capacitance value at x7 has a z value above L3 and below L4; thus it is at Level 4 (which is a tangerine cell in FIG. 35). The capacitance value at x8 has a z value above L2 and below L3; thus it is at Level 3 (which is a yellow cell in FIG. 35). The capacitance value at x9 has a z value above L1 and below L2; thus it is at Level 2 (which is a green cell in FIG. 35). The capacitance value at x10 has a z value above L0 and below L1; thus it is at Level 1 (which is a blue cell in FIG. 35). The capacitance values at x11-x14 have a z value below L0; thus it is at Level 0 (which is a black cell in FIG. 35).

FIG. 56 is a diagram of an example of creating binary values for each layer of the data of FIG. 55. A similar binary process is applied to the data of FIG. 55 as was discussed with reference to FIG. 38 for the data of FIG. 37. In this example, layers 0-3 have at least one transition, which are highlighted via the gray shaded boxes. Layers 4-7 have no transitions.

Figures 57, 58:
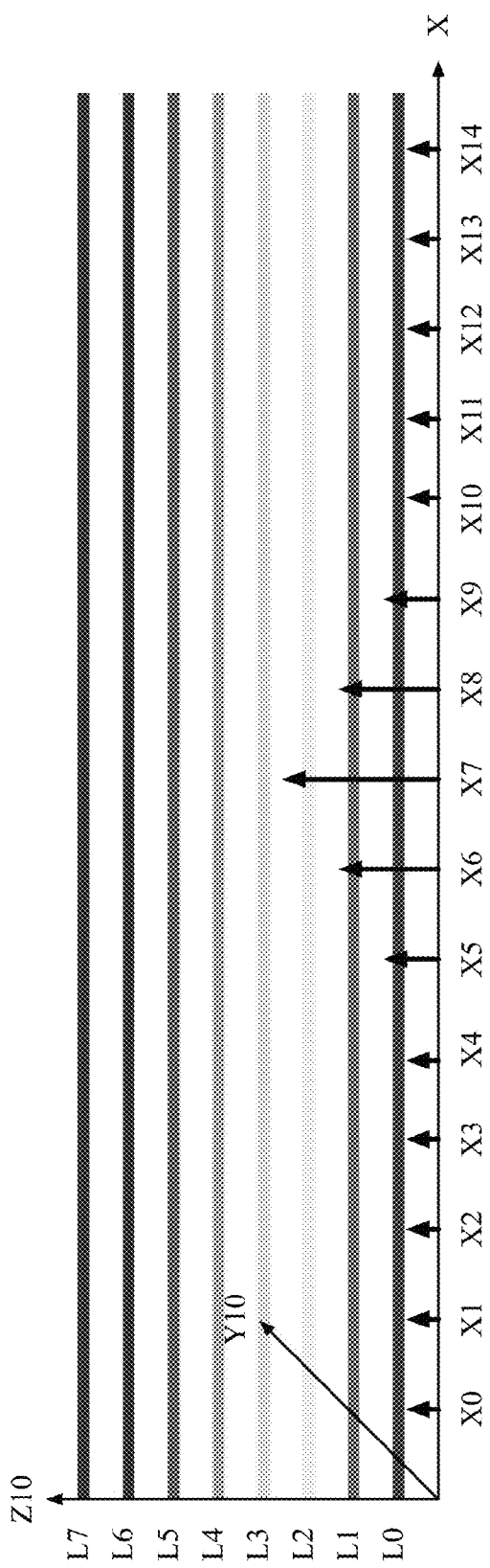
FIG. 57 is a schematic block diagram of an example of x-y10-z10 values for the capacitive grid of FIG. 35 in accordance with the present invention.
FIG. 58 is a diagram of an example of creating binary values for each layer of the data of FIG. 57 in accordance with the present invention.

FIG. 57 is a schematic block diagram of an example of x1-y10-z10 values for the capacitive grid of FIG. 35. The capacitance values at x0-x4 have a z value below L0; thus it is at Level 0 (which is a black cell in FIG. 35). The capacitance value at x5 has a z value above L0 and below L1; thus it is at Level 1 (which is a blue cell in FIG. 35). The capacitance value at x6 has a z value above L1 and below L2; thus it is at Level 2 (which is a green cell in FIG. 35). The capacitance value at x7 has a z value above L2 and below L3; thus it is at Level 3 (which is a yellow cell in FIG. 35).

The capacitance value at x8 has a z value above L1 and below L2; thus it is at Level 2 (which is a green cell in FIG. 35). The capacitance value at x9 has a z value above L0 and below L1; thus it is at Level 1 (which is a blue cell in FIG. 35). The capacitance values at x10-x14 have a z value below L0; thus it is at Level 0 (which is a black cell in FIG. 35).

FIG. 58 is a diagram of an example of creating binary values for each layer of the data of FIG. 57. A similar binary process is applied to the data of FIG. 57 as was discussed with reference to FIG. 38 for the data of FIG. 37. In this example, layers 0-2 have at least one transition, which are highlighted via the gray shaded boxes. Layers 3-7 have no transitions.

FIG. 59 is a schematic block diagram of an example of x1-y11-z11 values for the capacitive grid of FIG. 35. The capacitance values at x0-x6 have a z value below L0; thus it is at Level 0 (which is a black cell in FIG. 35). The capacitance values at x7 and x8 have a z value above L0 and below L1; thus it is at Level 1 (which is a blue cell in FIG. 35). The capacitance values at x9-x14 have a z value below L0; thus it is at Level 0 (which is a black cell in FIG. 35).

FIG. 60 is a diagram of an example of creating binary values for each layer of the data of FIG. 59. A similar binary process is applied to the data of FIG. 59 as was discussed with reference to FIG. 38 for the data of FIG. 37. In this example, layer 0 has at least one transition, which are highlighted via the gray shaded boxes. Layers 1-7 have no transitions.

Figure 61:
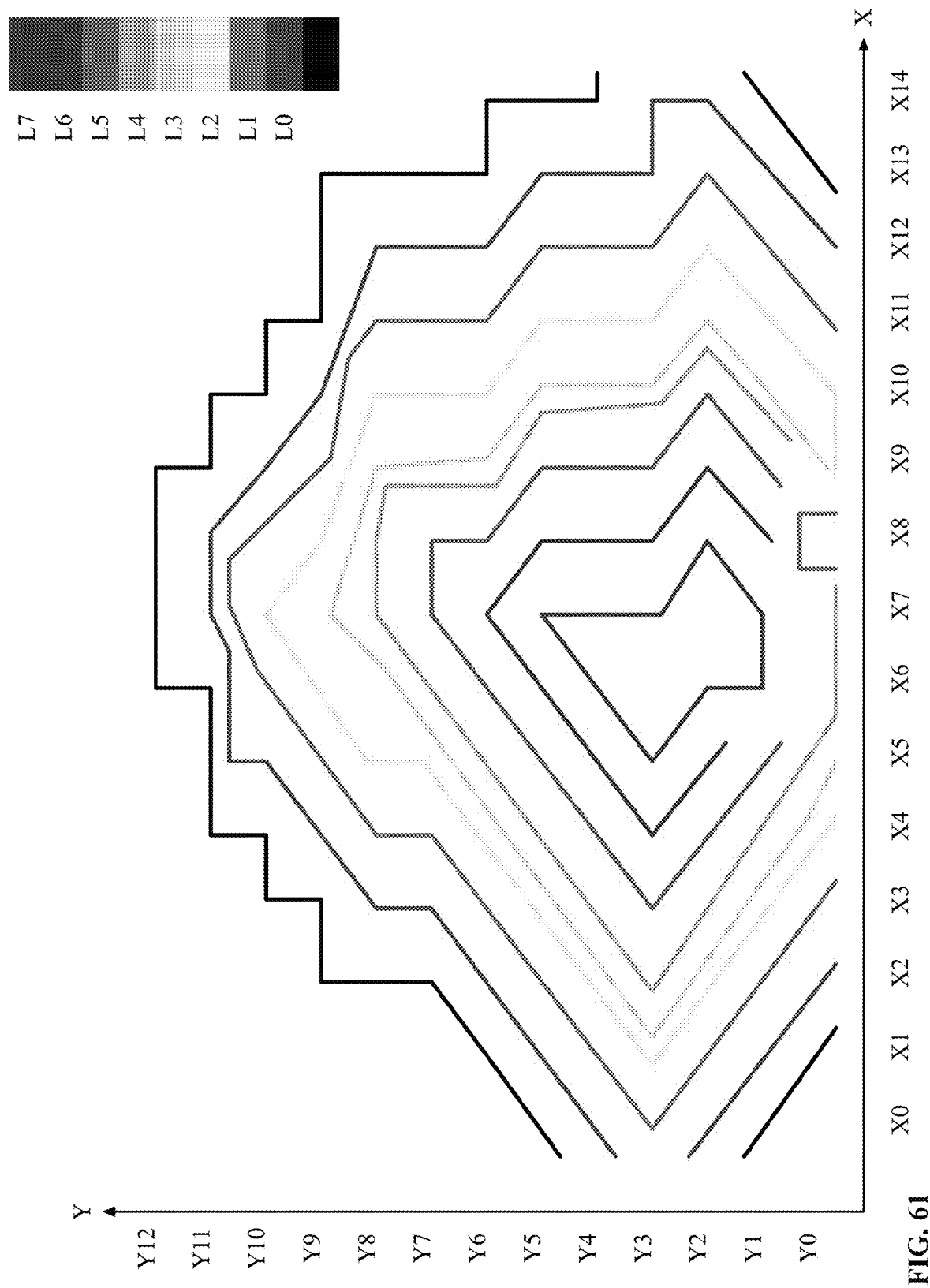
FIG. 61 is a schematic block diagram of an example of contour mapping the values from FIGS. 36-60 with minimal to no filtering in accordance with the present invention.

FIG. 61 is a schematic block diagram of an example of contour mapping the values from FIGS. 36-60 with minimal to no filtering. In this example, the transitions identified for each layer in the even numbered Figures between 38 and 60 is mapped to the x-y coordinates of the capacitive grid. As shown, the lines have some sharp edges and delineate the contour of the heat map of FIG. 36.

Figure 62:
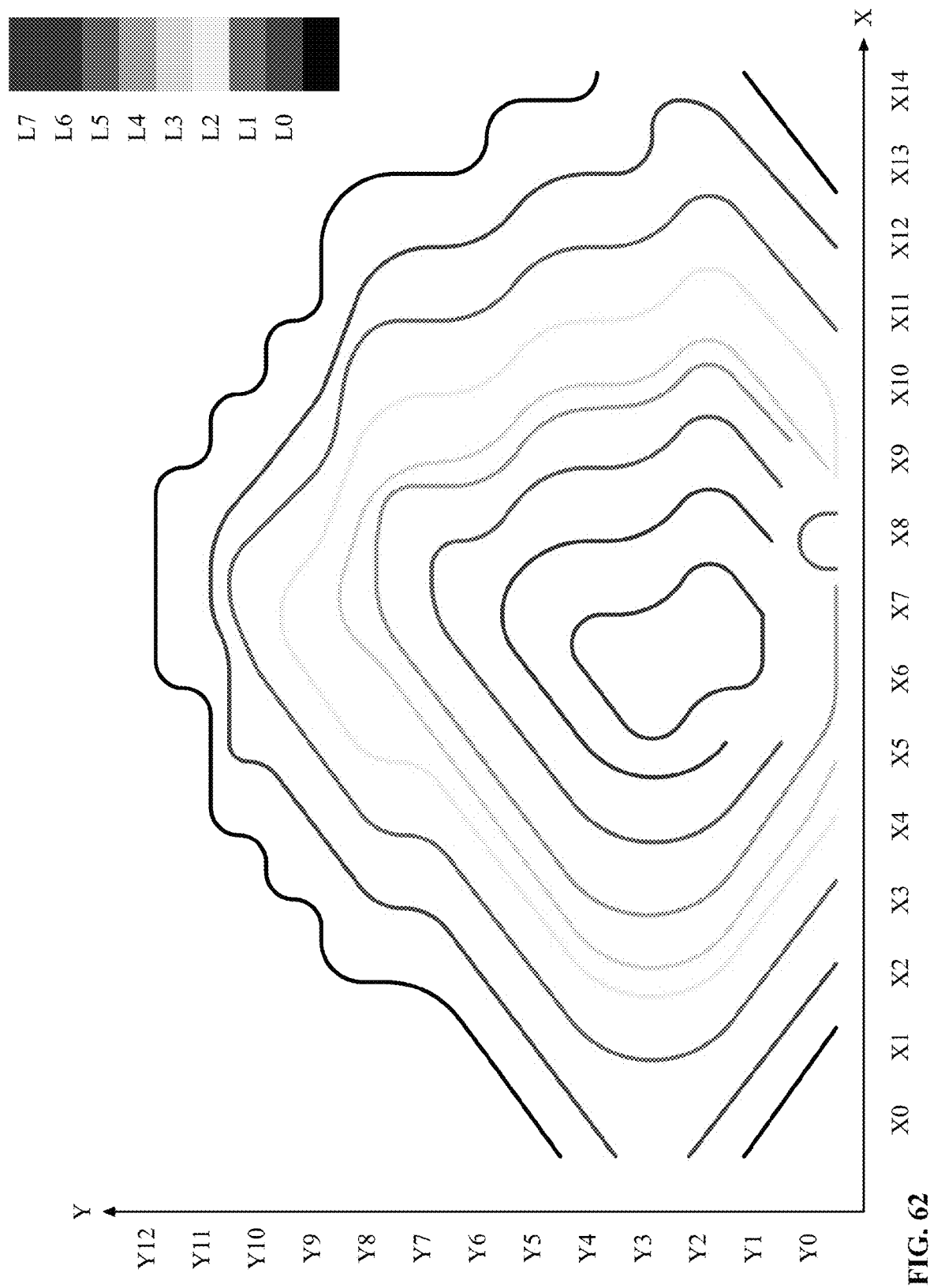
FIG. 62 is a schematic block diagram of an example of contour mapping the values from FIGS. 36-60 with filtering in accordance with the present invention.

FIG. 62 is a schematic block diagram of an example of contour mapping the values from FIGS. 36-60 with filtering. This figure is similar to that of FIG. 61 with the sharp edges filtered to produce a more subtle contour of the heat map of FIG. 35.

Figure 63:
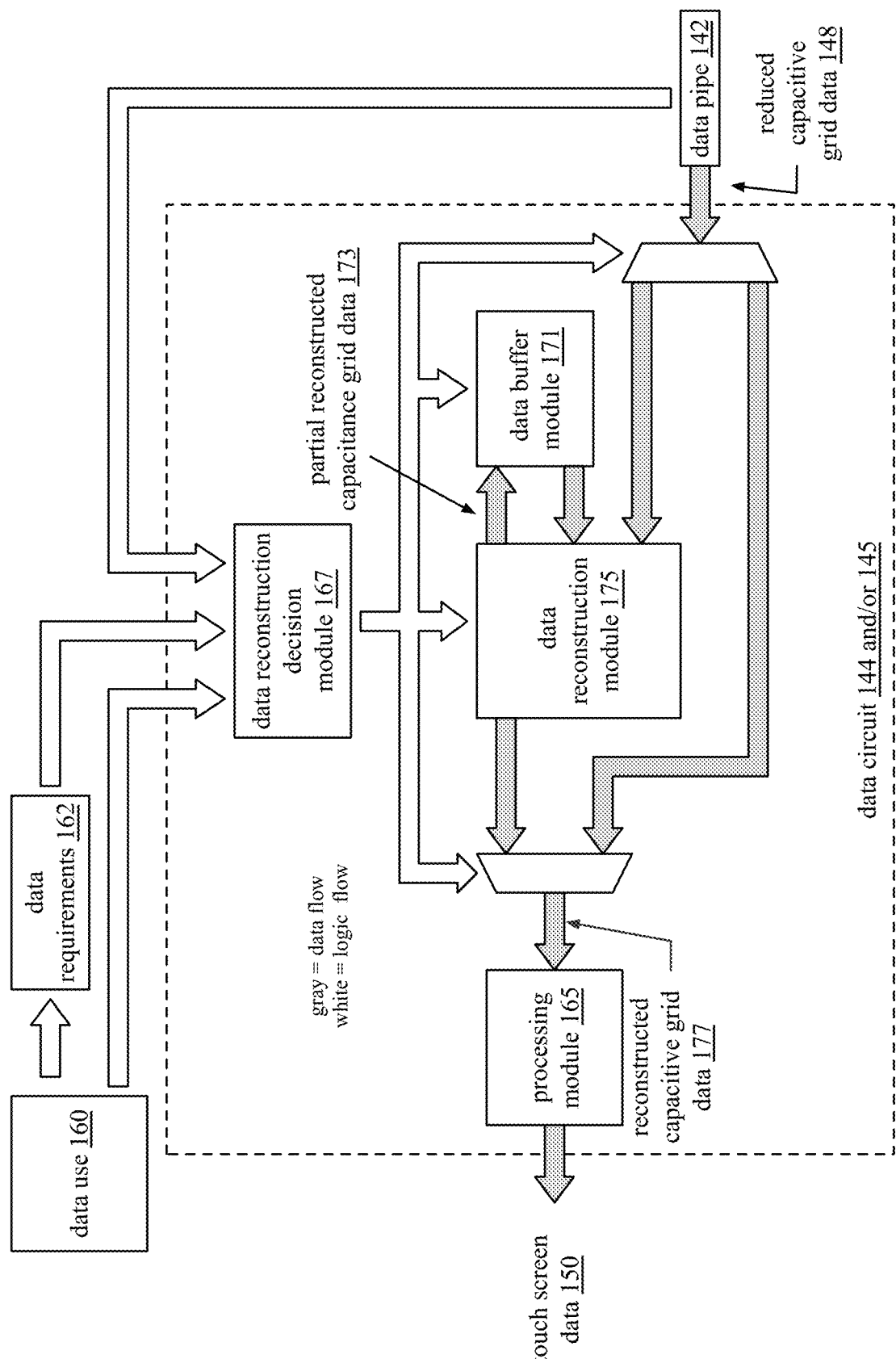
FIG. 63 is a schematic block diagram of an embodiment of a data circuit performing an inverse of data reduction in accordance with the present invention.

FIG. 63 is a schematic block diagram of an embodiment of a data circuit 144 and/or 145 from previous figures. The data circuit 144 and/or 145 includes a processing module 165, a data reconstruction decision module 167, a data buffer module 171, a data reconstruction module 175 and multiplexors (or switches, or logical connections). In general, the data circuit 144 and/or 145 performs the inverse function of the data reduction processing circuit 165 of FIG. 17.

In an example of operation, data use 160 is an input for determining the data requirements 162. In combination with the data output rate of the data pipe 142, the data requirements 162 and the data use 160 are inputs for determining whether data reconstruction is needed and, if it is, determining how to implement it. Examples of determining the data requirements and the data reduction scheme were discussed with reference to one or more previous figures.

With the data reconstruction scheme determined, the input multiplexor receives reduced capacitive grid data 148 from the data pipe 142. If the data reconstruction decision module 166 determines that the reduced capacitive grid data was not reduced and thus does not need to be reconstructed, the reduced capacitive grid data 148 is provided to the processing module 165 as the reconstructed capacitive grid data 177.

The processing module 165 processes the reconstructed capacitive grid data 177 to produce touch screen data 150. For example, the processing module 165 interprets the reconstructed capacitive grid data 177 to determine a touch, the pressure of the touch, and the location of the touch on the screen. As another example, the processing module 165 interprets the reconstructed capacitive grid data 177 to determine a hover, a distance from the screen of the hover, and the location of the hover on the screen. As yet another example, the processing module 165 interprets the reconstructed capacitive grid data 177 to identify an object and its position on the screen. As a further example, the processing module 165 interprets the reconstructed capacitive grid data 177 to identify a pattern on the screen. In a still further example, the processing module 165 interprets the reconstructed capacitive grid data 177 to determine a screen-to-screen communication element.

If, however, the data reconstruction decision module 167 determines that the reduced capacitive grid data 148 does need to be reconstructed, it selects a data reduction scheme, which includes one or more data reconstruction processes. The one or more data reconstruction processes are the inverse of the one or more data reduction processes uses to produce the reduced capacitive gird data 148.

For a single data reconstruction process, the data reconstruction module 175 performs the specific data reconstruction process on the reduced capacitive grid data to produce the reconstructed capacitive grid data 177. If the data reduction scheme included a lossy data reduction process, the reconstructed capacitive grid data 177 will not be identical to the capacitive grid data 170, but will include sufficient information such that the processing module can accurately create the touch screen data 150. If the data reduction scheme included a lossless data reduction process, the reconstructed capacitive grid data 177 will be identical to the capacitive grid data 170.

For multiple data reconstruction processes, the data reconstruction module 175 performs a first data reconstruction process on the reduced capacitive grid data 148 to produce partial reconstructed capacitive grid data 173, which is stored in the data buffer module 171. The first data reconstruction process is the inverse of the second data reduction process used by the data reduction module 168 to produce the reduced capacitive grid data 148 from the initial reduced capacitive grid data 172.

The data reconstruction module 175 performs a second data reconstruction process on the partial reconstructed capacitive grid data 173 to produce the reconstructed capacitive grid data 177. The second data reconstruction process is the inverse of the second data reduction process used by the data reduction module 168 to produce the initial reduced capacitive grid data 172 from the capacitive grid data 170.

Figure 65:
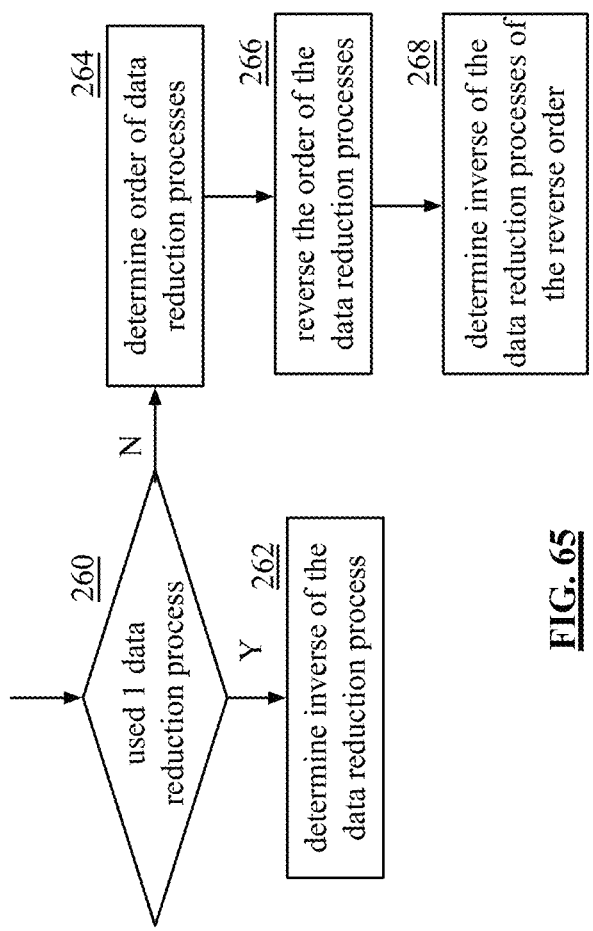
FIGS. 64-65 are a logic diagram of an embodiment of a method for inverse data reduction in accordance with the present invention.
Figure 64:
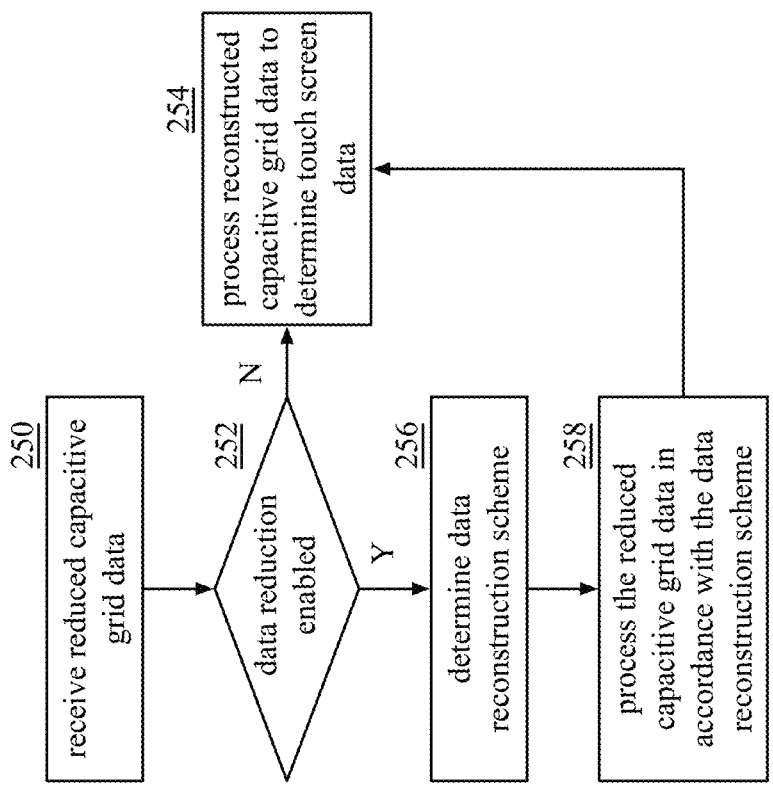

FIGS. 64-65 are a logic diagram of an embodiment of a method for data reconstruction. With reference to FIG. 64, the method begins at step 250 where the data circuit 144 and/or 145 receives reduced capacitive grid data. The method continues at step 252 where the data circuit determines whether data reduction was enable such that the reduced capacitive grid data is a reduced version of the capacitive grid data. If not, the method continues at step 254 where the data circuit processes the received capacitive grid data as the reconstructed capacitive grid data to determine the touch screen data.

If data reduction is enabled, the method continues at step 256 where the data circuit determines the data reconstruction scheme, which is the inverse of the reduction scheme. The method continues at step 258 where the data circuit reconstructs the capacitive grid data from the reduced capacitive grid data in accordance with the data reconstruction scheme. The method then continues at step 254.

FIG. 65 illustrates a method for determining the data reconstruction scheme. This method starts at step 260 where the data circuit determines whether one data reduction process was used to create the reduced capacitive grid data. If yes, the method continues at step 262 where the data circuit determines the data reconstruction process as the inverse of the data reduction process.

If the data reduction scheme included more than one data reduction process, the method continues at step 264 where the data circuit determines the order of the data reduction processes. The method continues at step 266 where the data circuit reverses the order of the data reduction processes. The method continues at step 268 where the data circuit determines the data reconstruction processes as the inverse of the reverse order of the data reduction processes.

Figure 66:
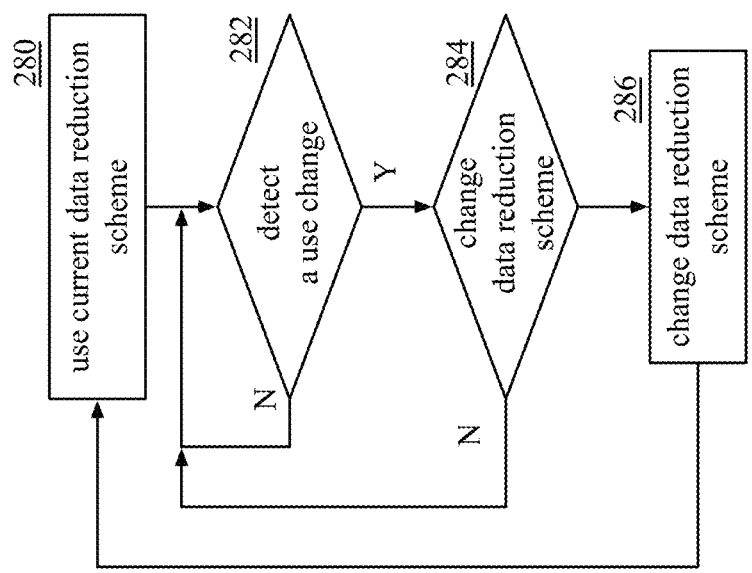
FIG. 66 is a logic diagram of an embodiment of a method for changing data reduction schemes in accordance with the present invention.

FIG. 66 is a logic diagram of an embodiment of a method for changing data reduction schemes. The method begins at step 280 where a computing device is using a current data reduction scheme to reduce capacitive grid data. The method continues at step 282 where the computing device determines whether use of the capacitive grid data has changed. If not, the method waits until a change occurs or the touch screen function is disable.

If the use has changed, the method continues at step 284 where the computing device determines whether the data reduction scheme needs to be changed. For example, the computing device performs the functions previously discussed to determine a data reduction scheme for the new use. If the current data reduction scheme (i.e., the one for the old use) is comparable to the newly determined data reduction scheme, then a change is not needed. If a change is not needed, the method repeats at step 282. If a change is needed, the method continues at step 286 where the computing device changes the data reduction scheme to the newly determined one.

In the preceding figures, one or more examples of data reduction and data reconstruction of capacitive grid data has been discussed. Note that 3D image data can be processed in a similar manner as the processes of the capacitive grid data as discussed herein.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   determining, by a processing module of a computing device, a use for touch screen data of a touch screen of the computing device;
   receiving, by the processing module interacting with the touch screen, drive sense data from a plurality of drive sense circuits, wherein a first drive sense circuit of the plurality of drive sense circuits generates a first sensed signal based on capacitance of a first electrode of a capacitance grid of the touch screen in accordance with a first drive signal; wherein a second drive sense circuit of the plurality of drive sense circuits generates a second sensed signal based on capacitance of a second electrode of the capacitance grid in accordance with a second drive signal, wherein the first and second drive sense circuits generate the first and second sensed signals substantially concurrently, and wherein drive sense data includes data corresponding to the first and second sensed signals;
   generating, by the processing module, capacitance grid data based on the drive sense data, wherein the capacitance grid data corresponds to a capacitance grid of the touch screen;
   determining, by the processing module, data requirements for the capacitance grid data based on the use and properties of the capacitance grid;
   when data reduction is enabled:
      determining, by the processing module, a data reduction scheme based on the data requirements and an output data rate, wherein the data reduction scheme includes one or more of data elimination and data compression;
      processing, by the processing module, the capacitance grid data in accordance with the data reduction scheme to produce reduced capacitive gird data; and
      providing, by the processing module, the reduced capacitive grid data to a data circuit.

2. The method of claim 1, wherein the generating the drive sense data comprises:
   providing, by the processing module, a self-capacitance signal to a plurality of drive sense circuits of the computing device;
   providing, by the processing module, a plurality of mutual capacitance signals to a first set of drive sense circuits of the plurality of drive sense circuits;
   receiving, by the processing module, self-capacitance data from the plurality of drive sense circuits;
   receiving, by the processing module, mutual capacitance data from a second set of the plurality of drive sense circuits; and utilizing, by the processing module, the self-capacitance data and the mutual capacitance data as the drive sense data.

3. The method of claim 2, wherein generating the capacitance grid data comprises:
generating a plurality of self-capacitance values from the self-capacitance data; and
generating a plurality of mutual capacitance values from the mutual capacitance data.

4. The method of claim 1, wherein the determining the use comprises:
determining the use from one or more uses of a plurality of uses, wherein the plurality of uses includes two or more of:
touch detection;
hover detection;
pattern recognition;
object recognition; and
screen-to-screen data communication.

5. The method of claim 1, wherein the data requirements comprise one or more of:
data resolution of the touch screen;
bits per sample of the capacitance grid data;
frame rate of the capacitance grid data;
use of self-capacitance values;
use of mutual capacitance values; and
data rate of a frame of the capacitance grid data.

6. The method of claim 1 further comprises:
enabling the data reduction when the output data rate cannot support the data requirements.

7. The method of claim 1 further comprises:
enabling the data reduction based on an input signal.

8. The method of claim 1, wherein the determining the data reduction scheme further comprises:
determining whether the data reduction scheme can be lossy based on the use; and
when the data reduction scheme can be lossy, selecting a lossy data reduction process from a plurality of data compression options.

9. The method of claim 8 further comprises:
when the data reduction scheme cannot be lossy, selecting a lossless data reduction process from the plurality of data compression options.

10. The method of claim 8, wherein the plurality of data compression options includes two or more of:
principal component analysis (PCA);
clustering;
region of interest (ROI);
mu law encoding;
a-law encoding;
run length encoding (RLE);
edge reduction; and
contour reduction.

11. The method of claim 1, wherein the data circuit comprises one of:
a component of the computing device;
another computing device;
a remote display; and
remote memory.

12. A computing device comprises:
a touch screen that includes a capacitive grid;
a plurality of drive sense circuits operably coupled to provide drive signals to the capacitive grid, wherein a first drive sense circuit of the plurality of drive sense circuits generates a first sensed signal based on capacitance of a first electrode of a capacitance grid of the touch screen in accordance with a first drive signal;
wherein a second drive sense circuit of the plurality of drive sense circuits generates a second sensed signal based on capacitance of a second electrode of the capacitance grid in accordance with a second drive signal, wherein the first and second drive sense circuits generate the first and second sensed signals substantially concurrently, and wherein drive sense data includes data corresponding to the first and second sensed signals;
a processing module operably coupled to:
determine a use for touch screen data of the touch screen;
generate capacitance grid data based on the drive sense data;
determine data requirements for the capacitance grid data based on the use and properties of the capacitance grid;
when data reduction is enabled:
determine a data reduction scheme based on the data requirements and an output data rate, wherein the data reduction scheme includes one or more of data elimination and data compression;
process the capacitance grid data in accordance with the data reduction scheme to produce reduced capacitive gird data; and
provide the reduced capacitive grid data to a data circuit.

13. The computing device of claim 12, wherein generating the drive sense data comprises:
providing, by the processing module, a self-capacitance signal to the plurality of drive sense circuits of the computing device;
providing, by the processing module, a plurality of mutual capacitance signals to a first set of drive sense circuits of the plurality of drive sense circuits;
generating, by the plurality of drive sense circuits, self-capacitance data based on the self-capacitance signal;
generating, by a second set of drive sense circuits, mutual capacitance data based on the plurality of mutual capacitance signals; and
providing, by the plurality of drive sense signals, the self-capacitance data and the mutual capacitance data as the drive sense data to the processing module.

14. The computing device of claim 13, wherein generating the capacitance grid data comprises:
generating a plurality of self-capacitance values from the self-capacitance data; and
generating a plurality of mutual capacitance values from the mutual capacitance data.

15. The computing device of claim 12, wherein the processing module is further operable to determine the use by:
determining the use from one or more uses of a plurality of uses, wherein the plurality of uses includes two or more of:
touch detection;
hover detection;
pattern recognition;
object recognition; and
screen-to-screen data communication.

16. The computing device of claim 12, wherein the data requirements comprise one or more of:
data resolution of the touch screen;
bits per sample of the capacitance grid data;

frame rate of the capacitance grid data;
use of self-capacitance values;
use of mutual capacitance values; and
data rate of a frame of the capacitance grid data.

17. The computing device of claim 12, wherein the processing module is further operable to:
enable the data reduction when the output data rate cannot support the data requirements.

18. The computing device of claim 12, wherein the processing module is further operable to:
enable the data reduction based on an input signal.

19. The computing device of claim 12, wherein the processing module is further operable to determine the data reduction scheme by:
determining whether the data reduction scheme can be lossy based on the use; and
when the data reduction scheme can be lossy, selecting a lossy data reduction process from a plurality of data compression options.

20. The computing device of claim 12, wherein the processing module is further operation to:
when the data reduction scheme cannot be lossy, select a lossless data reduction process from the plurality of data compression options.

21. The computing device of claim 19, wherein the plurality of data compression options includes two or more of:
principal component analysis (PCA);
clustering;
region of interest (ROI);
mu law encoding;
a-law encoding;
run length encoding (RLE);
edge reduction; and
contour reduction.

22. The computing device of claim 12, wherein the data circuit comprises one of:
a component of the computing device;
another computing device;
a remote display; and
remote memory.

* * * * *